(12) United States Patent
Burns et al.

(10) Patent No.: US 12,051,293 B2
(45) Date of Patent: *Jul. 30, 2024

(54) RETAIL SECURITY SYSTEM

(71) Applicant: Skeleton Key Systems, LLC, Northfield, NJ (US)

(72) Inventors: Michael Burns, Margate, NJ (US); Adam Phillip Treiser, Washington, DC (US); Adam Green, Margate, NJ (US); Eric Goldberg, Linwood, NJ (US)

(73) Assignee: Skeleton Key Systems, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/210,543

(22) Filed: Jun. 15, 2023

(65) Prior Publication Data

US 2023/0368595 A1 Nov. 16, 2023

Related U.S. Application Data

(63) Continuation of application No. 17/633,759, filed as application No. PCT/US2020/045422 on Aug. 7, 2020, now Pat. No. 11,704,950.

(60) Provisional application No. 63/012,426, filed on Apr. 20, 2020, provisional application No. 62/884,374, filed on Aug. 8, 2019.

(51) Int. Cl.
*G07C 9/00* (2020.01)

(52) U.S. Cl.
CPC ..... *G07C 9/00896* (2013.01); *G07C 9/00309* (2013.01); *G07C 2009/00539* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 4,331,394 | A | 5/1982 | Girard |
| 5,144,820 | A | 9/1992 | Holmgren |
| 5,178,283 | A | 1/1993 | Ennis |
| 5,437,172 | A | 8/1995 | Lamy et al. |
| 6,260,300 | B1 | 7/2001 | Klebes |
| 6,364,124 | B1 | 4/2002 | Chen |
| 6,848,285 | B2 | 2/2005 | Stroh |
| 7,131,542 | B2 | 11/2006 | Sedon et al. |

(Continued)

FOREIGN PATENT DOCUMENTS

| | | |
|---|---|---|
| CA | 2365133 A1 | 6/2003 |
| CN | 2548497 Y | 5/2003 |

(Continued)

*Primary Examiner* — K. Wong
(74) *Attorney, Agent, or Firm* — The Belles Group, P.C.

(57) ABSTRACT

A retail security system that includes a locking system having locking assemblies that can be locked and unlocked directly by a consumer or clerk/employee using his or her mobile phone or other portable electronic device. Each of the locking assemblies may be configured to lock an article so that it cannot be freely accessed. The security system may include a sanitizing system that sanitizes the article after a consumer returns the article to the locking system without making a purchase. The security system may include a computer apparatus that allows an owner of the security system to access a software application that provides the owner with information/data about access to the locked articles.

20 Claims, 34 Drawing Sheets

(56) References Cited

U.S. PATENT DOCUMENTS

| | | |
|---|---|---|
| 7,134,559 B2 | 11/2006 | Zoueki |
| 7,263,843 B1 | 9/2007 | Nordstrom |
| 7,270,241 B2 | 9/2007 | Nobili |
| 7,274,292 B2 | 9/2007 | Velhal et al. |
| 7,392,673 B2 | 7/2008 | Fawcett et al. |
| 7,556,232 B1 | 7/2009 | Begg |
| 7,737,845 B2 | 6/2010 | Fawcett et al. |
| 7,737,846 B2 | 6/2010 | Belden, Jr. et al. |
| 8,127,946 B2 | 3/2012 | Winig et al. |
| 8,307,995 B2 | 11/2012 | Surma et al. |
| 8,307,999 B2 | 11/2012 | Pintur |
| 8,328,028 B1 | 12/2012 | Freilich |
| 8,542,119 B2 | 9/2013 | Sankey |
| 8,947,201 B2 | 2/2015 | Crigger et al. |
| 9,133,649 B2 | 9/2015 | Taylor |
| 9,367,865 B2 | 6/2016 | Treiser |
| 9,443,404 B2 | 9/2016 | Grant et al. |
| 9,909,341 B2 | 3/2018 | Thoonsen |
| 9,934,657 B2 | 4/2018 | Tkachenko et al. |
| 10,121,342 B2 | 11/2018 | Alvarez et al. |
| 10,127,745 B2 | 11/2018 | Grant et al. |
| 10,140,824 B2 | 11/2018 | Schultz et al. |
| 11,704,950 B2 * | 7/2023 | Burns ................ G07C 9/00896 340/568.1 |
| 2004/0200790 A1 | 10/2004 | Zoueki |
| 2007/0251062 A1 | 11/2007 | Saitoh et al. |
| 2007/0267369 A1 | 11/2007 | Eelkowitz |
| 2008/0053113 A1 | 3/2008 | Nordstrom |
| 2012/0047972 A1 | 3/2012 | Grant et al. |
| 2012/0280783 A1 | 11/2012 | Gerhardt et al. |
| 2013/0067968 A1 | 3/2013 | Ezzo |
| 2013/0110678 A1 | 5/2013 | Vigier et al. |
| 2014/0015675 A1 | 1/2014 | Raz et al. |
| 2015/0077232 A1 | 3/2015 | Grant et al. |
| 2015/0182647 A1 | 7/2015 | Ranta |
| 2016/0093184 A1 | 3/2016 | Locke |
| 2016/0201359 A1 | 7/2016 | Berglund et al. |
| 2017/0103595 A1 | 4/2017 | Taylor et al. |
| 2018/0216367 A1 | 8/2018 | Taylor |
| 2019/0075944 A1 | 3/2019 | Pintur |
| 2019/0213812 A1 | 7/2019 | Burns et al. |

FOREIGN PATENT DOCUMENTS

| | | |
|---|---|---|
| CN | 201001556 Y | 1/2008 |
| CN | 201798359 U | 4/2011 |
| CN | 201847258 U | 6/2011 |
| CN | 204146738 U | 2/2015 |
| CN | 108903479 A | 11/2018 |
| CN | 208367826 U | 1/2019 |
| CN | 109493535 A | 3/2019 |
| CN | 109978527 A | 7/2019 |
| CN | 110033564 A | 7/2019 |
| DE | 9201825 U1 | 4/1992 |
| DE | 202007012852 U1 | 11/2007 |
| EP | 1356178 A1 | 10/2003 |
| EP | 2236709 A1 | 10/2010 |
| EP | 2392235 A1 | 12/2011 |
| FR | 2625089 A1 | 6/1989 |
| FR | 2648030 A1 | 12/1990 |
| FR | 2725888 A | 4/1996 |
| FR | 2830732 A1 | 4/2003 |
| JP | H0585962 A | 12/1993 |
| JP | 2010152840 A | 7/2010 |
| JP | 2010152842 A | 7/2010 |

* cited by examiner

FIG. 24

RETAIL SECURITY SYSTEM

CROSS-REFERENCE TO RELATED APPLICATIONS

The present application is a continuation of U.S. patent application Ser. No. 17/633,759, filed Feb. 8, 2022, which is a U.S. national stage application under 35 U.S.C. § 371 of PCT Application No. PCT/US2020/045422, filed Aug. 7, 2020, which claims the benefit of U.S. Provisional Patent Application No. 62/884,374, filed on Aug. 8, 2019, and U.S. Provisional Patent Application No. 63/012,426, filed on Apr. 20, 2020. The disclosures of the aforementioned priority applications are incorporated herein by reference in their entireties.

FIELD OF THE INVENTION

The present invention relates generally to systems and methods for preventing theft of an article in a retail store environment while providing consumers with increased access to the article. The invention also relates to a system for sanitizing articles to limit or prevent the spread of disease.

BACKGROUND OF THE INVENTION

Generating sales in a brick-and-mortar retail environment can be challenging, especially with increased competition from Internet-based retailers. A retail store is often required to maintain a sufficiently large staff that is responsible for stocking shelves, checking out customers, and providing customers with access to items that are kept locked, which increases overhead. Many different types of locking assemblies currently exist to secure consumer goods to or within retail establishments, which are otherwise accessible for consumers to access, touch, explore, investigate, experience and sample. However, these locking systems have disadvantages, including restricting and limiting consumer's ability to access, touch, explore, investigate, experience and sample the products in a manner that provides an opportunity to truly test many of the product's features. Furthermore, consumers must wait for a retail associate to become available to assist them in gaining access to the product. Thus, a new system and method is needed to give consumers access to a product with fewer restrictions and intrusive security measures while maintaining sufficient anti-theft technologies to identify, deter, and stop theft. Also, a system and method is needed that can provide an owner with access to information about the consumers that are accessing the products. Finally, a system is needed that sanitizes article after it has been returned to the locking system to prevent the spread of disease.

SUMMARY OF THE INVENTION

These and other needs are satisfied by the present invention, which in one aspect is directed to a retail security system that includes a locking system having locking assemblies that can be locked and unlocked directly by a consumer or clerk/employee using his or her mobile phone or other portable electronic device. Each of the locking assemblies may be configured to lock an article so that it cannot be freely accessed. In another aspect, the security system may include a sanitizing system that sanitizes the article after a consumer returns the article to the locking system without making a purchase. In yet another aspect, the security system may include a computer apparatus that allows an owner of the security system to access a software application that provides the owner with information about consumer access to the locked articles.

In one aspect, the invention may be a retail security system comprising: a locking system comprising: a stand extending from a bottom end to a top end along a longitudinal axis and comprising a base portion configured to rest atop of a floor of a retail space and a support portion extending from the base portion in a direction of the longitudinal axis; a plurality of locking assemblies located along the support portion of the stand, each of the locking assemblies configured to hold an article for sale, each of the locking assemblies independently alterable between a locked state whereby the article cannot be removed from the locking assembly and an unlocked state whereby the article can be removed from the locking assembly; and a wireless communication module; a portable electronic device carried by a user and comprising a wireless communication module; and wherein upon wireless communication being established between the portable electronic device and the locking system and the user being authenticated, the portable electronic device is configured to transmit instructions to the locking system to cause the locking system to alter at least one of the plurality of locking assemblies from the locked state to the unlocked state so that the user can interact with the article being held by the at least one of the plurality of locking assemblies.

In another aspect, the invention may be a retail security system comprising: a locking system comprising: a support structure; and at least one locking assembly located along the support structure and being alterable between a locked state and an unlocked state, the at least one locking assembly comprising: a first arm extending from a front surface of the support structure and being non-movable relative to the support structure; and a second arm extending from the front surface of the support structure and being movable between a first position when the locking assembly is in the locked state and a second position when the locking assembly is in the unlocked state, wherein when the second arm is in the first position an article is locked between the first and second arms and when the second arm is in the second position a user can readily remove the article from the locking assembly; a portable electronic device carried by a user; and wherein upon wireless communication being established between the portable electronic device and the locking system, the portable electronic device is configured to transmit instructions to the locking system to cause the locking system to alter the at least one locking assembly from the locked state to the unlocked state so that the user can interact with the article being held by the locking assembly.

In yet another aspect, the invention may be a retail security system comprising: a locking system comprising a locking assembly configured to hold an article for sale, the locking assembly alterable between a locked state whereby the article cannot be removed from the locking assembly and an unlocked state whereby the article can be removed from the locking assembly; a sanitizing system configured to sanitize the article; and wherein the locking system is configured to alter the locking assembly from the locked state to the unlocked state automatically upon receiving instructions from an authenticated user without any physical contact between the authenticated user and the locking assembly.

In a further aspect, the invention may be a retail security system comprising: a locking system comprising a plurality of locking assemblies each configured to hold an article for sale, each of the locking assemblies alterable between a locked state whereby the article cannot be removed from the locking assembly and an unlocked state whereby the article can be removed from the locking assembly; and a computer apparatus comprising a user interface and a software application, wherein upon launching the software application on the computer apparatus and logging in as an administrator of the locking system, the computer apparatus displays, on the user interface, a list of the locking assemblies of the locking system alongside an indication as to whether each of the locking assemblies is in the locked state or the unlocked state.

In a still further aspect, the invention can be a method of monitoring a retail security system, the method comprising: launching a software application on a computer apparatus and providing authentication credentials for authentication as an administrator or owner; upon providing authentication credentials, a user interface of the computer apparatus displaying a dashboard containing information associated with one or more retail security systems that are owned or operated by the administrator or owner; wherein the information on the dashboard comprises: a list of the one or more retail security systems and a status of one or more locking assemblies of the retail security systems, the status including an indication as to whether the one or more locking assemblies is locked or unlocked; and an activity log including a list of users who have been in operable communication with the one or more retail security systems.

In another aspect, the invention can be a retail security system comprising: a locking system comprising a locking assembly configured to hold an article for sale, the locking assembly being alterable between a locked state whereby the article cannot be removed from the locking assembly and an unlocked state whereby the article can be removed from the locking assembly; a sanitizing system; and wherein the sanitizing system is configured to sanitize the article automatically upon the article being returned to the locking assembly and the locking assembly being altered into the locked state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 24 is a view of the user interface of the computer apparatus of FIG. 22 after launching the software application and navigating to a login page;

DETAILED DESCRIPTION OF THE INVENTION

Figure 1:
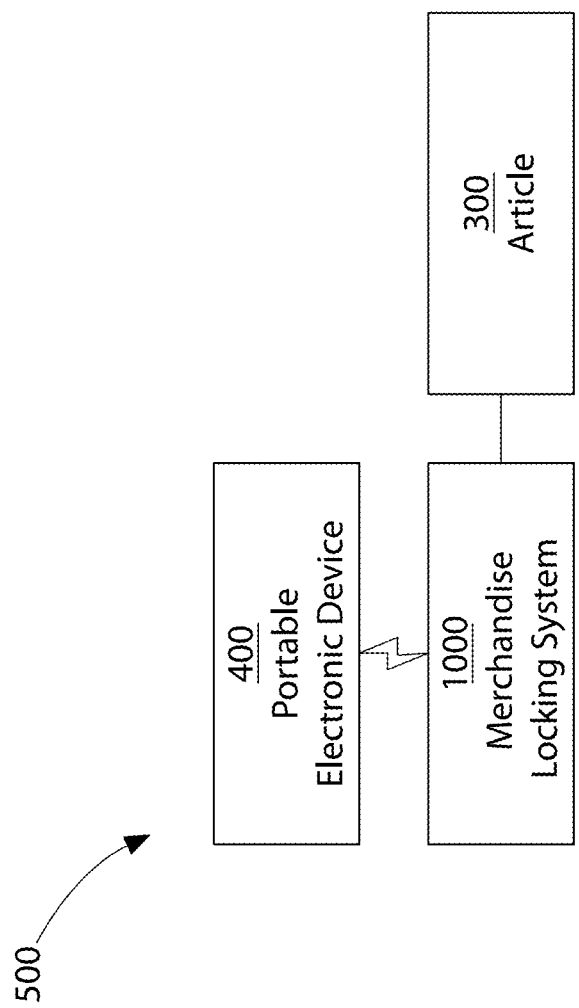
FIG. 1 is an electronic schematic diagram of a retail security system including, in operable communication, a portable electronic device, a locking system, and an article in accordance with an embodiment of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Exemplary embodiments of the present invention are disclosed herein. Generally, these embodiments provide consumers with unrestricted access to articles (e.g., merchandise, consumer products, products for sale in a retail establishment, or other articles that it is desired to protect against theft) for sampling purposes in and around a retail environment, such as a store, without diminishing the store's ability to protect itself against theft or the loss of a sale. Further embodiments enable the retail store to retain up to date inventory information regarding articles while allowing the consumers to access the articles. As used herein, the term "consumer" may include store employees and potential purchasers. The term "user" may also be used to include store employees and/or potential purchasers. Thus, in some embodiments the system may be utilized by an employee who is assisting a potential purchaser. In other embodiments the system may be utilized directly by a potential purchaser. This may be determined by the store owner and the decision as to who may access the system may be modifiable by the store owner using an owner's dashboard of a software application, or by other means.

It should be appreciated that there are many more embodiments with respect to the current invention and that, even with respect to the embodiments included, certain steps may not be necessary or even performed in the same order. Furthermore, a person skilled in the art would understand that while certain devices of the invention are described herein as containing specific components, those devices may include some of the components described, all of the components described, or additional components.

Referring first to FIG. 1, a system and method for providing consumers with access to an article, such as for example without limitation a product or merchandise that is sold in a retail store, will be described. FIG. 1 is a schematic diagram illustrating an embodiment of a retail security system 500 which comprises a portable electronic device 400, a locking system 1000 and an article 300 that is operably coupled to, and in some instances secured by, the locking system 1000 or a component of the locking system 1000. The portable electronic device 400 may be held by the user/consumer and placed into operable communication with the locking system 1000 so that the user/consumer can use the portable electronic device 400 to control whether the article 300 is locked by the locking system 1000 or not. Specifically, and as described in much greater detail below, a user can use the portable electronic device 400 to unlock the locking system 1000 to provide the user with access to the article 300 that is held by the locking system 1000. The locking system 1000 can track the user by data stored on the portable electronic device 400 to deter theft and/or process payment and/or force payment in the event of a theft.

As used herein, the article 300 may be any product, merchandise, object, good, consumer product, or the like that is available for sale from a retail establishment to a consumer and/or which is otherwise desired to be protected against theft. Non-limiting examples of articles 300 include mobile phones, digital cameras, personal computers, laptop computers, televisions, portable electronics, other electronic devices, clothing, eyewear, accessories, home goods, personal care items, furniture, office supplies, jewelry, fragrances such as cologne and perfume, alcohol, grocery items, and countless other products such as any and all consumer products or the like. It should be noted that the invention is not limited to those consumer products explicitly denoted herein, but may include any consumer product as understood in the art. Thus, any product that can be purchased by a consumer at a retail store can be used as the article 300. In certain embodiments, the locking system 1000 may be particularly suited for locking a particular type of article, and some of the claims may require the particular type of article. For example, in some embodiments disclosed herein toe article 300 is an article of eyewear (i.e., glasses or sunglasses). Thus, while the type of article being locked by the locking system 1000 is not to be limiting in all embodiments, it may be limiting in some embodiments.

Figure 3:
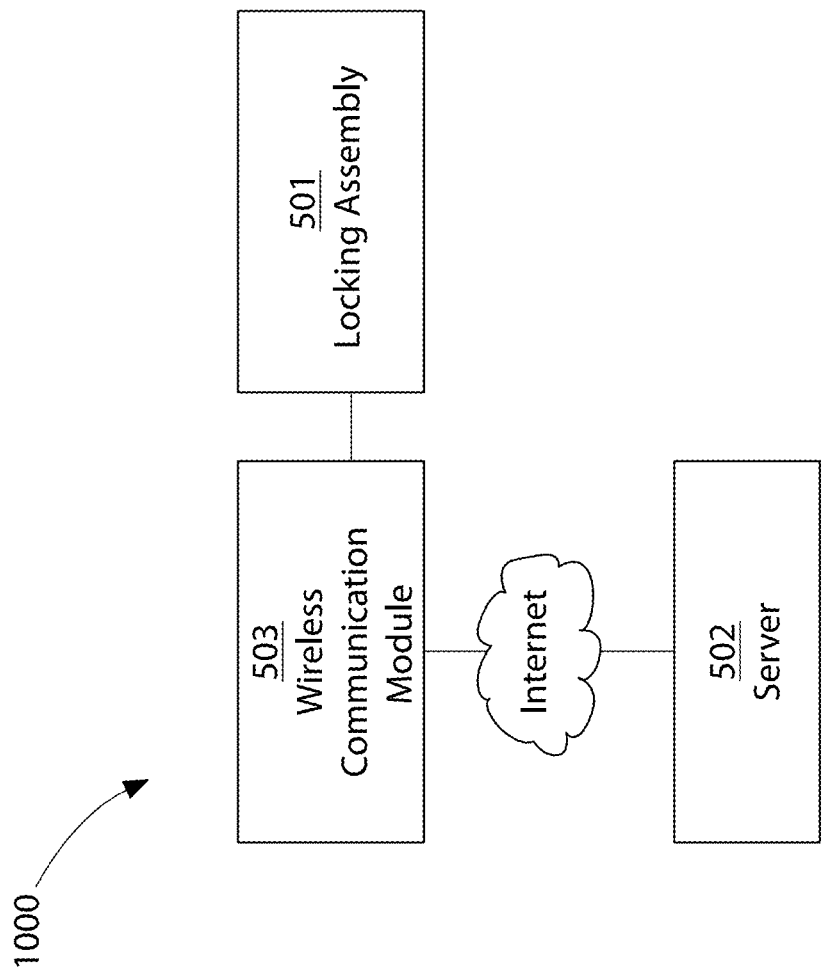
FIG. 3 is an electronic schematic diagram of the locking system of FIG. 1.

Referring briefly to FIG. 3, the locking system 1000 may include, among other components, a locking assembly 501 that restricts or limits a consumer's ability to, or the manner and degree to which the consumer may access, touch, explore, investigate, experience or sample a particular consumer product, such as the article 300. The locking system 1000, and more particularly in certain embodiments the locking assembly 501 of the locking system 1000, is a device that has a locked state (i.e., a secured state) and an unlocked state (i.e., an unsecured state). When the locking assembly 501 is in the locked state, the locking assembly 501 locks a consumer product such as the article 300 by either preventing physical access to the article 300 by a consumer, or by prohibiting certain actions with respect to the article 300. In certain embodiments it may be considered that the locking system 1000 generally has the locked state for securing the article 300 and the unlocked state for releasing the article 300 and allowing a consumer to have generally uninhibited (with potential limitations as noted herein) access to the article 300. In other embodiments it is the locking assembly 501 of the locking system 1000 that has the locked state for securing the article 300 and the unlocked state for releasing the article 300. As discussed in more detail below, the locking system 1000 provides consumers access to a consumer product that is typically locked to prevent theft.

The locking assembly 501 may be a physical device that restricts the movement of the article 300, such as, but not limited to a cable that secures a digital camera to a display shelf, a cable that secures an article of clothing to a rack, a glass or plastic enclosure having a releasable barrier or door, a glass or plastic enclosure having an infrared or other electromagnetic field capable of detecting when an object breaks the electromagnetic field, a releasable hook from which the article 300 hangs that in the locked state prevents removal of the article 300 from the hook and in the unlocked state enables removal of the article 300 from the hook, or the like. Further, the locking assembly 501 may comprise software that restricts the full operation of the article 300, such as, but not limited to software residing on a personal computer that restricts certain functionality of the personal computer or software residing on any electronic device that prohibits the consumer from turning the product on or testing and experiencing the full functionality of the product. The locking assembly 501 may also be a fitting room door. Thus, the locking assembly 501 may be any physical device or properly programmed processor that restricts a consumer's full access to a consumer product such as the article 300 when the locking assembly 501 (or the locking system 1000) is in a locked state, and that releases the article 300 or otherwise enables a consumer to have full access to the article 300 when the locking assembly 501 (or the locking system 1000) is in an unlocked state to enable the consumer to access, touch explore, investigate, experience and/or sample the article 300. One particular structural embodiment of the locking system 1000 is shown in FIGS. 5-8 and will be described in detail below.

Referring back to FIG. 1 and as described briefly above, the portable electronic device 400 may be in (or may be placed into) operable communication with the locking system 1000 so that the portable electronic device 400 can be used to control the locking and unlocking of the locking assembly 501, described further herein below. In the exemplified embodiment, the communication between the portable electronic device 400 and the locking system 1000 is wireless, although the invention is not to be so limited and a hardwire connection between the portable electronic device 400 and the locking system 1000 can be used in other embodiments. Thus, a user can place the portable electronic device 400 into operable communication with the locking system 1000, and then the locking system 1000 can make a determination regarding whether to permit the user of the portable electronic device 400 to control the locking assembly 501 to transition between the locked and unlocked states to enable the consumer to have full access to the article 300 based on a risk assessment, an authentication process, an authorization process, or the like. The risk assessment, authentication process, or authorization process may include the locking system 1000 gaining access to personal information about the user (financial account data, age information, criminal background, or simply identification information) so that the locking system 1000 can make a determination as to whether to provide the user with the ability to control the locking assembly 501. Furthermore, in some embodiments information can be transmitted from the locking system 1000 to the portable electronic device 400, such as information about the article 300 that is secured by the locking system 1000. Thus, the communication between the portable electronic device 400 and the locking system 1000 may be two-way communication in certain embodiments, although the invention is not to be so limited in all embodiments and single-way communication is also contemplated.

In certain embodiments, communication between the portable electronic device 400 and the locking system 1000 is achieved via near field communication (NFC). Thus, the portable electronic device 400 can be equipped with NFC capabilities (i.e., an NFC enabled device) and the locking system 1000 can include an NFC tag, chip, sticker or the like. As a result, when the portable electronic device 400 gets to within a certain distance of the locking system 1000, the portable electronic device 400 can read or scan the NFC tag or chip and access data or information provided by the NFC tag or chip, and the NFC tag or chip can similarly access information from the portable electronic device 400. In certain embodiments, the distance between the portable electronic device 400 and the locking system 1000 that facilitates proper information transfer therebetween is between approximately 0-40 cm, or between approximately 15-30 cm, or approximately 20 cm. Of course, the communication between the devices is not limited to NFC, as will be discussed in more detail below with reference to FIG. 2. In one particular embodiment, communication between the portable electronic device 400 and the locking system 100 may be via Bluetooth or similar technology.

Figure 2:
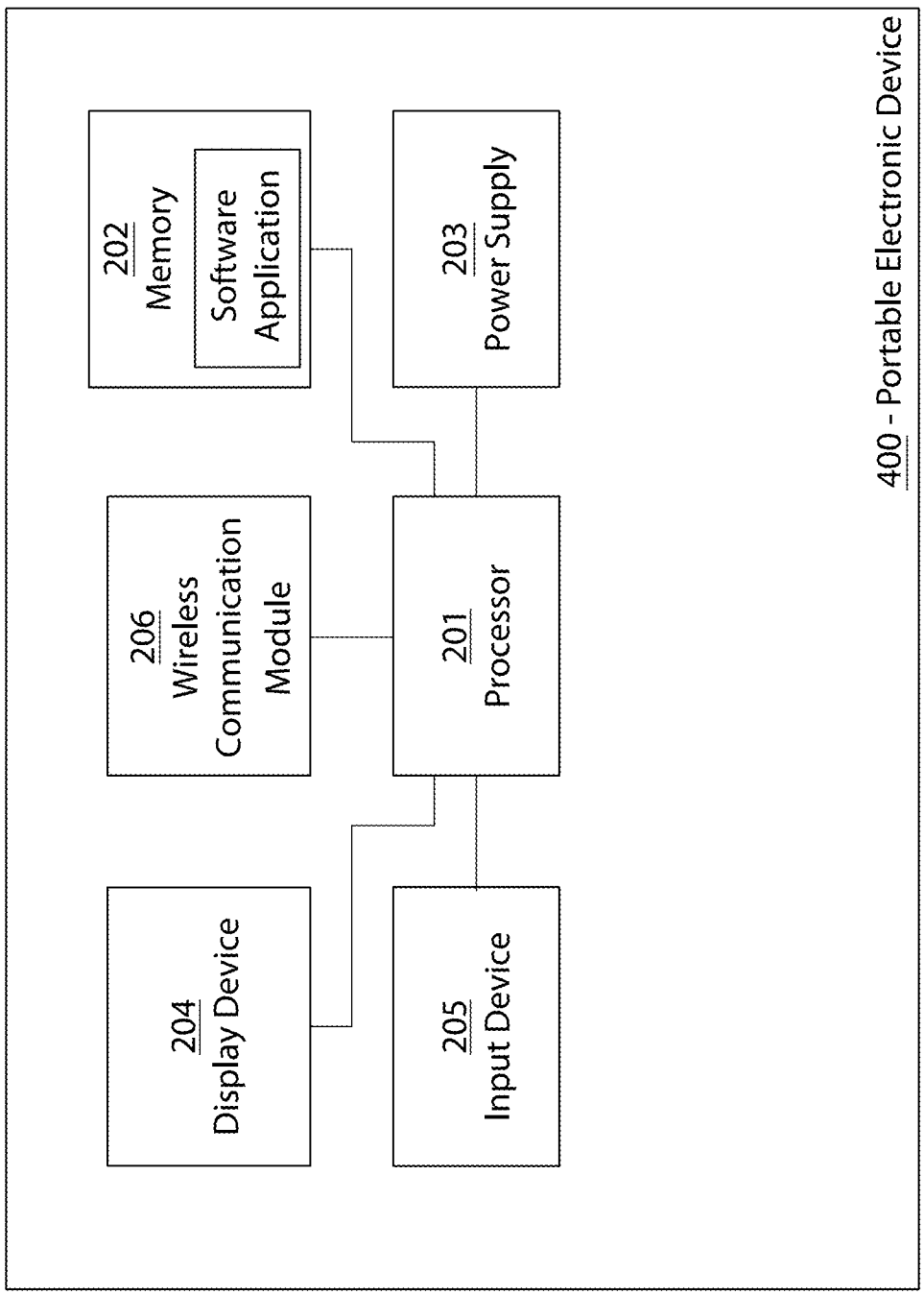
FIG. 2 is an electronic schematic diagram of the portable electronic device of FIG. 1.

Referring to FIG. 2, an electronic schematic diagram of the portable electronic device 400 is illustrated in accordance with an embodiment of the present invention. The portable electronic device 400 can be any one of a number of devices, including without limitation, a smart phone, a cell phone, a tablet computer, a personal digital assistant ("PDA"), a laptop computer, a near field communication (NFC) enabled credit or debit card, a Fob (such as those used as car keys and work and apartment building access keys), or any other portable electronic computing device that comprises and/or is connected to a wireless communication module.

In accordance with the illustrated embodiment, the portable electronic device 400 comprises a processor 201, a memory 202, a power supply 203, a display device 204, an input device 205 and a wireless communication module 206, all of which are in operable communication such as by being connected through the processor 201 as exemplified. As mentioned above, the invention is not limited to the portable electronic device 400 having all of the components illustrated in FIG. 2, and the portable electronic device 400 may have more components than that illustrated or less than the entirety of the components illustrated.

The processor 201 may be any microprocessor, controller, or the like which is a chip that receives input from other electronic components and provides an appropriate output, in addition to performing other functions such as controlling operation of the portable electronic device 400. Some details of this operation will be provided below. The power supply 203 may be one or more batteries which may be rechargeable, replaceable, or the like as may be desired. The display device 204 may be a user interface on the portable electronic device 400 which is responsive to touch (i.e., a touch screen). Thus, a user can interact with the display device 204 of the portable electronic device 400 and transmit instructions to the locking system 1000 through that interaction with the display device 204 of the portable electronic device 400, as discussed in more detail below. The input device 205 may form a part of the user interface in some embodiments as it may receive input based on a user touching or tapping on the display device or user interface 204.

The memory 202 may store any and all information necessary for proper functioning of the portable electronic device 400. As shown, the memory 202 may contain a software application 210. The software application 210 can be downloaded onto the portable electronic device 400 using conventional techniques, such as by initiating an app store within the portable electronic device 400 and conducting a search for the desired software application 210. The software application 210 is associated with the locking system 1000 such that it is intended and configured to be used to control the locking system 1000 when the portable electronic device 400 is in wireless communication with the locking system 1000. The software application 210 may be a smartphone application. In other embodiments, the software application 210 can be any program for carrying out the functions described herein, including programs running on a laptop or desktop computer.

In one embodiment, each portable electronic device 400 contains, or has access to, substantial amounts, and varying types, of personal and other identifying information of the consumer, such as the consumer's name, phone number, address, email address, contact list, application downloads, Internet searching history, recent product purchases, criminal background, SIM card serial numbers, payment and bank account information, portable electronic wallets, the VIN of a car owned by the consumer as well as its make, model, year, and price, hardware and network consumer registration profiles, social media accounts, pictures, place of employment, and more. This information/data may be stored on the memory 202 of the portable electronic device 400 or on an external memory unit from which the portable electronic device 400 can access and retrieve the information/data such as any of the various servers or networks of servers that are referred to as being in the cloud. In certain embodiments the invention utilizes an application (such as the software application 210) that resides on the portable electronic device 400 and the application has access to all of the personal and identifying information of the consumer noted above, referred to herein collectively as consumer data, and more, such as by the consumer granting the application access to such information upon download.

The wireless communication module 206 may be any module that facilitates communication between the portable electronic device 400 and the locking system 1000 (or a wireless communication module 503 of the locking system 1000, as illustrated in FIG. 3 and discussed in more detail below), such as NFC as discussed above. Of course, the wireless communication module 206 is not limited to being an NFC chip, and it may be, without limitation, an RFID tag/reader, NFC chip/tag, electromagnetic, Bluetooth, WIFI, cellular, I/O, DIDO, infrared, and sonar technologies. In some embodiments, the portable electronic device 400 has WIFI capabilities in addition to one or more of the other technologies noted above. The locking system 1000, or more specifically the wireless communication module 503 of the locking system 1000, is able to communicate with the portable electronic device 400 via RFID, NFC, RF, electromagnetic, Bluetooth, WIFI, cellular, wireless USB, I/O, DIDO, infrared, and sonar technologies, among others, depending on the wireless technology contained by those devices.

Referring to FIG. 3, one exemplary embodiment of the locking system 1000 is illustrated. In accordance with the illustrated embodiment, the locking system 1000 comprises a locking assembly 501 for securing the article 300, a wireless communication module 503, and a server 502. In some embodiments, such as the exemplary one described below with reference to FIGS. 5-8, the locking system 1000 may comprise a plurality of the locking assemblies 501 that are independently alterable between the locked and unlocked states. The wireless communication module 503 may facilitate the wireless communication between the portable electronic device 400 and the locking system 1000. For example, when the wireless communication is via Bluetooth, the wireless communication module 503 of the locking system 1000 and the wireless communication module 206 of the portable electronic device 400 may both be a Bluetooth module. Thus, the portable electronic device 400 may become paired with the locking system 1000 to allow the portable electronic device 400 to control the locked and unlocked states of the locking assemblies 501.

In the exemplified embodiment, the wireless communication module 503 may also communicate wirelessly with the server 502 through the Internet, or there may be separate wireless communication modules as part of the locking system 1000 for communicating with the server 502 and for communicating with the portable electronic device 400. However, the invention is not to be so limited and the wireless communication module 503 and the server 502 may communicate via a hardwire connection, or not at all in certain other embodiments. In certain embodiments, the server 502 may not form a part of the locking system 1000 and may instead be a separate remote server that is in communication with the wireless communication module 503. In still other embodiments, the wireless communication module 503 may not be in operable communication with the server 502 at all. In such embodiments, upon communication being established between the portable electronic device 400 and the wireless communication module 503, the portable electronic device 400 may communicate wirelessly with the server 502. These different methods of operation of the system will be discussed in more detail below.

Furthermore, in certain embodiments the wireless communication module 503 may be directly affixed to the locking assembly 501, directly affixed to the article 300, or it may be a separate device having its own housing that is operably connected, either wirelessly or via a hardwire connection, to one of the locking assembly 501 or the article 300 or both. The wireless communication module 503 can be, without limitation, an RFID tag/reader/sticker, NFC chip/tag/reader, electromagnetic, Bluetooth, WIFI, cellular, I/O, DIDO, infrared, and sonar technologies. Thus, the wireless communication module 503 of the locking system 1000 is able to wirelessly communicate with the wireless communication module 206 of the portable electronic device 400. As a result of communication between the portable electronic device 400 and the locking system 1000, the locking system 1000 may transition from a secured state to an unsecured state, the portable electronic device 400 may transfer information and data (i.e., consumer data related to the consumer) to the locking system 1000 (i.e., to the server 502, or to a remote server), and the locking system 1000 may transfer information and data (i.e., product data related to the article 300, marketing materials, coupons and the like) to the portable electronic device 400. All of these transfers of data and information will be discussed in more detail below.

Figure 4:
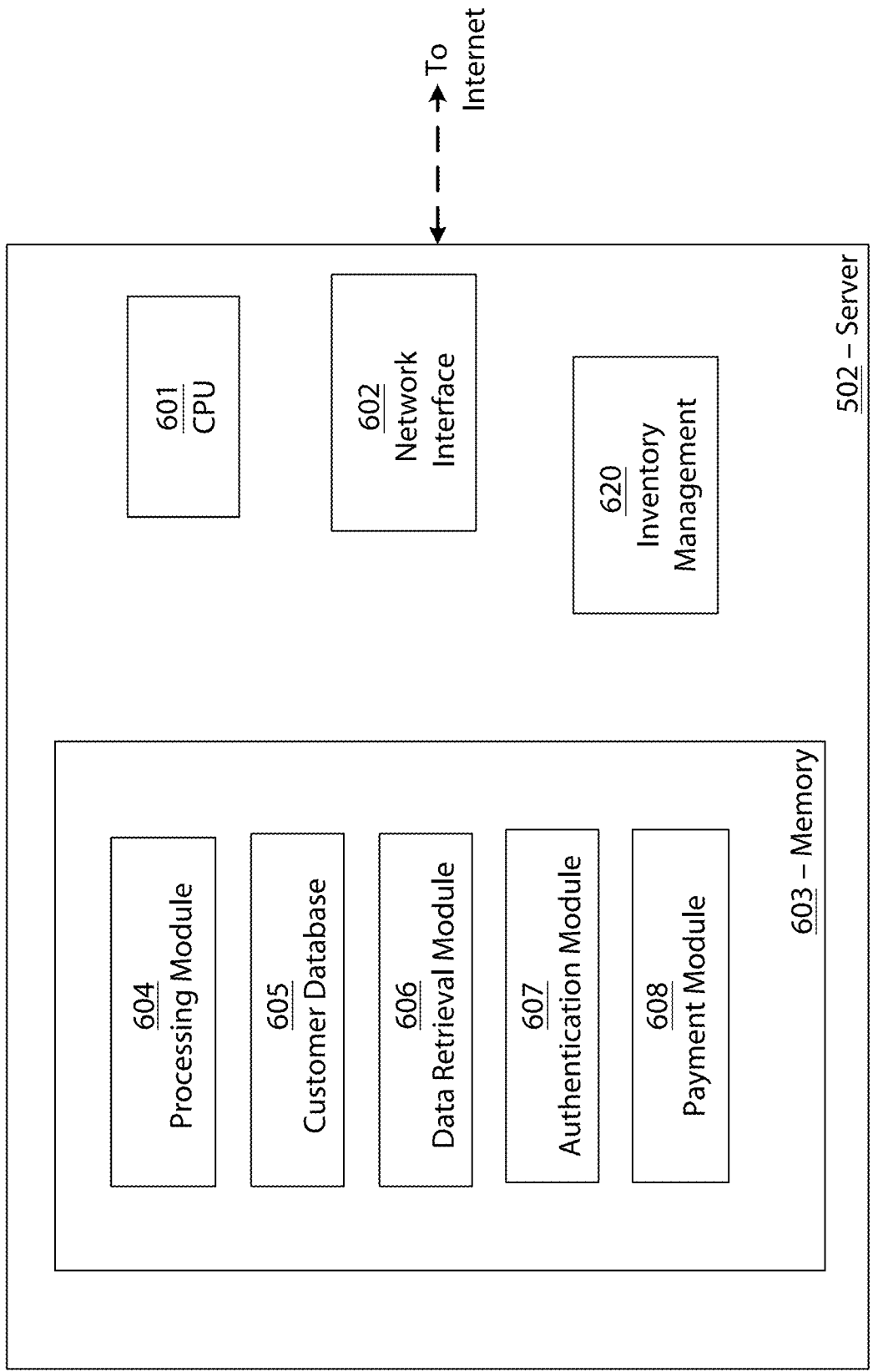
FIG. 4 is an electronic schematic diagram of a server in accordance with an embodiment of the present invention.

Referring now to FIG. 4, one embodiment of a server 502 that can be used with the present invention will be described. In the exemplified embodiment, the server 502 comprises a properly programmed processor (CPU) 601, a network interface 602, and a memory unit 603. In the exemplified embodiment, the memory unit 603 comprises a processing module 604, a consumer database 605, a data retrieval module 606, an authentication module 607, and a payment module 608. Of course, more or less than all of the databases/modules can form a part of the server 502. In certain embodiments, the server 502 may not include any of the modules and databases, and they can instead be separate devices with which the server 502 is in operable communication.

The processing module 604 processes and organizes all of the information provided to the server 502. The consumer database 605 may be a consumer relationship management database, a loyalty rewards program database, a database containing consumer data or information about each of the consumers that have shopped (and even possibly some that have not) in the particular retail store, or the like. The data retrieval module 606 retrieves data from the portable electronic device 400 or from databases with which the server 502 is in operable communication. The authentication module 607 authenticates a user and allows the user (or consumer) to instruct the locking system 1000 to either transition between the locked and unlocked states. The authentication module 607 may authenticate a user by approving the user's risk level based on a criteria (or not authenticate the user by disapproving the user's risk level when the user does not meet the criteria). Various different ways that this may occur will be discussed below, but can be based on the user's financial account data, the user's criminal background, the user's age and other identifying information, or the like. The payment module 608 retrieves payment information from the particular consumer (or the particular portable electronic device 400) with which the server 502 is in communication so that payment for the article 300 can be made if desired in the event the consumer wishes to purchase the article 300 or if necessary in the event of a theft of the article 300 by the consumer.

Although exemplified as a single memory unit, it should be noted that the invention is not so limited and in other embodiments the server 502 may comprise more than one memory unit 603. Further, although exemplified as a single server, it should be noted that in alternate embodiments the server 502 may take the form of any number of operably connected and properly programmed servers. As discussed in more detail below, the server 502 is configured to receive, store, and disseminate information relating to the consumer, the article 300, the portable electronic device 400, and the locking system 1000. Further, although exemplified as being in electronic communication with the wireless communication module 503 via the internet in FIG. 3, it should be noted that the invention is not so limited and in alternate embodiments the server 502 may be operably connected to any of the other components of the system via other communication means, such as those described above. In certain embodiments, it should be understood that the server 502 is configured to perform the processes and functions described herein.

Further, although the above described features are made with respect to a certain module or database of the server, any and/or each (including all) of the features above may be related to one or more of the modules and/or databases described above, or none of the modules and/or databases described above. The features may be performed in a module and/or database that is not described above. Further, the features may be performed outside of the server. For example, the features may be provided within a locking unit (such as locking assembly 501), a hanging surface, a portable electronic device, an RFID reader, a weight scale, scanner, optical camera, etc. As an example, the detection unit may be an RFID reader, a weight scale, scanner, optical camera, etc.

Referring to FIGS. 5-8, an exemplary structural embodiment of the locking system 1000 is illustrated. The locking system 1000 comprises a stand 100 and a plurality of locking assemblies 200 that are coupled to the stand 100. The stand 100 can take on any configuration, shape, size, or the like as may be desired. The particular shape, size, and configuration of the stand 100 may be dictated by the number of the locking assemblies 200 that are coupled to the stand 100, the available space within the retail environment within which it is to be placed, or other external factors. In the exemplified embodiment, there are two columns of locking assemblies 200 with twelve locking assemblies 200 in each column such that the locking system 100 comprises twenty-four of the locking assemblies 200. Of course, any number of the locking assemblies 200 may be used depending on the needs of the particular retail environment in which the locking system 100 is to be used. There could be more (or less) than two columns of the locking assemblies 200 and there could be more or less than twelve locking assemblies 200 in each column in other embodiments.

In the exemplified embodiment, the stand 100 comprises a base portion 110 that rests atop of the floor, a header portion 120, and a support portion 130 located between the base portion 110 and the header portion 120. The stand 100 extends form a bottom end 101 (which forms the bottom of the base portion 110) to a top end 102 (which forms a top of the header portion 120) along a longitudinal axis A-A. The stand 100 may comprise legs 103 extending from the bottom end 101 and upon which the stand 100 is supported in an upright manner. The base portion 101 and/or the header portion 120 may house electronic components and/or circuitry that may be required for proper functioning of the locking system 1000. It should be appreciated that the appearance of the stand 100 may be modified and is not to be limiting of the invention described herein in all embodiments. The base portion 110 and/or the header portion 120 may be omitted in some embodiments or may take on a completely different aesthetic. In some embodiments, instructions related to use of the locking system 100, advertising or marketing information, product details, or the like may be provided on the base portion 110 and/or the header portion 120.

As noted, the support portion 130 of the stand 100 is located between the base portion 110 and the header portion 120. The support portion 130 is elongated in the direction of the longitudinal axis A-A. The support portion 130 is the portion of the stand 100 that supports the locking assemblies 200 and the articles held thereby. That is, the locking assemblies 200 are located along the support portion 130 of the stand 100. The support portion 130 of the stand 100 comprises a front surface 131 and a rear surface 132 opposite the front surface 131. Each of the front and rear surfaces 131, 132 of the support portion 130 are planar surfaces in the exemplified embodiment, which is desirable from an aesthetic standpoint and may also serve an ease of use purpose. Furthermore, in the exemplified embodiment there are a plurality of slots 133 in the support portion 130 that extend from the front surface 131 to the rear surface 132. Thus, each of the slots 133 is a through-hole that extends through the support portion 130 of the stand 100. As will be described below, portions of the locking assemblies 200 extend through the slots 133 so that the locking assemblies 200 have some components located on (or adjacent to) the rear surface 132 of the support portion 130 of the stand 100 and some components located on (or adjacent to) the front surface 131 of the support portion 130 of the stand.

The locking assemblies 200 comprise a locking unit 210 and an actuator mechanism 250. The actuator mechanism 250, which will be described in more detail below, is configured to alter the locking unit 210 from a locked state (FIG. 6) to an unlocked state (FIG. 12) and also from the unlocked state back to the locked state.

Figure 5:
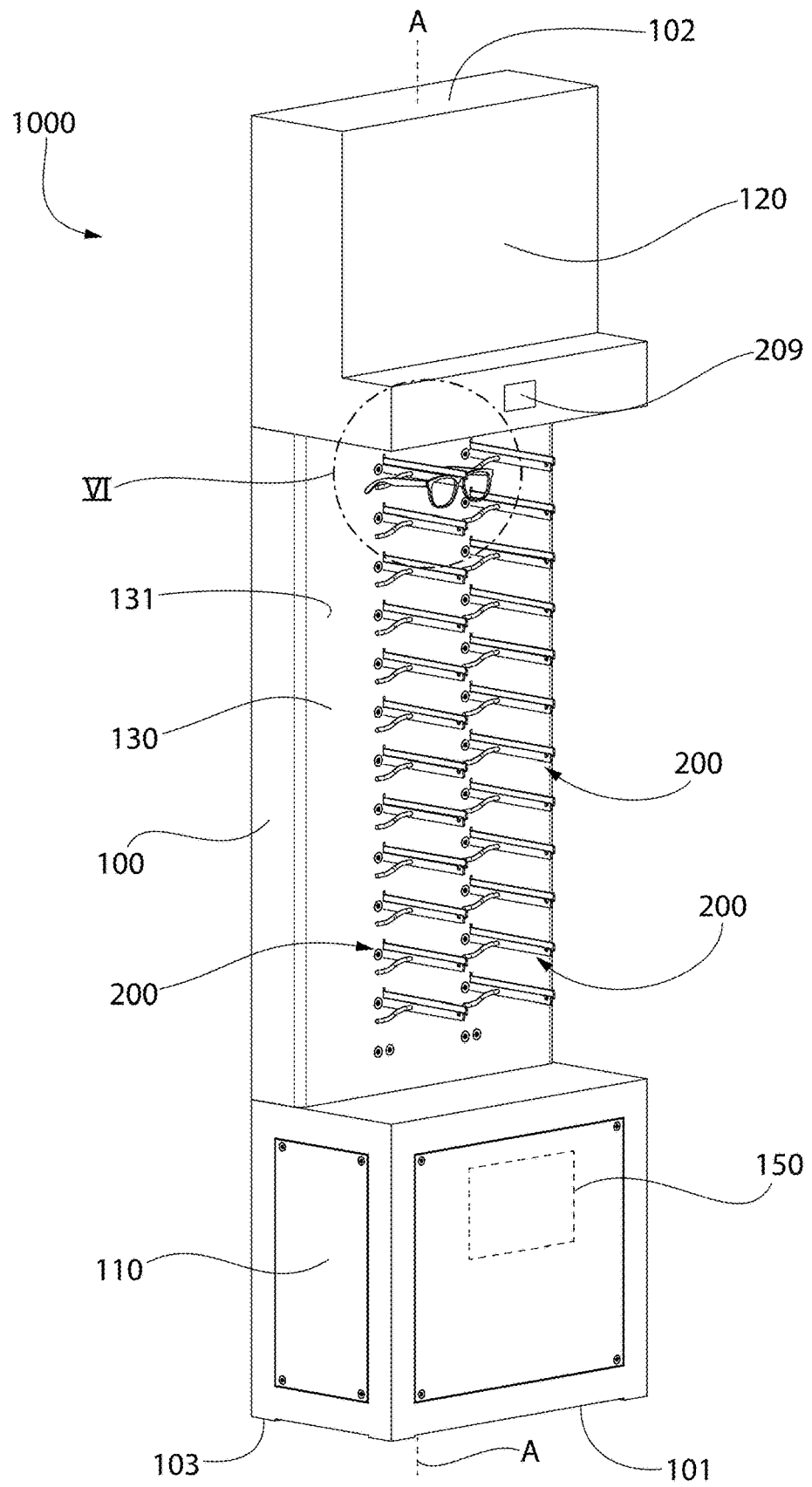
FIG. 5 is a front perspective view of a locking system having a plurality of locking assemblies in accordance with an embodiment of the present invention.
Figure 6:
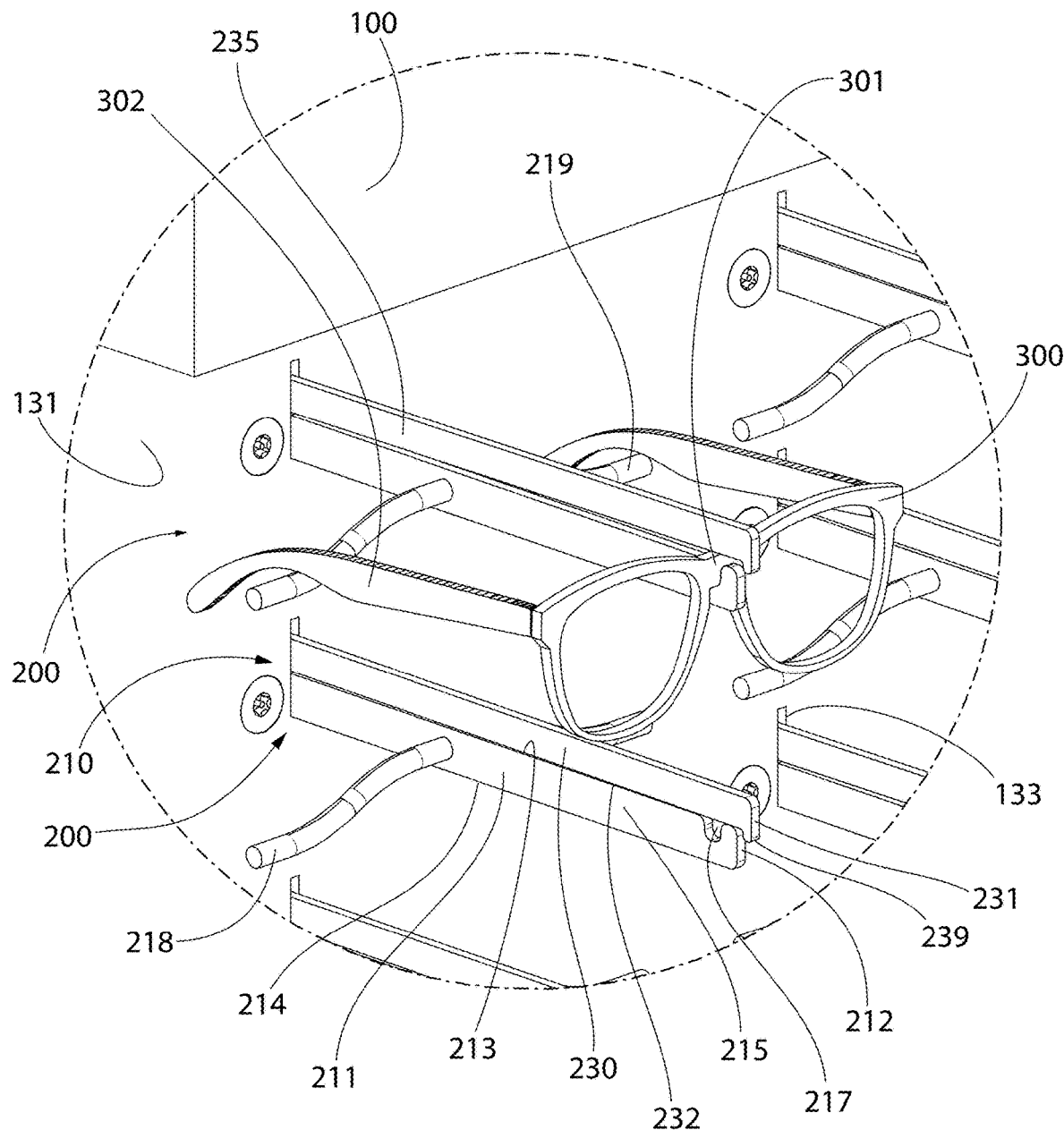
FIG. 6 is a close-up view of area II of FIG. 5.

Referring to FIGS. 5 and 6, the locking unit 210 comprises a first arm 211 extending from the front surface 131 of the support portion 130 of the stand 100 and a second arm 230 extending from the front surface 131 of the support portion 130 of the stand 100. The first arm 211 may also be referred to herein as a stationary arm because it is fixed and non-movable relative to the stand 100. The second arm 230 may also be referred to herein as a movable arm because it moves relative to the stand 100 to alter the locking unit 210 from the locked state to the unlocked state and vice versa. The first arm 211 is fixed relative to the stand 100 in that the first arm 211 does not move when transitioning the locking unit 210 between the locked and unlocked states. The second arm 220 moves when transitioning the locking unit 210 between the locked and unlocked states, as described further below.

The first arm 211 extends from the front surface 131 of the support portion 130 of the stand 100 along an axis that is perpendicular to the longitudinal axis A-A of the stand, and the first arm 211 terminates in a distal end 212. The first arm 211 is elongated as it extends from the front surface 131 of the support portion 130 of the stand 100 to the distal end 212. The first arm 211 has a top surface 213, a bottom surface 214, a first side surface 215, and a second side surface (not labeled) opposite the first side surface 215. The first arm 211 also comprises a notch 217 formed into the top surface 213 in a direction towards the bottom surface 214. The notch 217 has a curved or concave shape in the exemplified embodiment, although it could take on other shapes such as being square, rectangular, triangular, or the like in various other embodiments. The notch 217 is located closer to the distal end 212 of the first arm 211 than it is to the front surface 131 of the support portion 130 of the stand 100, but it is spaced a small distance (0.1 inches to 3 inches in some embodiments) from the distal end 212. The notch 217 may have a depth of 0.5-5 mm in some embodiments. As can be seen in FIG. 6, the notch 217 is configured to receive the bridge 301 of an article of eyewear 300 so that the first arm 211 can support the article of eyewear 300 thereon. The first arm 211 has a length that is equal to or greater than a typical length of the article of eyewear 300 measured from a distal end of the temples to the front of the lenses so that the article of eyewear 300 can fit on the first arm 211 with the temples extended without abutting against the front surface 131 of the support portion 130 of the stand 100. Of course, it may be possible to hold the eyewear 300 on the locking unit 210 with the temples folded, which would allow for the length of the first and second arms 211, 230 to be reduced.

A first support member 218 extends from the first side surface 215 of the first arm 211 in a direction generally perpendicular to the first arm 211 and a second support member 219 extends from the second side surface of the first arm 211 in a direction generally perpendicular to the first arm 211. In the exemplified embodiment, each of the first and second support members 218, 219 is positioned closer to the front surface 131 of the support portion 130 of the stand 100 than to the distal end 212 of the first arm 211. However, the exact location of the first and second support members 218, 219 along the first arm 211 is not to be limiting of the present invention so long as the first and second support members 218, 219 are positioned along the first arm 211 at a location that enables them to support the temples 302 of the article of eyewear 300 as illustrated in FIG. 6. In the exemplified embodiment, the support members 218, 219 have a curved or wavy structure, but they may be linear in other embodiments. Furthermore, the invention is not to be limited by the various angles at which the support members 218, 219 extend from the first arm 211 so long as the support members 218, 219 are configured to support the temples 302 of the article of eyewear 300. In the exemplified embodiment, the support members 218, 219 are axially aligned along the first arm 211 which is preferable to ensure that the article of eyewear 300 is properly supported, although this is not required in all embodiments.

The second arm 230 also extends from the front surface 131 of the support portion 130 of the stand 100 to a distal end 231. In the exemplified embodiment, the distal end 231 of the second arm 230 is offset from the distal end 212 of the first arm 211. Specifically, in the exemplified embodiment the second arm 230 has a greater length than the first arm 211 so that the distal end 231 of the second arm 230 is located further from the front surface 131 of the support portion 130 of the stand 100 than the distal end 212 of the first arm 211. However, this is not required in all embodiments and other structural arrangements may be possible in other embodiments. For example, in some embodiments the first and second arms 211, 230 may have the same length such that the distal ends 212, 231 are aligned. In the exemplified embodiment, the second arm 230 has a projection 239 at the distal end 231 that extends downwardly towards the first arm 211. The projection 239 extends over a portion of the distal end 212 of the first arm 211 when in the locked state as shown in FIG. 6.

The first and second arms 211, 230 are illustrated with the locking units 210 in the locked state in FIG. 6. In this state, a bottom surface 232 of the second arm 230 is immediately adjacent to (or in contact with) the top surface 213 of the first arm 211. As a result, the second arm 230 prevents the article of eyewear 300 from being removed from the locking unit 210. Specifically, the bridge 301 of the article of eyewear 300 is positioned within the notch 217 in the first arm 211. The second arm 230 then overlies the first arm 211 and the bridge 301 of the article of eyewear 300 so that the bridge 301 of the article of eyewear 300 is trapped in the notch 217 of the first arm 211 due to the second arm 230 being positioned immediately adjacent to the first arm 211 and thereby closing an open top end of the notch 217.

Although in the exemplified embodiment the locking units 210 are described such that the first arm 211 does not move, the invention is not to be so limited in all embodiments. In some embodiments the first arm 211 may move in addition to or instead of the second arm 230. However, because the first arm 211 is the one that supports the article of eyewear 300, it may be preferable to make the first arm 211 fixed/non-movable.

As discussed previously, there are a plurality of the locking assemblies 200 in the exemplified embodiment, each of the locking assemblies 210 comprising one of the first arms 211 and one of the second arms 230. The locking assemblies 200 are arranged in columns and each of the locking assemblies 200 within a column is spaced apart from the other locking assemblies 200 in the column in a vertical direction (i.e., in a direction of the longitudinal axis A-A of the stand 100). Although the locking assemblies 200 within each column are illustrated as being aligned in the exemplified embodiment, they may be offset in other embodiments to allow for the adjacent locking assemblies 200 to be spaced closer together without the second arm 230 of one of the locking assemblies 200 contacting another one of the locking assemblies 200 when moved into the unlocked position. Each of the locking assemblies 200 is configured to hold a different article of eyewear such that the locking system 1000 can hold multiple articles of eyewear at one time. Furthermore, the locking system 1000 is designed so that each of the locking assemblies 200 can be altered from the locked state to the unlocked state independently of the other locking assemblies 200. Thus, the locking system 1000, and more particularly the retail security system 500, can provide a user with access to one of the articles of eyewear 300 while the other articles of eyewear remain locked by the locking system 1000 and inaccessible to the user/consumer.

The locking system 1000 may also comprise at least one camera 209 that is positioned at a location and orientation that enables it to capture an image of a consumer accessing the article being held by the locking system 1000. Thus, as will be described in detail below, a user can cause the locking system 1000 to alter one of the locking assemblies 200 from the locked state to the unlocked state using, for example, the user's portable electronic device 400. The locking system 1000 may be configured to take a photograph of the user prior to unlocking any of the locking assemblies 200 to provide an added security feature that will enable the user to be identified if the user attempts to steal the articles being held by the locking system 1000. The photograph of the user may be stored in the server 502 or elsewhere to be viewed if needed, for example if the article that the user accessed becomes damaged or stolen. In the exemplified embodiment, the locking system 1000 includes only one camera 209. In other embodiments, there may be a camera associated with each of the locking assemblies 200 such that the number of cameras correlates to the number of locking assemblies 200.

Figure 7:
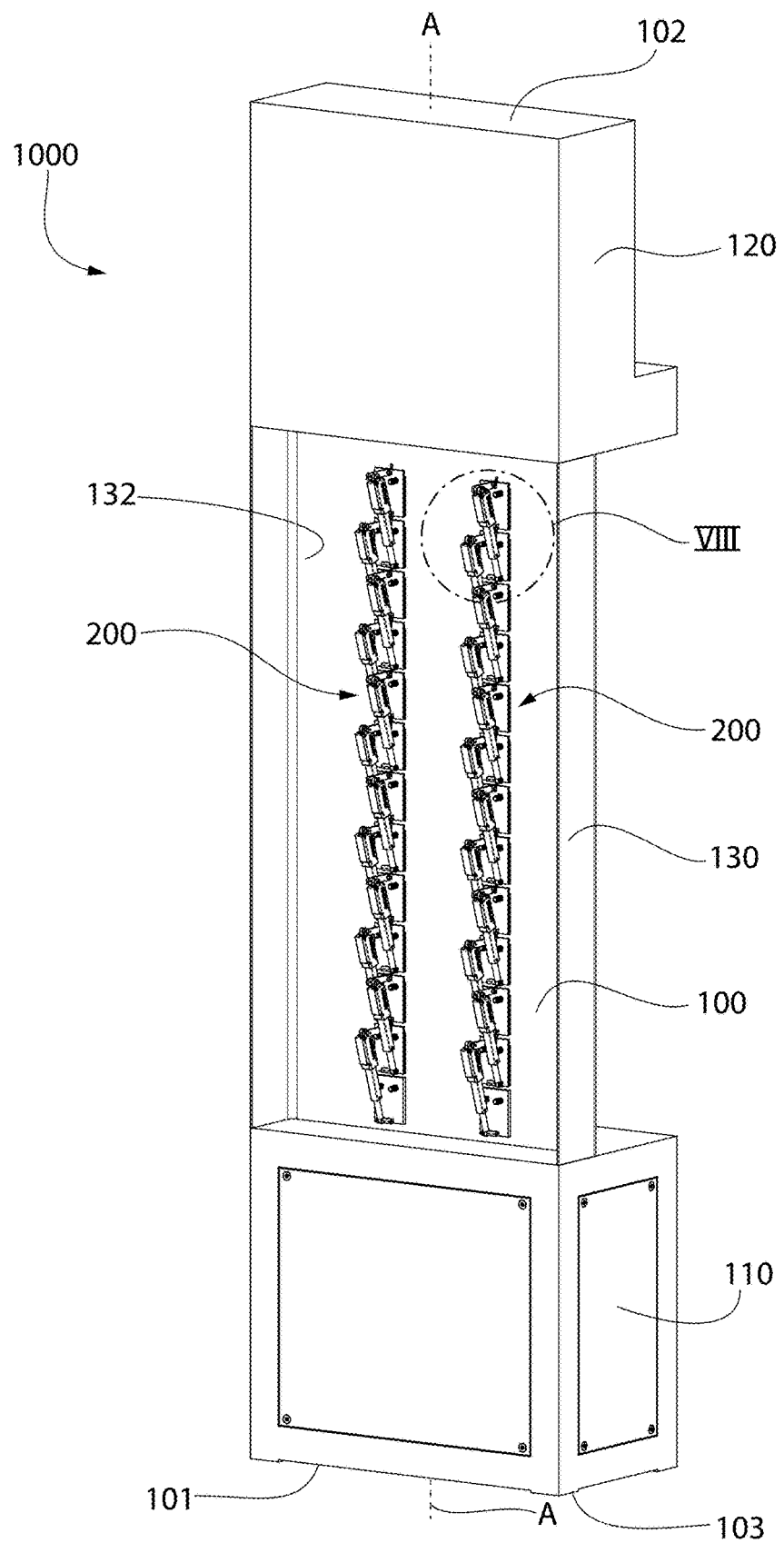
FIG. 7 is a rear perspective view of the locking system of FIG. 1 illustrating an actuator mechanism associated with each of the locking assemblies.
Figure 8:
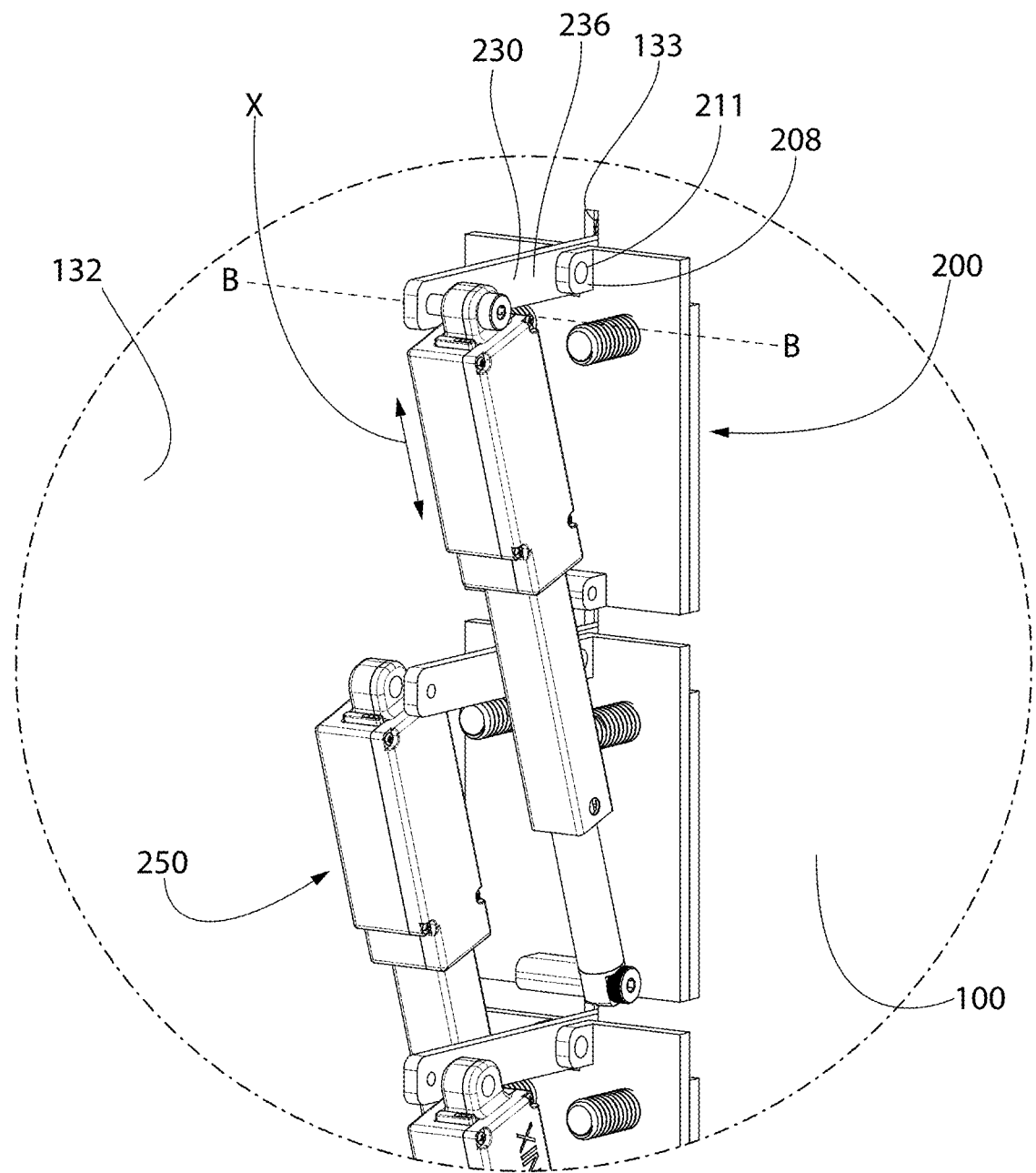
FIG. 8 is a close-up view of area VIII of FIG. 7.

Referring to FIGS. 7 and 8, the actuator mechanism 250 of the locking system 1000 will be described. Each of the locking assemblies 200 includes one of the actuator mechanisms 250. More specifically, for each of the locking assemblies 200, one of the actuator mechanisms 250 is operably coupled to the second arm 230 so that the actuator mechanism 250 can alter the second arm 230 from a first position whereby the locking assembly 200 is in the locked state to a second position whereby the locking assembly 200 is in the unlocked state, and vice versa.

As seen in FIG. 8, the actuator mechanism 250 is coupled to the second arm 230. Specifically, the second arm 230 of each of the locking assemblies 200 extends through one of the slots 133 in the support portion 130 of the stand 100 and couples to the actuator mechanism 250. Thus, each of the second arms 230 has a first portion 235 (see FIG. 6) that is located on a first side of the support portion 130 adjacent the front surface 131 of the support portion 130 and a second portion 236 (see FIG. 8) that is located on a second side of the support portion 130 adjacent the rear surface 132 of the support portion 130. The second portion 236 of each of the second arms 230 is coupled to one of the actuator mechanisms 250.

In the exemplified embodiment, the actuator mechanism 250 is a linear actuator that creates motion in a straight line, which in turn and due to its coupling to the second arm 230, enables the second arm 230 to transition from the locked state to the unlocked state and vice versa. Thus, the actuator mechanism 250 moves upwardly and downwardly in the direction of the arrow labeled X in FIG. 8. In the exemplified embodiment, downward movement of the actuator mechanism 250 transitions the locking assembly 200 associated with that actuator mechanism 250 from the locked state to the unlocked state and upward movement of the actuator mechanism 250 transitions the locking unit from the unlocked state to the locked state. Of course, this could be reversed in other embodiments.

The actuator mechanism 250 may be electric, electromechanical, pneumatic, hydraulic, mechanical, thermal, magnetic, servo, solenoid, or the like in various embodiments. The actuator mechanism 250 may comprise a motor, such as a servomotor, to facilitate the movement thereof. Although a particular type of actuator mechanism 250 is depicted in the drawings, it should be appreciated that any type of actuator may be used in accordance with the teachings set forth herein as may be appreciated by persons skilled in the art.

As noted above, each of the actuator mechanisms 250 is operably coupled to the second arm 230 of one of the locking units 211. Thus, as the actuator mechanism 250 moves linearly, the second arm 230 moves in a pivoting or rotational direction relative to the first arm 211 to lock and/or unlock the locking unit 211. That is, the second arm 230 pivots about an axis B-B that is parallel to a plane on which the front and/or rear surfaces 131, 132 of the support portion 130 of the stand 100 lie. As seen in FIG. 8, the first arm 211 also has a portion 208 that extends through the slot 211. The second arm 230 is connected to the portion 208 of the first arm 211 such that the first and second arms 211, 230 are coupled together along or at a position that is adjacent to the rear surface 132 of the support portion 130. As the actuator mechanism 250 moves as noted herein, the second arm 230 pivots relative to the first arm 211 which remains stationary.

As shown in FIG. 5, the locking system 1000 may comprise at least one processor 150. Specifically, in the exemplified embodiment the locking system 1000 comprises the processor 150 and it is shown as being located within the base 110 of the stand 100. However, the processor 150 may be positioned at any location within the stand 100 in other embodiments. There may also be a receiver in operable communication with the processor 150 that is configured to receive signals from a portable electronic device or the like to initiate the locking and unlocking of various ones of the locking assemblies 200 as described herein.

In the exemplified embodiment, the processor 150 is operably coupled (via a hardwire or wireless connection) to each of the actuator mechanisms 250. The processor 150 comprises or is operably coupled to a memory that stores information related to which product or article is associated with each of the various locking assemblies 200. Thus, as an example, the processor 150 knows that article A is being secured by a first one of the locking assemblies 200, article B is being secured by a second one of the locking assemblies 200, and so on. This information can be stored in the memory device during stocking of the Hocking system 1000 with product. Thus, as will be described further below, in use a user informs the locking system 1000 (via the processor 150) of which article that the user wants to access, and the processor 150 then causes the locking assembly 200 that is securing that article to transition to the unlocked state so that the user can access that article. In other embodiments, the processor 150 may be omitted and the locking system 1000 may communicate with the portable electronic device 400 wirelessly, and the locking system 1000 may be operably coupled to the server 502 as noted herein above which can process the instructions and which may have the product information stored thereon.

In the exemplified embodiment, the locking system 1000 is designed to secure articles of eyewear, which includes glasses and/or sunglasses. Specifically, each of the locking assemblies 200 is configured to secure or hold one pair of glasses or sunglasses. Of course, the locking system 1000 and/or the locking assemblies 200 thereof could be modified or redesigned to secure other types of articles as may be desired. For example, each of the locking assemblies 200 could be an enclosed cubicle or box having a door that can be locked and/or unlocked, such as that which is described in U.S. Pat. No. 9,367,865, the entirety of which is incorporated herein by reference. Furthermore, in some embodiments each of the locking assemblies 200 may be designed to hold/secure multiple pairs of sunglasses. Thus, although the locking system 1000 is described herein as being configured to secure/lock glasses and sunglasses, the same concepts may be used to secure/lock other articles with minor modifications to the structure of the locking assemblies 200 and more specifically the locking units 210 thereof. 1

In order to make it more difficult for a potential thief to separate the first and second arms 211, 230 from one another without utilizing the locking system 1000 properly, there may be an additional locking mechanism. For example, in one embodiment there may be a solenoid actuated locking projection that extends beneath the second arm 230 on the rear surface 132. Thus, when a particular one of the locking assemblies 200 is in the locked state, the locking projection will protrude beneath the second arm 230 so that even if a person tries to pull the second arm 230 upwardly, he/she will not be able to do so. In normal operation, upon a user activating the locking system 1000 to unlock the locking assembly 200, the locking projection may retract so that it no longer prevents the second arm 230 from moving as described herein. Although a locking projection is described herein, other locking mechanisms may be used to achieve this including clamps or the like.

Figure 9:
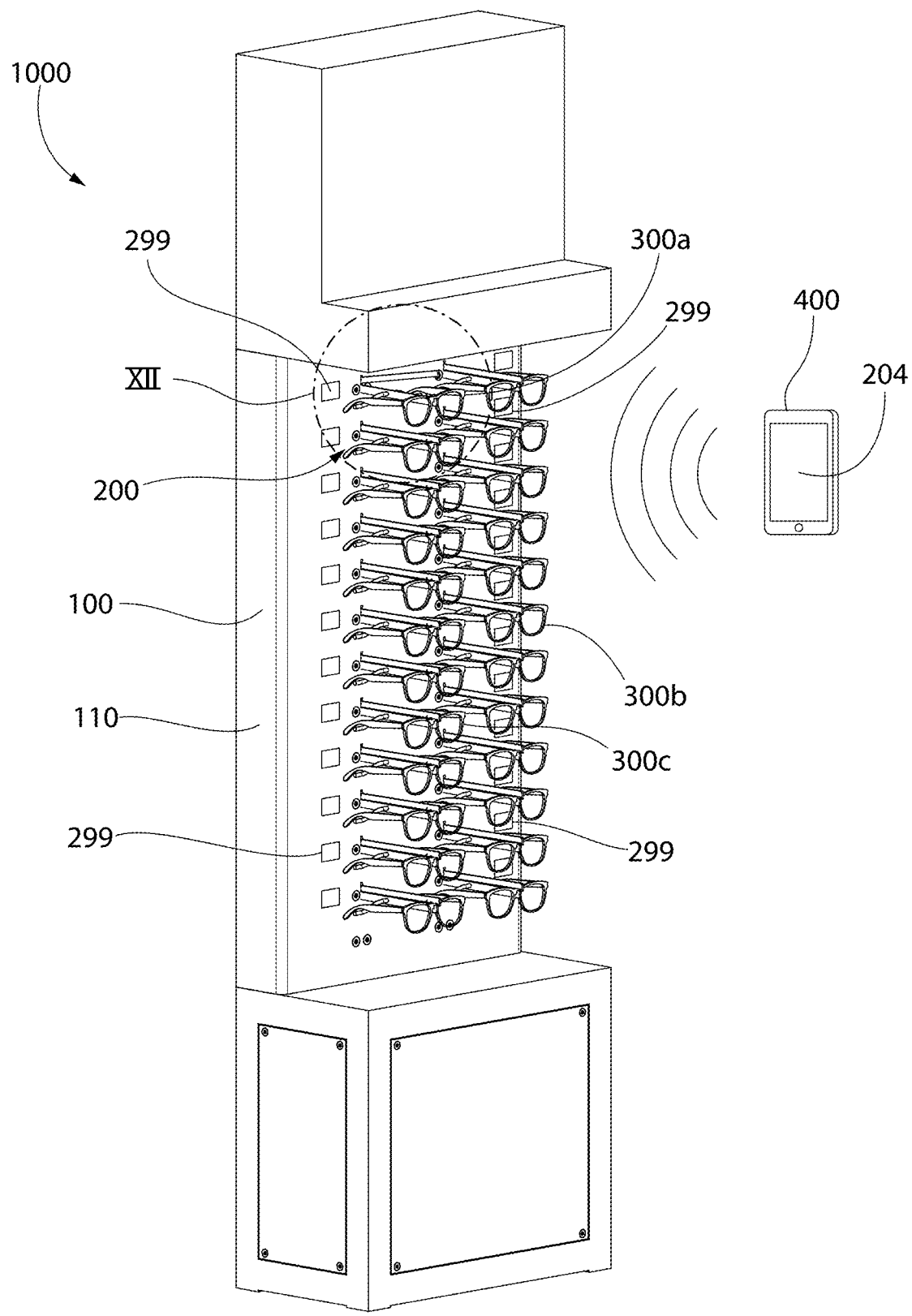
FIG. 9 is a perspective view of a retail security system that includes a portable electronic device in operable communication with the locking system of FIG. 5.
Figure 10:
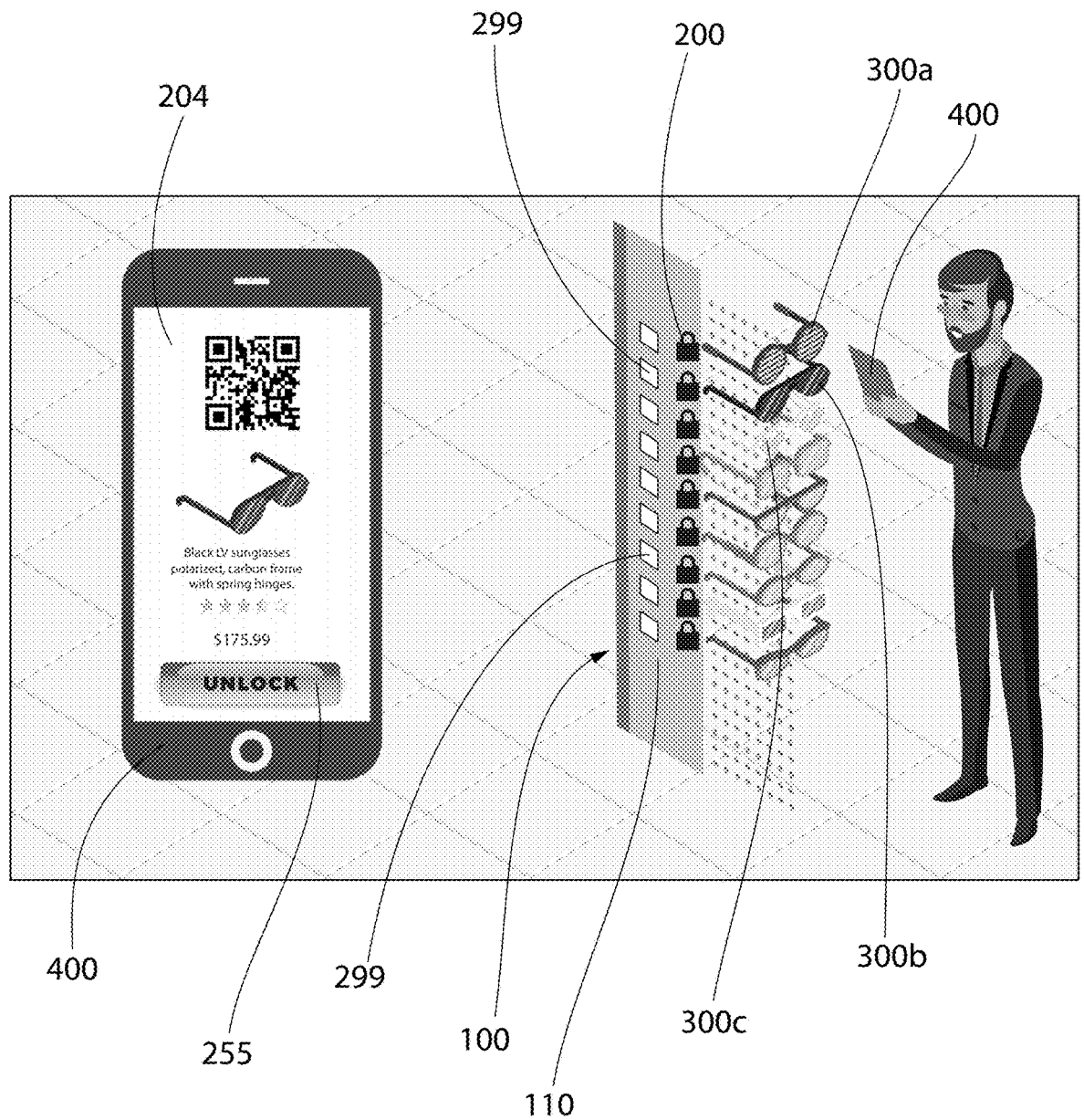
FIG. 10 is an illustration of an employee or consumer using a portable electronic device to select one of the articles held by the locking system.

Referring to FIGS. 9 and 10, the initial operation of the locking system 1000 will be described. In this embodiment, the locking system 1000 is securing a plurality of articles of eyewear 300a-300c (only some of them are labeled). Each pair of glasses/sunglasses is locked/secured by a different one of the locking assemblies 200 (the locking assemblies 200 are shown in detailed view in FIG. 9, but are shown schematically with an image of a lock in FIG. 10). Furthermore, in FIGS. 9 and 10 a consumer holding his/her portable electronic device 400 has walked up to the locking system 1000. The consumer will launch a software application (such as the software application 210 shown in FIG. 2) that is associated with the locking system 1000 on his/her portable electronic device 400. As the user walks over to the locking system 1000, the user may initiate communication between the portable electronic device 400 and the locking system 1000. This may occur automatically as soon as the portable electronic device 400 is within a specific distance from the locking system 1000 or upon the user initiating a pairing procedure such that communication can be achieved wirelessly via Bluetooth, Zigbee, near-field communications (NFC), RFID, RFID tag/reader, electromagnetic, Wi-Fi, cellular, I/O, DIDO, infrared, sonar, or the like. The wireless communication may require the user to pair the portable electronic device 400 with the locking system 1000 by interacting with the user interface of the portable electronic device 400.

In some embodiments, once communication between the portable electronic device 400 and the locking system 1000 is achieved and with the software application launched on the portable electronic device 400, the software application may generate a list of the products that are secured by the locking system 1000, with the list being displayed on the display 204 of the portable electronic device 400. The user will be able to scroll through the various products and select them one by one to read more information about that product and to potentially unlock the locking assembly 200 holding that product to allow the user to gain access to that product.

In another embodiment, the user could scan a machine-readable code 299 located on the locking system 1000 with the portable electronic device 400. This may be done to initiate the communication between the portable electronic device 400 and the locking system 1000 in some embodiments. Furthermore, such scanning could be done without first initiating/launching the software application 210. In some embodiments, the action of scanning the machine-readable code 299 on the locking system 1000 will cause the software application 210 to launch on the portable electronic device 400, or will cause the portable electronic device 400 to instruct the user to download the software application 210. In other embodiments, the user will be instructed to download and/or launch the software application 210 before scanning the machine-readable code 299 on the locking system 1000.

In some embodiments, the portable electronic device 400 and the locking system 1000 may be placed into operable communication using NFC or Bluetooth when the portable electronic device 400 is in sufficiently close proximity to the locking system 1000 (and after being paired if needed). The user may then scan one of the machine-readable codes 299 on the locking system 1000 when the user wants to obtain additional information about or have the option to unlock a particular one of the articles being held by the locking system 1000. The locking system 1000 may comprise a machine-readable code 299 (only some of which are labeled in FIG. 9) positioned adjacent to each of the locking assemblies 200. Each machine-readable code 299 may store information related to the particular locking assembly 200 with which it is associated and adjacently positioned and information related to the article being held by the particular locking assembly with which it is associated. The machine-readable code 299 may be an optical code or the like such as a barcode, a QR code, linear barcodes, matrix barcodes, or the like.

Regardless of whether the user scans a machine-readable code 299 or scrolls through a list, upon selecting a particular product or article, the user interface 204 on the portable electronic device 400 will display information about the particular product selected and will also include a selectable icon 255 that will potentially allow the user to unlock one of the locking assemblies 200. In the exemplified embodiment, the selectable icon 255 comprises the word "UNLOCK," although other terms, graphics, illustrations, or the like could be used on the selectable icon/button 255. The displayed information may include a photograph of the article, descriptive information about the article, a price of the article, and a rating for the article (i.e., 3.5 stars, or the like). If upon reviewing the information about the article the user determines that he/she wants to gain access to the article to hold it, maneuver it, play with it, or try it on (in the case of the article being eyewear or an article of clothing), the user can select the "UNLOCK" icon or button 255.

Upon pressing or clicking the selectable icon 255, a signal will be transmitted from the portable electronic device 400 to the locking system 1000 instructing the locking system 1000 to initiate unlocking of the locking assembly 200 associated with the selected product. The locking system 1000 may then cause the locking assembly 200 associated with the selected product to transition from the locked state to the unlocked state so that the user can gain access to that product.

In some embodiments, the user may be the consumer. Thus, the consumer may download the software application onto his/her portable electronic device 400 (smart phone, cell phone, tablet computer, laptop computer, personal digital assistant, a near field communication enabled credit or debit card, a Fob (such as those used as car keys and work and apartment building access keys), or any other portable electronic computing device that comprises and/or is connected to a wireless communication device, such an RFID tag/reader or NFC chip/tag, or the like, and use the software application to gain access to various ones of the products secured by the locking system 1000. In other embodiments, the user may be an employee at the store. In such embodiments, the employee may have the portable electronic device 400 that is configured to unlock various ones of the locking assemblies 200 of the locking system 1000. Depending on the amount of freedom that the particular retail store wants to provide to its customers, the retail store may be able to determine whether to enable consumers to access the products by themselves or whether they will require an employee to unlock the articles for the consumer. In either case, each article (pair of sunglasses) can be unlocked independently of the others. Thus, if the user wants to gain access to the article of eyewear 300*a*, the user can instruct the locking system 1000 to unlock the locking assembly 200 that is securing the article of eyewear 300*a*, and it will do so while leaving the remaining locking assemblies 200 locked.

Figure 11:
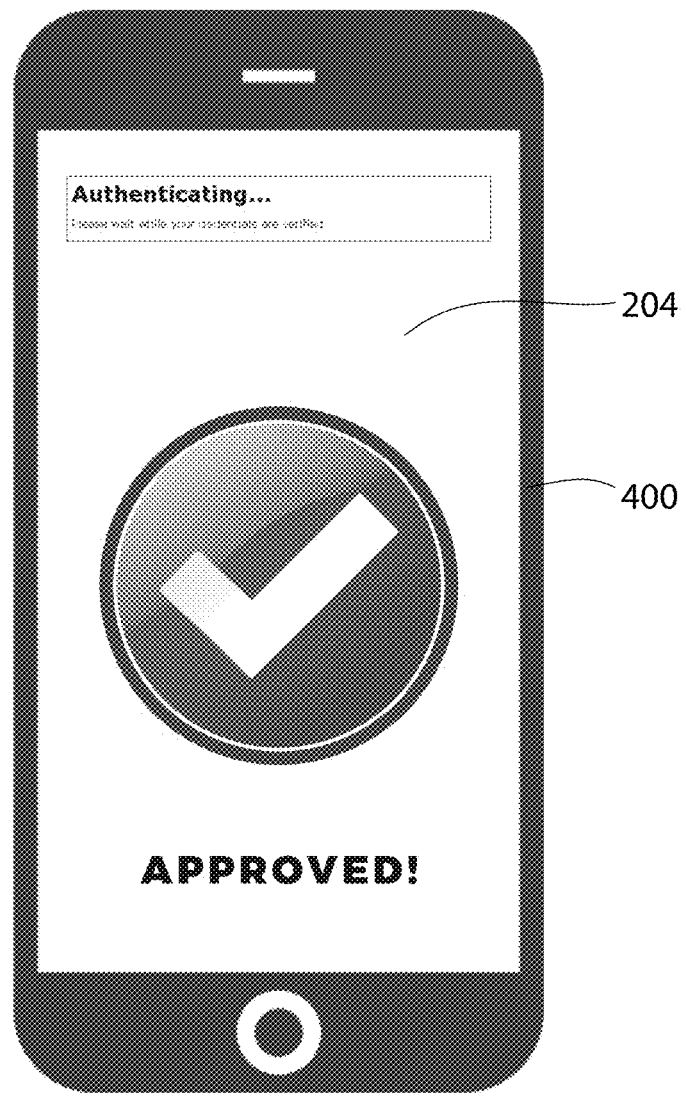
FIG. 11 is shows an authentication process for the unlocking one of the locking assemblies of the locking system, illustrated on a user interface of the portable electronic device.

Referring to FIG. 11, in some embodiments, before the locking system 1000 will cause the locking assembly 200 associated with the selected product to transition to the unlocked state, the locking system 1000 will determine whether the user/consumer is authorized to have access to the product. This authorization process or authentication process may take place immediately upon wireless communication being established between the user's portable electronic device 400 and the locking system 100 in some embodiments. In other embodiments, the authorization/authentication process will take place only after a user selects the selectable icon or button 255 to attempt to gain access to one of the products or articles held by the locking system 1000.

Thus, once the user clicks the selectable icon 255 (the word "UNLOCK" in the exemplified embodiment), the signal is sent to the locking system 1000 as previously stated. However, before the locking system 1000 unlocks the locking assembly 200 associated with the article that the user wants to access, the locking system 1000 performs an authorization/authentication process. If the user is a consumer, the authentication process may comprise confirming that the user has payment information associated with the software application so that if the user decides to purchase the article (or tries to leave the store with the article without paying) the locking system 1000 will be able to automatically charge the consumer for the article. If the user is an employee, the authentication process may comprise confirming that the user has employee credentials. If the article is an alcoholic beverage or some other product that has an age limit for purchase, the authentication process may comprise confirming that the user is old enough to legally purchase the product.

The portable electronic device 400 may contain, or may have access to, substantial amounts and/or varying types of personal and other identifying information of the consumer, such as the consumer's name, phone number, address, email address, contact list, application downloads, Internet searching history, recent product purchases, criminal background, SIM card serial numbers, payment and bank account information, portable electronic wallets, the VIN of a car owned by the consumer as well as its make, model, year, and price, hardware and network consumer registration profiles, social media accounts, pictures, place of employment, and more. Information/data may be stored on the memory of the portable electronic device 400 or on an external memory unit from which the portable electronic device 400 can access and retrieve the information/data such as any of the various servers or networks of servers that are referred to as being in the cloud. In certain embodiments the invention utilizes an application that resides on the portable electronic device 400 and the application has access to all the personal and identifying information of the consumer noted above, referred to herein collectively as consumer data, and more, such as by the consumer granting the application access to such information upon download.

The portable electronic device 400 may also contain, or have access to, financial account data for the consumer. The consumer's financial account data can include information about the consumer's bank account(s), credit card(s), Paypal account(s), Venmo accounts, mobile wallet(s), digital wallet(s), digital currency, cryptocurrency accounts, and any other information related to financial accounts of the consumer that may be used to purchase the article 300 if so desired. This financial account data may be encrypted and stored on the locking system 1000 for future use, encrypted and stored on the locking system 1000 only until the consumer returns the article 300 to the locking system 1000, or in some embodiments it may remain unencrypted. In some embodiments, the authorization/authentication process may comprise ensuring that the consumer has financial accounts that are accessible to the software application and which contain sufficient funds or access to funds that would be sufficient to pay for the article should the consumer not return the article to the locking system 1000. FIG. 11 illustrates the user interface 204 of the portable electronic device 400 upon the locking system 1000 determining that the consumer is approved to access the articles held by the locking system 1000.

In the exemplified embodiment, the process of unlocking is achieved using the portable electronic device 400. In other embodiments, biometrics may be used. Thus, the locking system 1000 may use facial recognition, fingerprints, finger geometry, iris recognition, vein recognition, retina scanning, voice recognition, DNA matching, or the like to determine whether to unlock the locking assemblies 200 in response to user/consumer request. This may be particularly useful when the user is an employee such that biometrics for the employee may be stored on the locking system 1000. Once authentication is complete (and approved) as shown in FIG. 11, the locking system 1000 will facilitate the unlocking of the locking assembly 200 that is securing the product that the user wants to gain access to. In some embodiments, the locking system 1000 may perform the authorization/authentication process before providing the user with a list of the products and/or allowing the user to scan a machine-readable code. In other embodiments, the locking system 1000 will perform the authorization/authentication process upon the user attempting to unlock one of the locking assemblies 200 as has been described herein.

Once the user has access to the product, the user may walk around the store with it, inspect it, play with it, try it on, or the like as the case may be. The locking system 1000 may store geographic boundaries such that if the user leaves the store or predefined boundaries, the locking system 1000 may automatically charge the user the price of the product. The locking system 1000 may alternatively or additional store time limits so that if the user does not return the article within a preset time limit, the locking system 1000 may automatically charge the user the price of the product using the financial account data which the locking system 1000 previously accessed during the authentication procedure. Details of such geographical boundaries and/or time limits are provided in U.S. Pat. No. 9,367,865, which was incorporated by reference above. The locking system 1000 may automatically charge the user the price of the product because the locking system 1000 may have access to the user's financial account data as described above.

Figure 12:
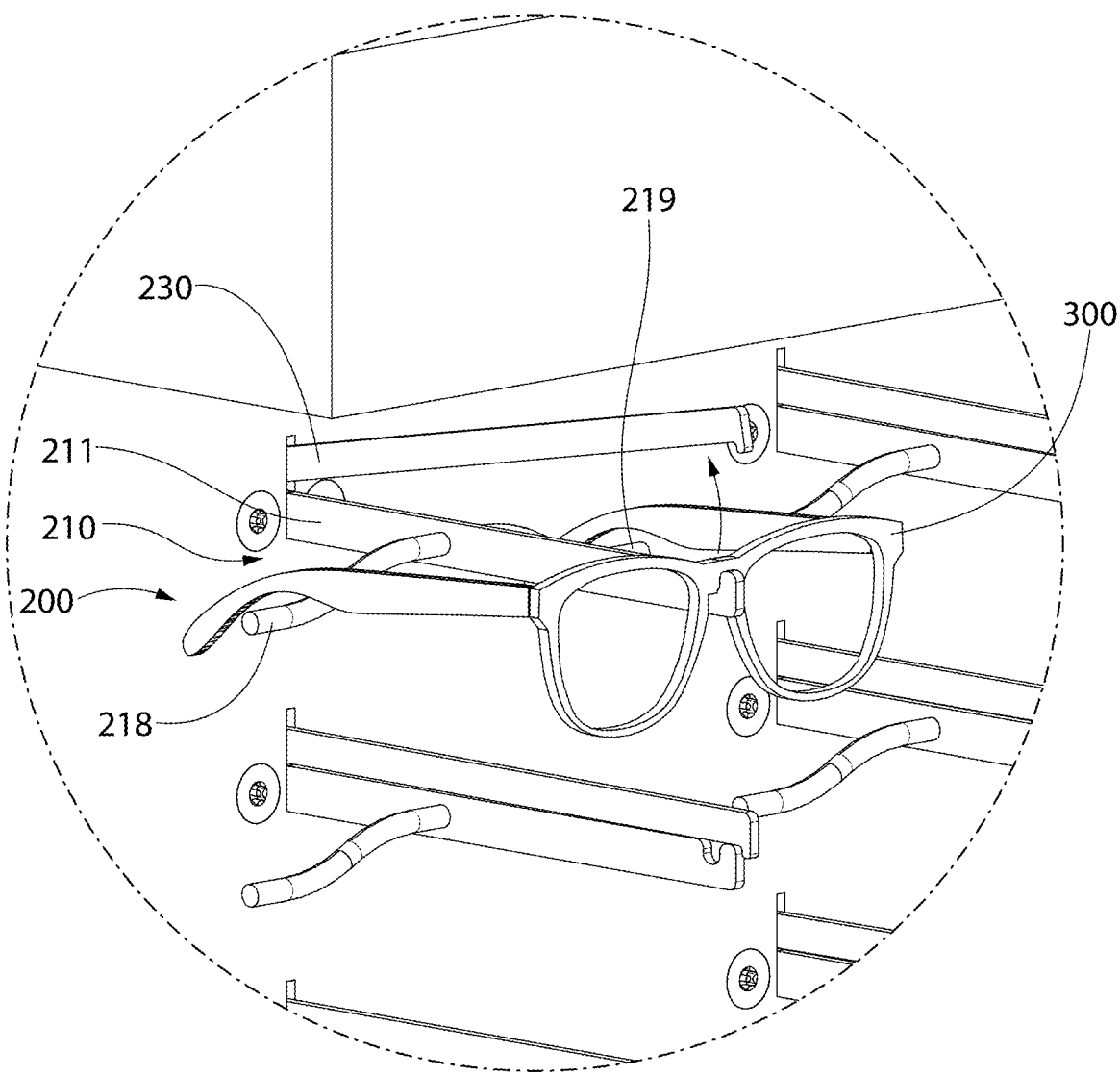
FIG. 12 is the close-up view of area XII of FIG. 9 illustrating one of the locking assemblies altering from the locked state to the unlocked state.
Figure 13:
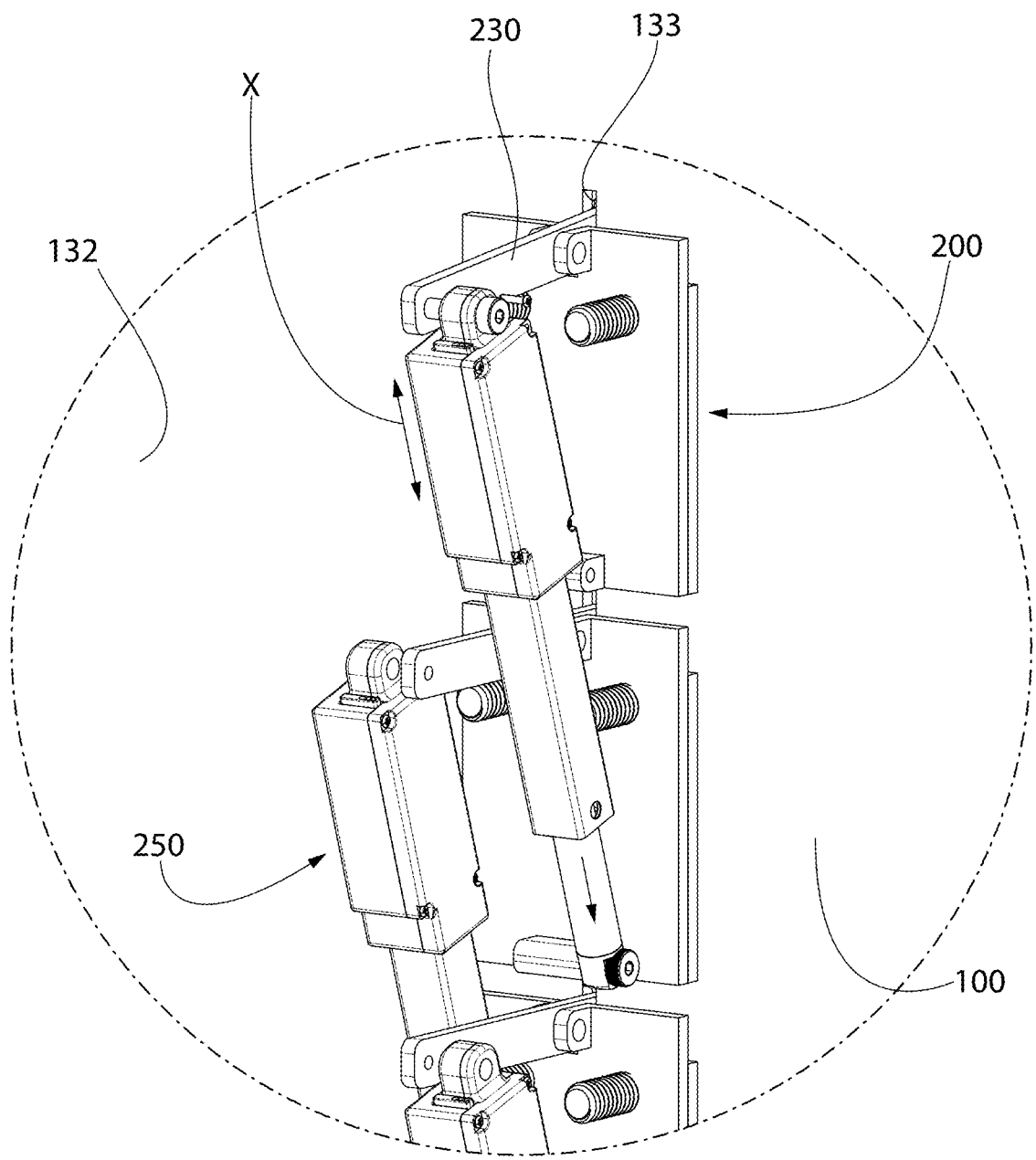
FIG. 13 is the close up view of FIG. 8 illustrating the actuator being actuated to unlock the locking assembly associated therewith.

Referring to FIGS. 9, 12 and 13, the unlocking process will be described with reference to the structural embodiment of the locking system 1000 and the locking assemblies 200 thereof. Specifically. FIG. 9 illustrates the portable electronic device 400 in operable communication with the locking system 1000. In this embodiment, the portable electronic device 400 sends instructions to the locking system 1000 to unlock the locking assembly 200 (upon a user selecting the "UNLOCK" button 255 on the user interface 204 of the portable electronic device 400 as noted above). In response, the locking system 1000 authenticates the user as described previously and then activates the actuator mechanism 250, which causes the second arm 230 of the locking unit 210 to move upwardly relative to the first arm 211 of the locking unit 210.

As best seen in FIGS. 12 and 13, once proper communication between the portable electronic device 400 and the locking system 1000 is achieved and the user instructs the locking system 1000 to unlock a particular one of the locking assemblies 200, the actuator mechanism 250 moves linearly downward and the second arm 230 of the locking unit 210 pivots upwardly away from the first arm 211. This moves the second arm 230 away from the first arm 211 so that the second arm 230 is no longer preventing the article 300 from being removed from the notch 217 of the first arm 230. Thus, once the second arm 230 has pivoted as shown in FIG. 12, a user can easily grasp the article of eyewear 300 and lift it up off the first arm 211. Thus, the second arm 230 is movable between a first position, shown in FIGS. 5 and 6, whereby the locking assembly 200 is in the locked state and the article is locked between the first and second arms 211, 230, and a second position, shown in FIGS. 9 and 12, whereby the locking assembly 200 is in the unlocked state and the article can be readily removed from the locking assembly 200.

It is important to note that in some embodiments the user/consumer is never required to come into physical contact with any part of the locking system 1000 when removing or returning the article 300. Rather, the user uses the portable electronic device 400 to instruct the locking system 1000 to alter one of the locking assemblies 200 from the locked state to the unlocked state. Once the locking assembly 200 is in the unlocked state, the user can readily remove the article of eyewear 300 (or other article or product) form the locking assembly 200 without any physical contact being made between the user and the locking assembly 200 or any other part of the locking system 1000. Thus, the user touches only the article 300 and nothing else. This can be important in certain embodiments for purposes of preventing the spread of virus, bacteria, germs, or the like. The second arm 230 moves automatically from the first position (locked) to the second position (unlocked) and then back from the second position (unlocked) to the first position (locked) all without the user making physical contact with the second arm 230 or any other part of the locking system 1000. That is, the user does not need to push a door closed or otherwise physically maneuver any part of the locking assembly 200 to alter it between the locked and unlocked states.

Figure 14:
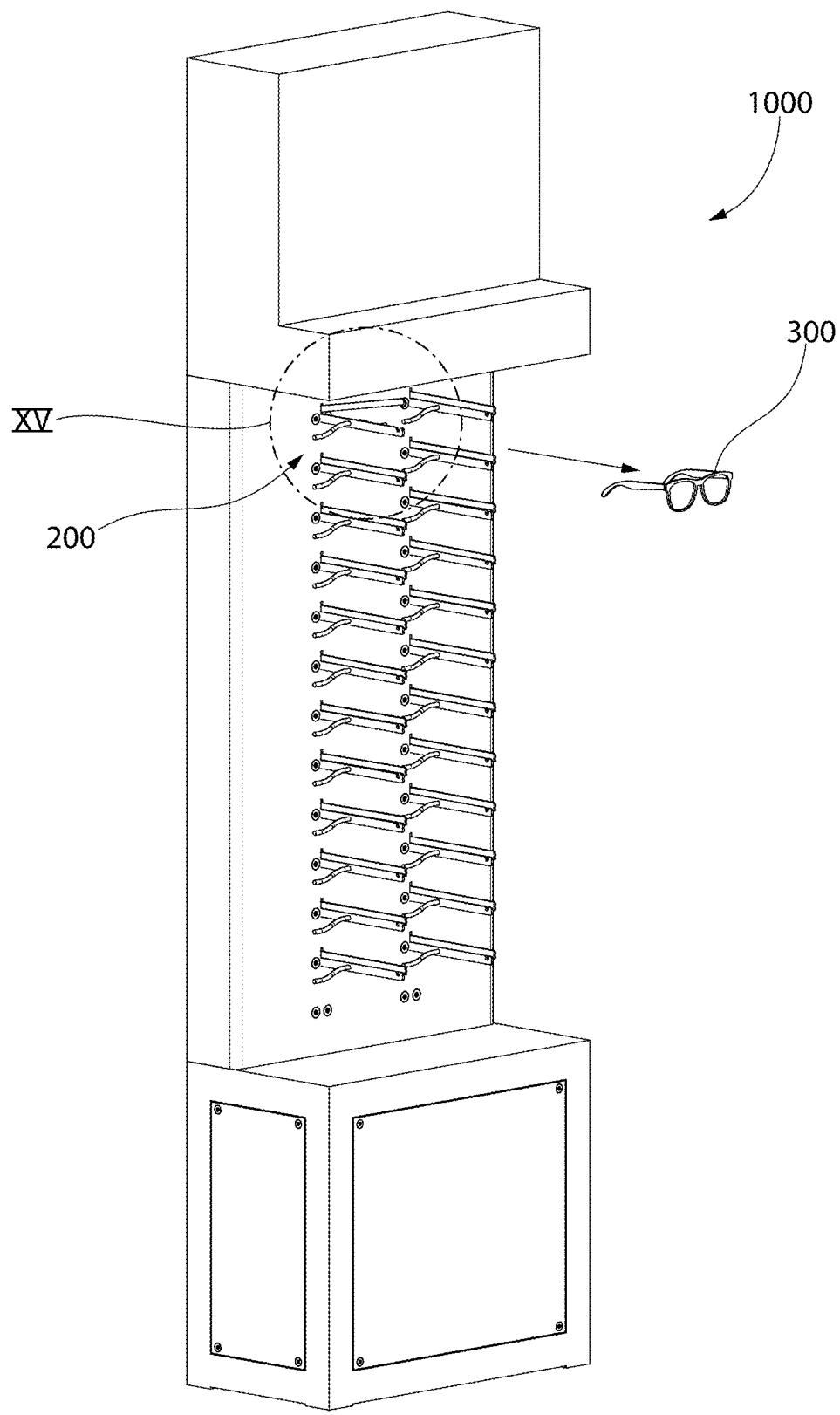
FIG. 14 is a perspective view of the locking system of FIG. 4 illustrating one of the locking assemblies in the unlocked state and the article being removed therefrom.
Figure 15:
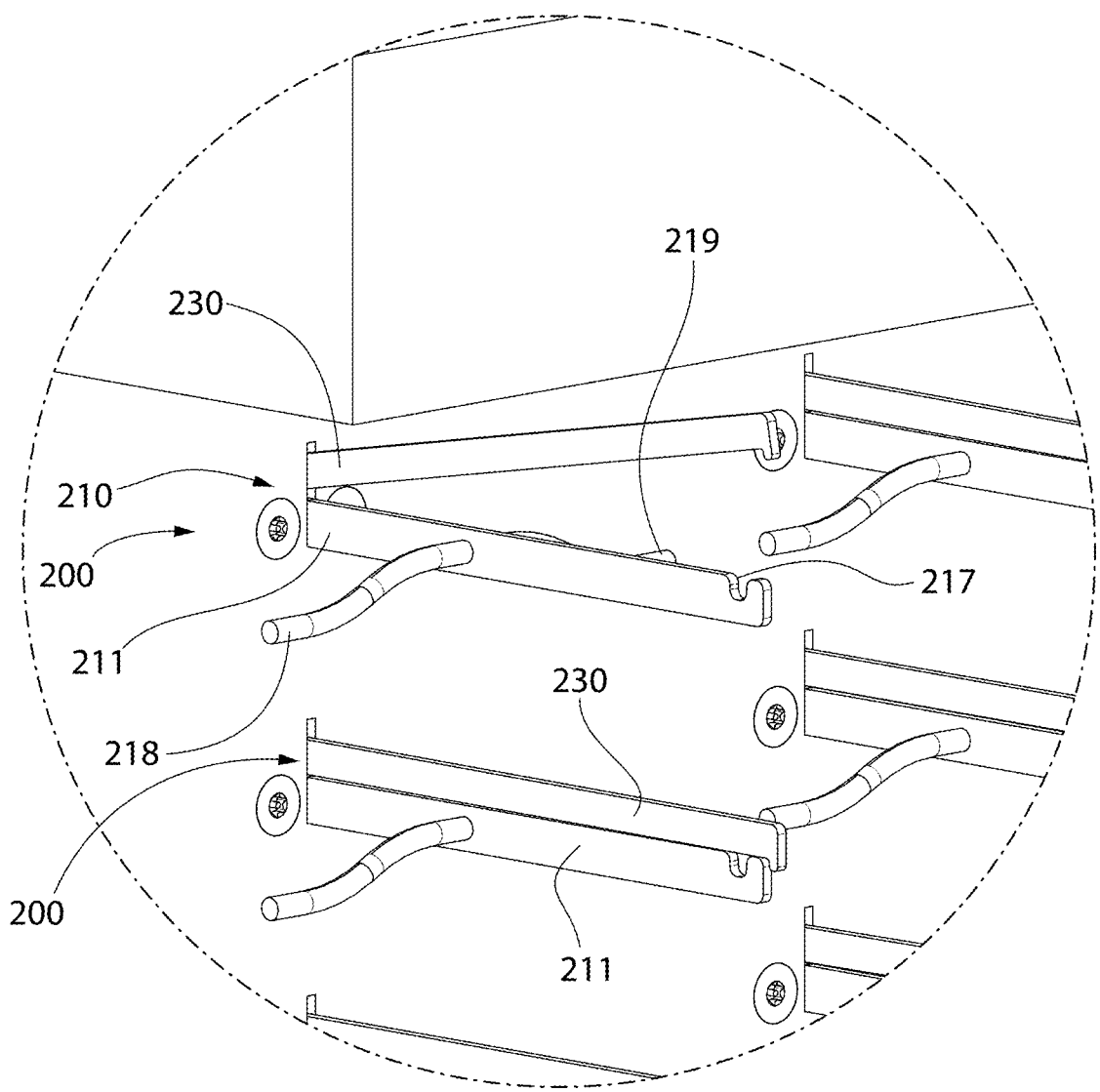
FIG. 15 is a close-up view of area XV of FIG. 14.
Figure 16:
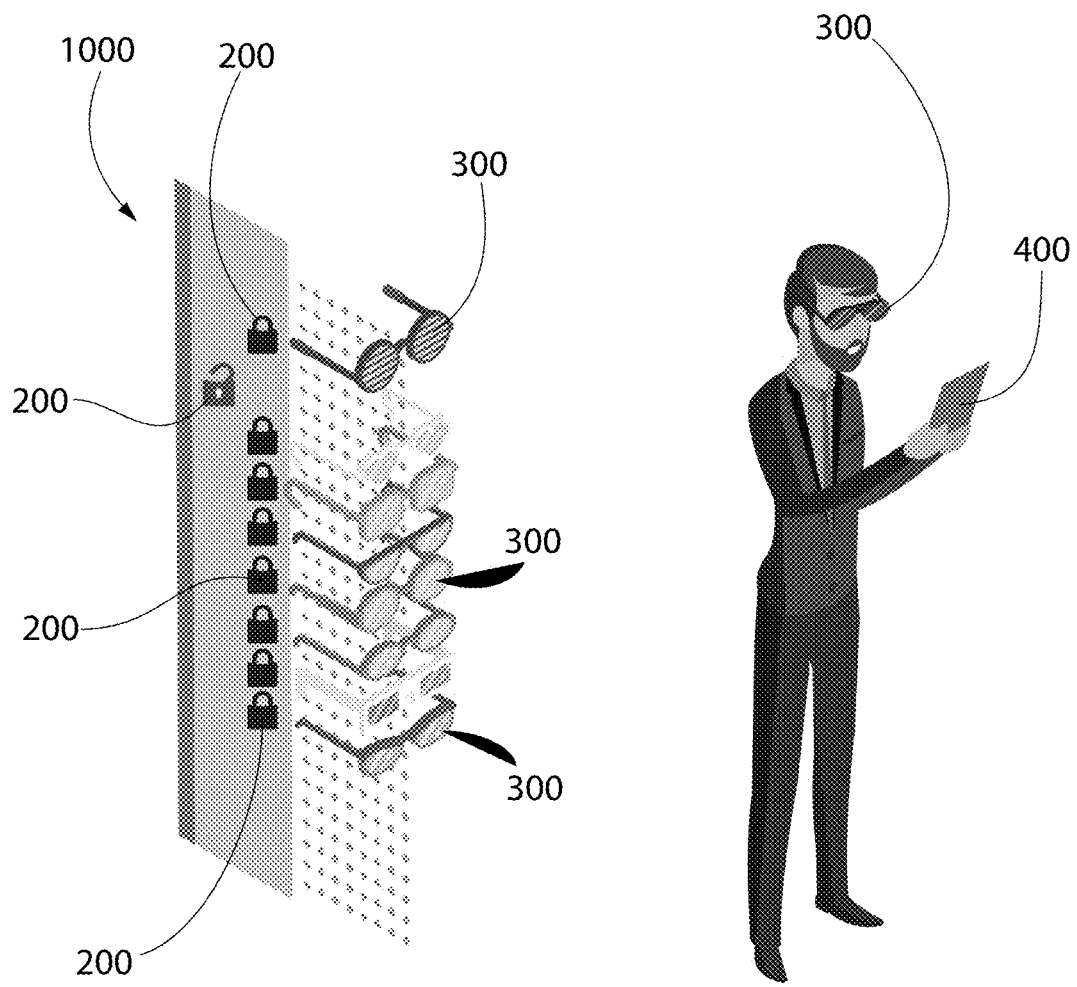
FIG. 16 is an illustration showing a consumer inspecting the article after removing the article from the locking system.

As mentioned above and shown in FIG. 14, once the locking assembly 200 has been altered into the unlocked state, the article of eyewear 300 can be removed from the locking system 1000 so that the user can handle, try on, or otherwise manipulate the article of eyewear 300 to determine if the user wants to purchase the article of eyewear 300. FIG. 15 is a close-up view of a portion of the locking system 1000 whereby one of the locking assemblies 200 is in the unlocked state and with the article of eyewear 300 has been removed to give a good illustration of the structure of the various components of the locking assembly 200. As has been described herein, any one of the locking assemblies 200 can be altered into the unlocked state independently from the others of the locking assemblies 200. In FIG. 15, the locking assembly 200 beneath the one that is in the unlocked state remains in the locked state, although no article is being held by the locking assembly 200 that is locked in this view. However, this illustrates that one of the locking assemblies 200 can be unlocked independently of the others while the other locking assemblies 200 remain locked. FIG. 16 is a rendering illustrating a consumer trying on the article of eyewear 300 after the consumer has used his portable electronic device 400 to unlock the locking assembly 200 to gain access to the article of eyewear 300. In FIG. 16, the consumer is viewing himself in the camera of his portable electronic device 400 to determine whether he wants to purchase the article of eyewear 300. As shown in FIG. 16, while one of the locking assemblies 200 is unlocked, the remaining locking assemblies 200 remain locked and holding an article of eyewear 300.

Figure 17:
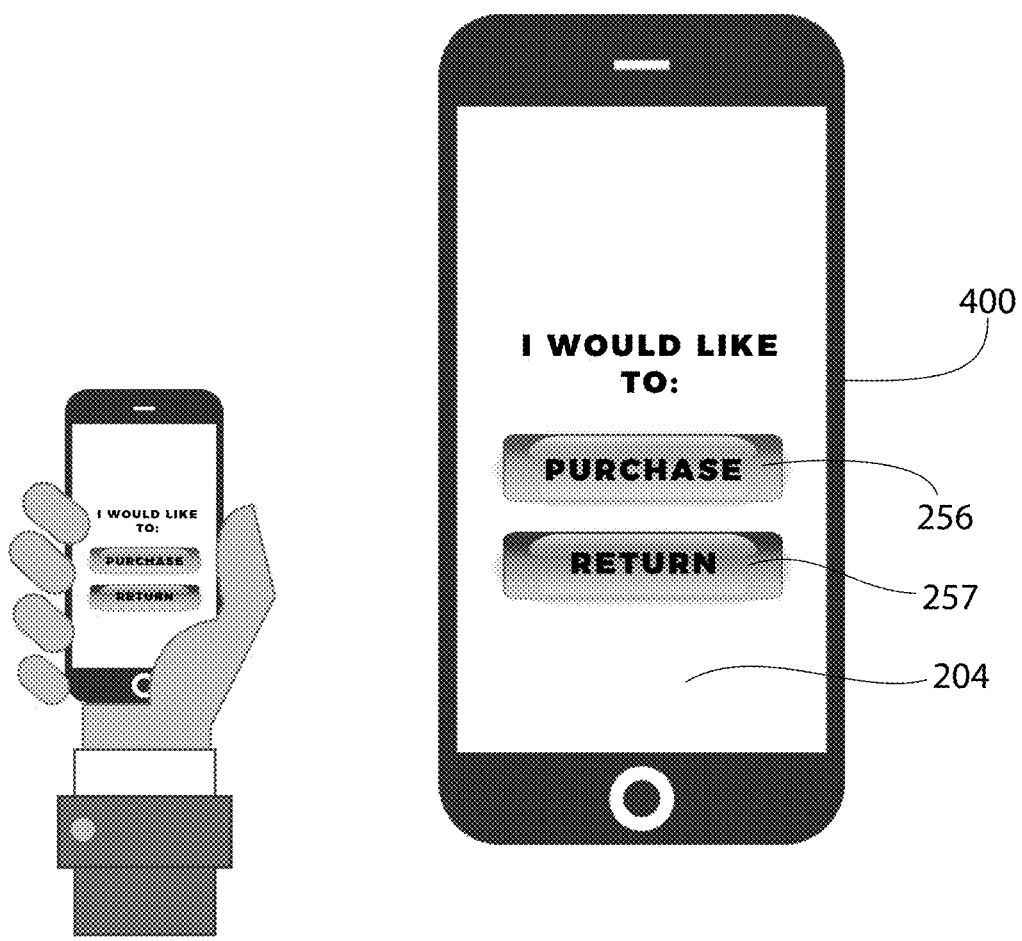
FIG. 17 is an illustration showing purchase and return options on a user interface of the portable electronic device.

Referring to FIG. 17, after the user has gained access to the article 300, the user will be able to purchase the article 300 or return the article 300 to the locking system 1000 using the portable electronic device 400, and particularly the software application 210 thereon. Specifically, upon the user gaining access to the article 300, the display 204 on the portable electronic device 400 will display an option for the user to purchase or return the article. Thus, in FIG. 17 the display 204 of the portable electronic device 400 includes a purchase button 256 and a return button 257. As most portable electronic devices 400 have a touch screen display, a user can use his/her finger to click or touch the purchase button 256 or the return button 257 depending on whether the user wants to purchase the article 300 or not purchase the article. If the user wants to purchase the article 300, the user will touch the purchase button 256. This may bring up another page on the display 204 of the portable electronic device 400 asking the user to select from various payment options (credit card, debit card, bank account, Apple Pay, PayPal, Venmo, Google Wallet, cryptocurrency, etc.). Alternatively, in some embodiments the locking system 1000 may only be able to accept one type of payment (for example, PayPal), and thus upon selecting the purchase button 256 the locking system 1000 will automatically charge the price of the article 300 to the user's PayPal account. Upon completing a purchase, a receipt may be emailed to the user.

Figure 18:
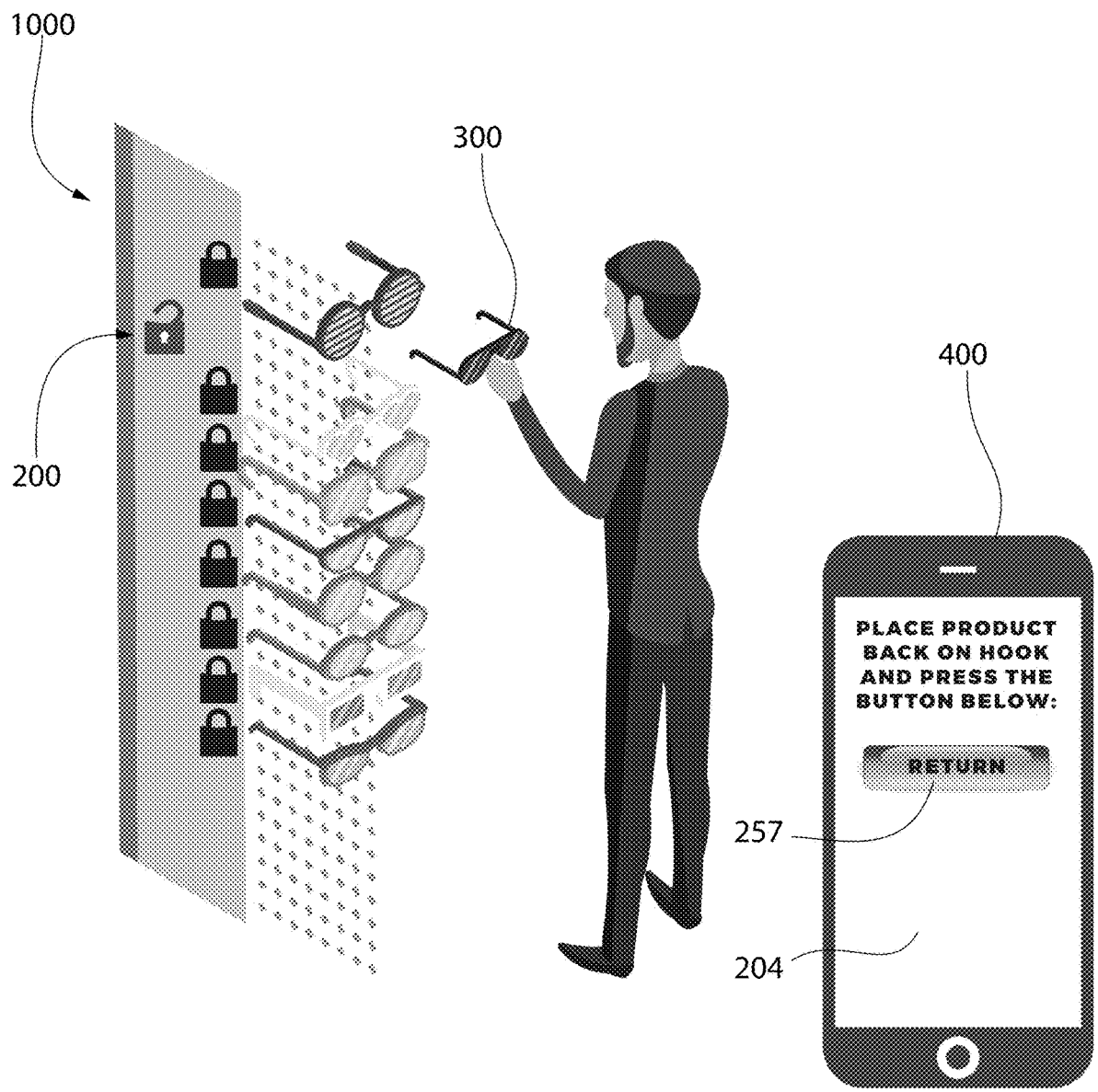
FIG. 18 is an illustration showing a consumer returning the article to the locking system including an illustration of a user interface of the portable electronic device.

Referring to FIG. 18, if the user clicks the return button 257, the user will then be instructed (potentially with text on the display 204 of the portable electronic device 400) to place the article 300 back on the first arm 211 of the locking assembly 200 from which it was previously removed. In some embodiments, that particular locking assembly 200 will remain unlocked until the user either purchase or returns the item. In other embodiments, that particular locking assembly 200 will automatically lock once the user removes the article 300 from the locking assembly 200, and will once again unlock when the user decides to return the article 300 to the locking assembly 200. In still other embodiments, the same locking assembly 200 may not be used for the return. Rather, the Hocking system 1000 may unlock any of the locking assemblies 200 that are not currently holding product so that the user can return the article to that locking assembly 200. The locking system 1000 (and/or the server 502) will update its inventory list to indicate which locking assembly 200 is holding the article 300 that the user removed.

Either way, upon the user returning the article 300 to the locking assembly 200, the locking system 1000 will cause the locking assembly 200 to alter from the unlocked state to the locked state 200. There are several techniques that can be used to determine if the correct product is being returned to the locking system 1000. Some examples include determining if the product has the same weight as the one that was removed, including an optical scanner and optical code for the particular product, using cameras or other imaging techniques, or the like.

In some cases, if the user purchases the article 300, the locking assembly 200 may remain unlocked until an employee restocks that locking assembly 200 with another item or otherwise instructs the locking assembly 200 to return to the locked state (even without restocking in some embodiments). In other embodiments, the locking assembly 200 may lock as soon as the user removes the article 300 from the locking assembly 200, and it may remain locked until the user returns the article 300 or an employee initiates a restocking procedure.

Additional details about the purchase and return process are provided in United States Patent Publication No. 2019/0213812, filed on Dec. 21, 2018, the entirety of which is incorporated herein by reference.

The retail security system 500 may include a sanitizing component, such as a sanitizing system, which will be described below with reference to FIGS. 19-21 (and FIGS. 19A, 20A, and 21A). It has become increasingly important for traditional brick-and-mortar retailers to enable and encourage consumers to interact with and test products in a fun, entertaining, interactive and exciting environment in order to complete a sale. However, health and safety concerns (for example, pandemics like COVID-19) require consumers and employees to take health and safety measures to help kill viruses, germs, and/or bacteria and to help prevent the spread of illness and diseases. Thus, the sanitizing system(s) described herein provides such safety measures, particularly when used in conjunction with the locking system 1000 described herein. Thus, in some embodiments the retail locking system 500 may comprise the locking system 1000 and a sanitizing system, and it may also include the portable electronic device 400 as described above.

The sanitizing systems described herein may be used to disinfect, sterilize, purify and/or sanitize articles, goods and/or products while allowing consumers and/or employees to access and handle disinfected articles, while at the same time avoiding contact with other objects, consumer(s) and/or employee(s) that may be contaminated with viruses, germs, bacteria and/or other harmful elements. Generally, these sanitizing systems may disinfect, sterilize and/or otherwise sanitize articles, thereby killing germs, viruses and bacteria to prevent the spread of illness and disease to consumers and/or employees who desire to access and handles articles. Briefly, an article (any article for sale) may be secured via one of the locking assemblies 200 described above. A sanitizing system (e.g., ultraviolet light, electrostatic, air scrubbing, fogging mist and/or gel block systems) may be included that is configured to sanitize, disinfect, or the like the article in between uses or contact by various users. In one aspect of the invention, the consumer and/or employee will be able to access an article from the locking assembly 200 without making any contact whatsoever with the actual locking assembly 200 and/or any other objects and/or other human beings (this has been described above). After the consumer and/or employee accesses and/or handles the article, the sanitizing system may disinfect, sterilize and/or otherwise sanitize the article either at set intervals each day, after each time an article is accessed and/or handled, and/or at other designated times to be determined by the administrator of the system.

In some specific embodiments, the sanitizing system may be activated each time a user/consumer accesses an article 300 and then returns the article 300 to the locking system 1000. That is, a user can use the portable electronic device 400 to cause the locking system 1000 to unlock one of the locking assemblies 200 so that the user can access the article 300 held thereby as described in great detail above. If the user decides not to purchase the article 300, the user will return the article 300 to the locking system 1000. Upon the user returning the article 300 to one of the locking assemblies 200 of the locking system 1000, the sanitizing system may be activated to perform a sanitizing procedure to sanitize the article 300 that was just returned to the merchandize locking system 1000. This way, each time a user accesses and touches an article and then returns it to the locking system 1000, the article will be automatically sanitized by the retail security system 500. Moreover, in some embodiments the locking assembly 200 holding the article 300 that was just returned and is being sanitized will be prevented from being altered from the locked state to the unlocked state until the sanitizing procedure is complete. Thus, for example, if the sanitizing procedure takes five minutes, the locking assembly 200 will not unlock for at least five minutes so that the entire sanitizing procedure can be completed before a new user can gain access to the article. This will ensure that disease will not be spread from one user to another via the articles. Furthermore, as noted above, the user can access the articles without making any contact with the locking system 1000, thereby also limiting the spread of disease. However, the sanitizing system may also sanitize the locking assemblies 200 when sanitizing the articles.

Figure 19:
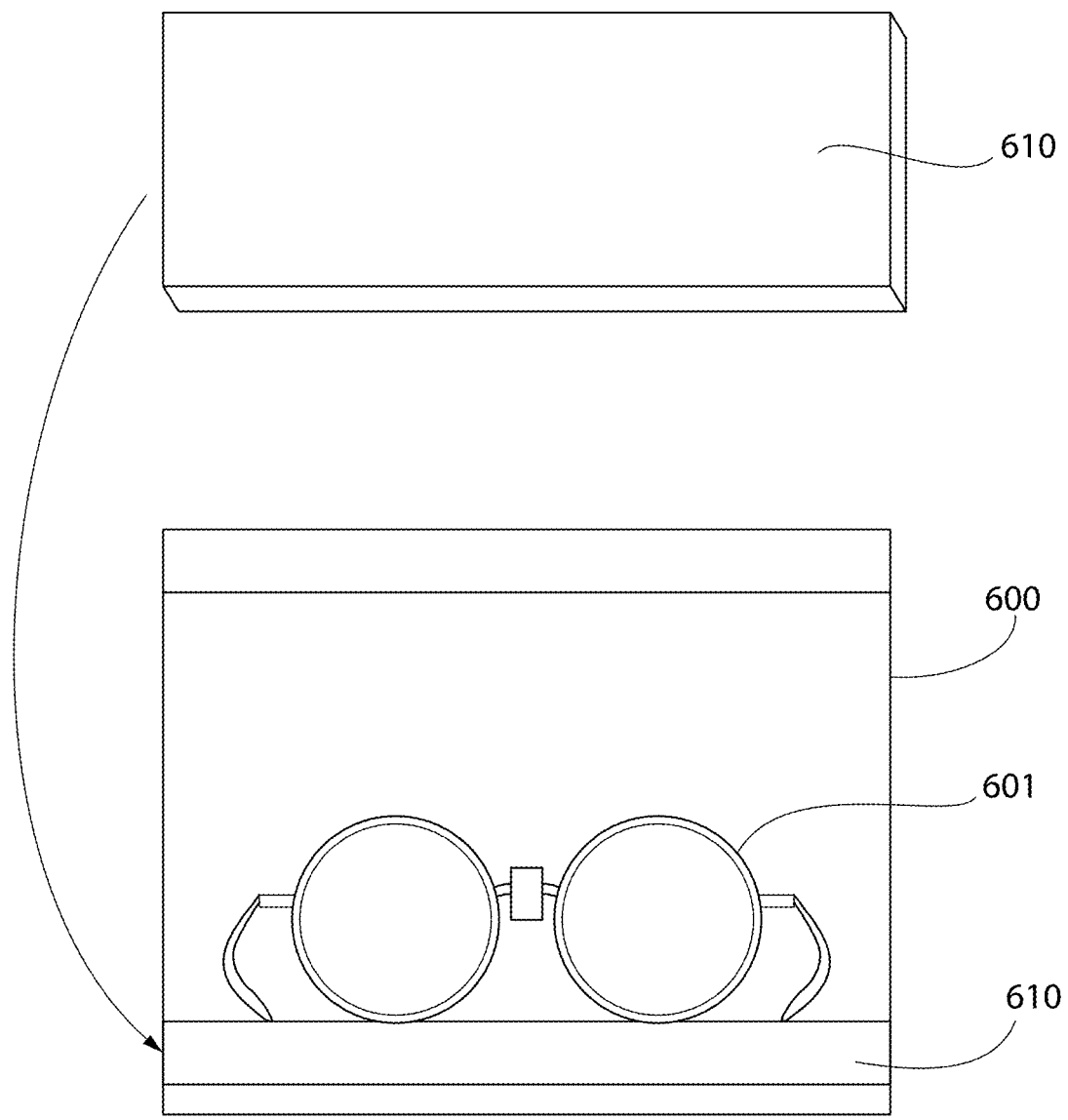
FIG. 19 is a schematic illustration of a sanitizing system in accordance with an embodiment of the present invention.

Referring to FIG. 19, an individual locking assembly 600 is illustrated. In FIG. 19, the locking assembly 600 is a box, container, cubicle, or the like, although it could take on any structural form in other embodiments. The locking assembly 600 may have a door that is alterable between a closed/locked state and an open/unlocked state, although the invention is not to be limited to this structural embodiment in all embodiments. The locking assembly 600 is merely exemplified generically in FIG. 19 for purposes of describing the sanitizing system associated therewith. In FIG. 19, there is an article of eyewear 601 located within the locking assembly 600. The locking assembly 600 may be altered between locked and unlocked states using a portable electronic device or otherwise as described herein above.

In FIG. 19, the sanitizing system comprises a gel block 610 that is disposed within the locking assembly 600. In the exemplified embodiment, the gel block 610 is positioned within the locking assembly 600 below the article 601. However, the invention is not to be so limited and the gel block 610 may be positioned elsewhere adjacent to the article 601, such as above, below, adjacent to, or around the article 610. In some embodiments, the gel block 610 may coat some or all of the walls of the interior of the locking assembly 600.

The gel block 610 may be a block or sheet of material that comprises disinfecting or sanitizing chemicals. Thus, the gel block 610 may emit the sanitizing or disinfecting chemicals into the interior of the locking assembly 600 and onto, along, or around the article 601, thereby eliminating and killing germs, bacteria and viruses on the article 601 in the locking assembly 600. The gel block 610 may be removable in some embodiments such that the gel block 610 can be replaced upon expiration of its useful life (e.g. no longer emitting chemicals needed to eliminate and kill germs, viruses, and/or bacteria). The particular shape, size, and configuration of the gel block 610 may be dictated by the size and type of locking assembly or locking unit it is to be used with. Any type of locking unit may be used depending on the needs of the particular retail environment in which the locking unit is to be used. The locking assemblies 200 described above with reference to FIGS. 5-8 are examples of the types of locking units that could be used, although the invention is not limited to those implementations and others are possible and fall within the scope of the invention described herein, including those shown and described in U.S. Pat. No. 9,367,865.

Figure 19A:
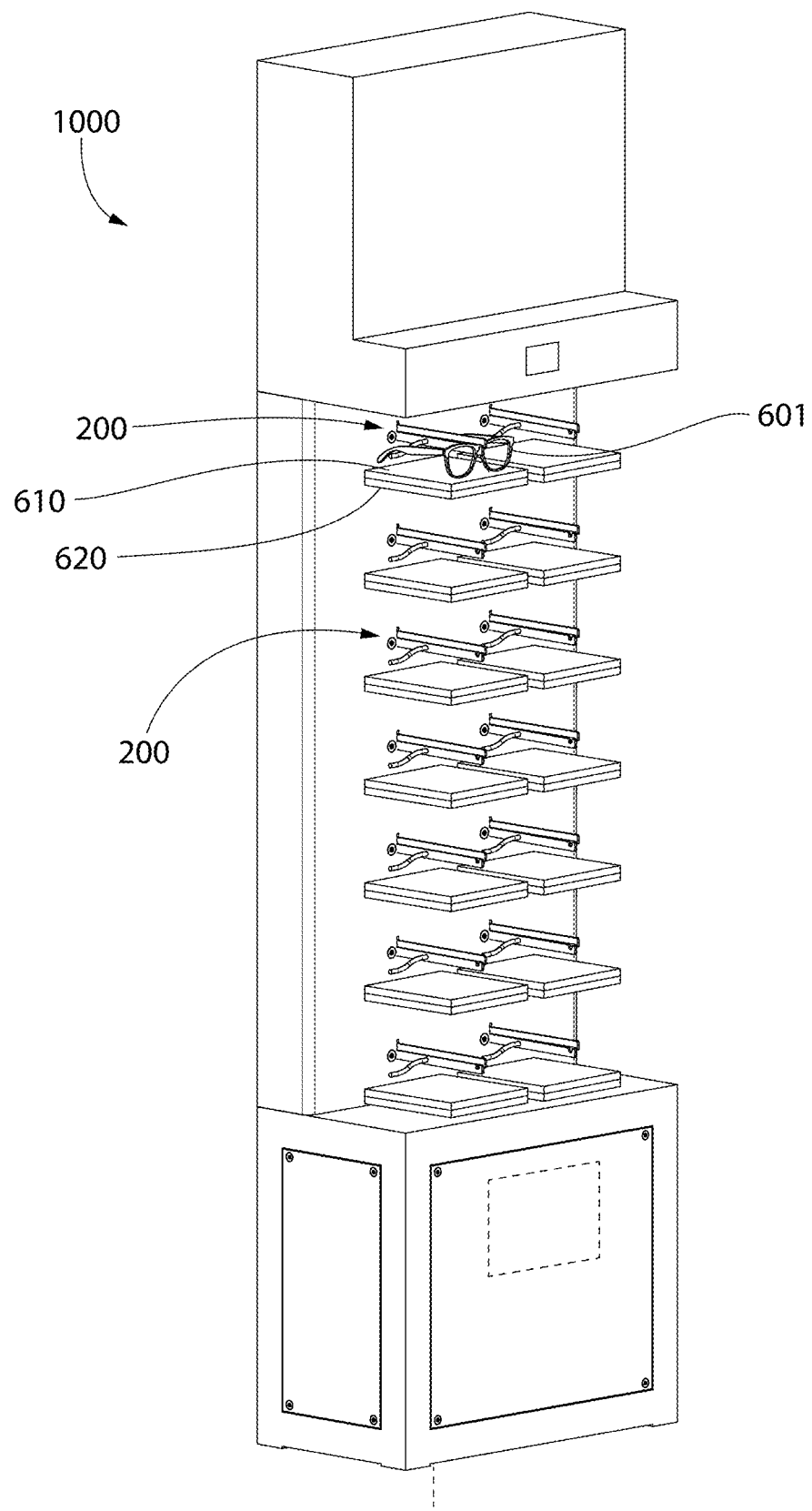
FIG. 19A is a perspective view of the locking system of FIG. 5 with the sanitizing system of FIG. 19 incorporated therein.

Referring to FIG. 19A, the gel block 610 is illustrated being used with the locking system 1000 described above. In one particular embodiment, the locking system 1000 may comprise a plurality of shelves 620 so that each of the shelves 620 is located above, below, or adjacent to one of the locking assemblies 200. In this embodiment, the sanitizing system may comprise one of the gel blocks 610 being positioned on each of the shelves 620 so that the gel block 610 can sanitize or otherwise disinfect the article 601 being held by the locking assembly 200 that the gel block 610 is adjacent to. Thus, the sanitizing system may comprise a plurality of sanitizing devices, such that each of the gel blocks 610 forms one of the sanitizing devices. Each of the gel blocks 610 (i.e., each of the sanitizing devices) is configured to sanitize one of the articles 601 held by one of the locking assemblies 200.

In this particular embodiment, the gel block 610 may be continuously dispensing sanitizing/disinfecting chemicals. Thus, there is no timing associated with the sanitizing or disinfecting of the articles 601, but rather the gel block 610 is continuously sanitizing/disinfecting the articles 601 as they remain locked on the locking assemblies 200 of the locking system 1000. The gel block 610 may be a consumable, meaning it will shrink in size and eventually dissipate over time as more of the chemicals are dispensed therefrom.

Although FIG. 19A illustrates one exemplary embodiment of the present invention, in alternative embodiments the sanitizing system may include just one of the gel blocks 610. For example, a single gel block may be positioned above the uppermost locking assemblies 200 so that as the gel block dispenses its chemicals, all of the articles 601 are sanitized simultaneously. In some embodiments, the gel blocks 610 may be activated in some way, such as by applying power thereto, applying light thereto, or the like. In such embodiments, the gel blocks 610 are only dispensing their chemicals at certain predetermined times. For example, the gel blocks 610 may dispense chemicals only at night after the store has closed. In other embodiments, the gel blocks 610 may dispense the chemicals each time one of the articles 601 is returned to the locking system 1000. In some embodiments, the gel blocks 601 may be activated independently so that only the gel block 610 associated with one of the articles 300 that has been returned to the locking system 1000 is activated.

Figure 20:
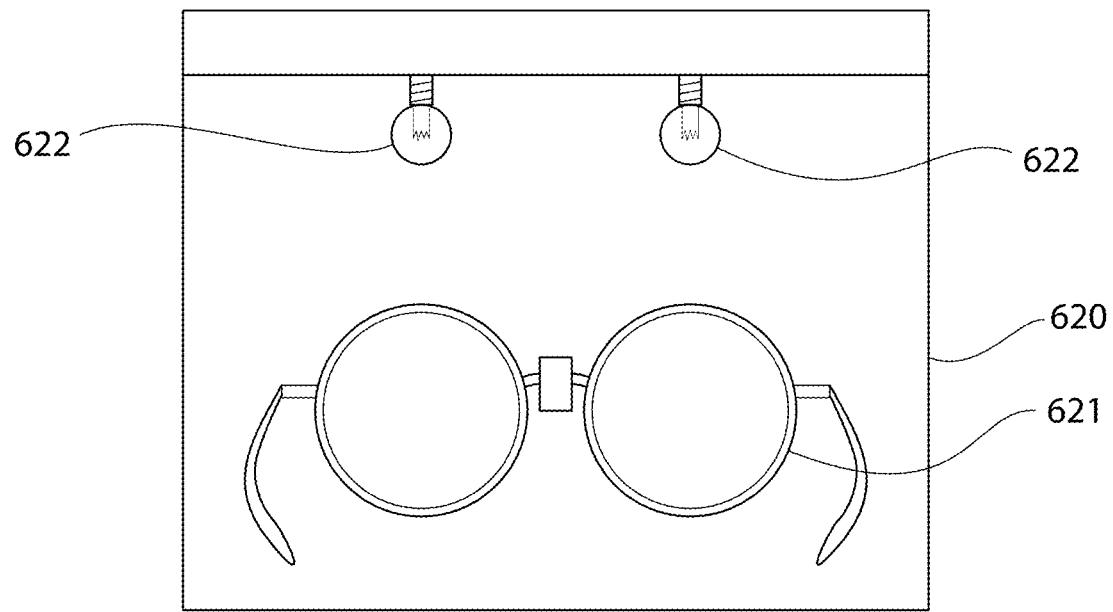
FIG. 20 is a schematic illustration of a sanitizing system in accordance with another embodiment of the present invention.

Referring to FIG. 20, an individual locking assembly 620 is illustrated. In FIG. 20, the locking assembly 620 is a box, container, cubicle, or the like much like the locking assembly 600 of FIG. 19. The locking assembly 620 may have a door that is alterable between a closed/locked state and an open/unlocked state. However, the locking assembly 620 may take on any structural form in other embodiments. The locking assembly 620 is merely exemplified generically in FIG. 20 for purposes of describing the sanitizing system associated therewith. In FIG. 20, there is an article 621 located within the locking assembly 620. The article 621 is eyewear in the exemplified embodiment, but could be any other article for sale in a retail environment such as those mentioned herein in other embodiments. The locking assembly 620 may be altered between locked and unlocked states using a portable electronic device or otherwise as described herein above.

In this embodiment, the sanitizing system comprises one or more sanitizing lights 622 (there are two of the sanitizing lights 622 in the exemplified embodiment, but there could be one or more than two in other embodiments) arranged in the locking assembly 620 and oriented to emit light onto the article 621. In the exemplified embodiment, the sanitizing lights 622 are positioned above the article 621 so that the light or other electromagnetic radiation emitted by the sanitizing lights emits downwardly onto the article 621. However, the invention is not to be so limited in all embodiments and the sanitizing lights 622 may be positioned on the floor or sidewalls of the locking assembly 620 in other embodiments so long as light or electromagnetic radiation emitted by the sanitizing lights 622 is emitted onto the article 621 for purposes of sanitizing the article 621. Thus, the sanitizing lights 622 may placed above, below, adjacent to and/or around the article 621.

In one embodiment, the sanitizing lights 622 are ultraviolet lights. For example, the sanitizing lights 622 may emit ultraviolet light, or UV-C light (i.e., germicidal UV). Thus, the sanitizing lights 622 may emit ultraviolet light having a wavelength between 200 nm and 280 nm in some embodiments. While UV-C light may be best for killing bacteria and viruses, UV-A and UV-B light may also kill some bacteria and viruses and therefore the sanitizing lights 622 may emit UV-A or UV-B light instead or in addition to the UV-C light. The sanitizing lights 622 may emit light having a wavelength between 100 nm and 380 nm in some embodiments (UV-A light is 320-400 nm, UV-B light is 280-320 nm, and UV-C light is 200-280 nm).

The ultraviolet light emitted by the sanitizing lights 622 is configured to kill germs, bacteria and viruses on the article 621 that is positioned in the particular locking assembly 620. The sanitizing lights 622 may be removable and replaceable upon expiration of the useful life of the sanitizing lights 622 (e.g. no longer illuminating to eliminate and kill germs, viruses, and/or bacteria). The particular shape, size, and configuration of the sanitizing lights 622 may be dictated by the size and type of locking unit it is to be used with. Any type of display unit may be used depending on the needs of the particular retail environment in which the locking unit is to be used.

Figure 20A:
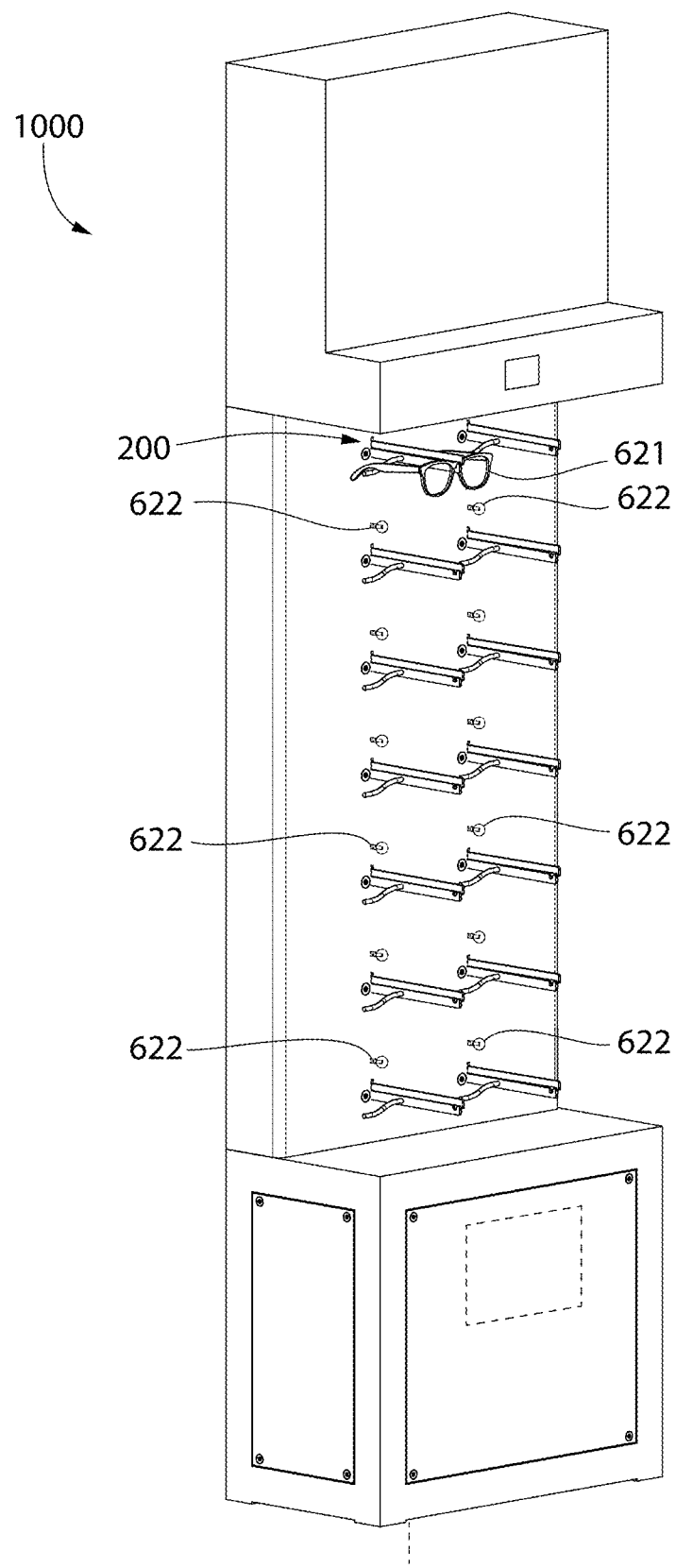
FIG. 20A is a perspective view of the locking system of FIG. 5 with the sanitizing system of FIG. 20 incorporated therein.

Referring to FIG. 20A, the sanitizing lights 622 are illustrated being used with the locking system 1000 described above. In one particular embodiment, the sanitizing system comprises one or more sanitizing lights 622 positioned above (or below, next to, around, or the like) each locking assembly 200 and hence each locked article 621. Thus, the sanitizing lights 622 may be operated in various different ways. In one embodiment, the sanitizing lights 622 may be continuously powered on so that they are constantly sanitizing the articles 621 that are held by the locking system 1000. In some embodiments, the sanitizing lights 622 may be powered on only when it is confirmed that the locking assembly 200 associated with the sanitizing lights 622 is holding one of the articles 621. Thus, the locking system 1000 may determine whether the locking assembly 200 is holding an article 621 in a locked state. If the locking assembly 200 is holding the article 621, then the sanitizing lights 622 will be activated and powered on to sanitize the article 621. If it is determined that the locking assembly 200 is not holding an article, then the sanitizing lights 622 will be powered off and/or deactivated because there is no article to sanitize. In some embodiments, the locking system 1000 may control activation and deactivation of the sanitizing lights 622. In other embodiments, an external processor or server may control activation and deactivation of the sanitizing lights 622.

In some embodiments, the sanitizing lights 622 may only be powered on for a predetermined period of time starting immediately after an article 621 is returned to the locking assembly 200 associated with the sanitizing lights 622. Thus, for example, a consumer may unlock one of the locking assemblies 200 and remove the article 621 that was held by the locking assembly 200 to play with and/or otherwise manipulate it. After awhile, the consumer may decide he does not want to purchase the article 621 and may return the article to the locking assembly 200 (potentially in a contactless manner using a portable electronic device 400 as has been described above). Upon the consumer returning the article 621 to the locking assembly 200, the retail security system 500 may activate the sanitizing lights 622 that are associated with that particular locking assembly 200 to sanitize the article 621 that has just been replaced onto the locking assembly 200. The sanitizing lights 622 may need to operate for a certain amount of time in order to effectively kill all bacteria and/or virus that could potentially be on the article 622 (e.g., five minutes, ten minutes, or the like). Thus, upon the sanitizing lights 622 being activated, the locking assembly 200 associated with those sanitizing lights 622 may be prevented from being altered from the locked state to the unlocked state until after expiration of the predetermined time period. That is, in some embodiments the locking assembly 200 is prevented from being altered from the locked state to the unlocked state while the sanitizing lights 622 associated with that locking assembly 200 are powered on/activated.

In some embodiments, there may be a single set of sanitizing lights 622 (not limited to an exact number of lights, but they may all operate together and be on/off at the same time) for the entire locking system 1000. Thus, in such an embodiment, the sanitizing lights 622 may be activated to sanitize all of the articles 621 simultaneously either at set intervals (every hour or the like), at predetermined times of the day (at noon, 3 PM, 6 PM, etc.), in the evening or overnight hours when the retail establishment is closed, or each time any article 621 is returned to the locking system 1000. In such an embodiment, all of the locking assemblies 200 may remain locked while the sanitizing lights 622 are activated.

Figure 21:
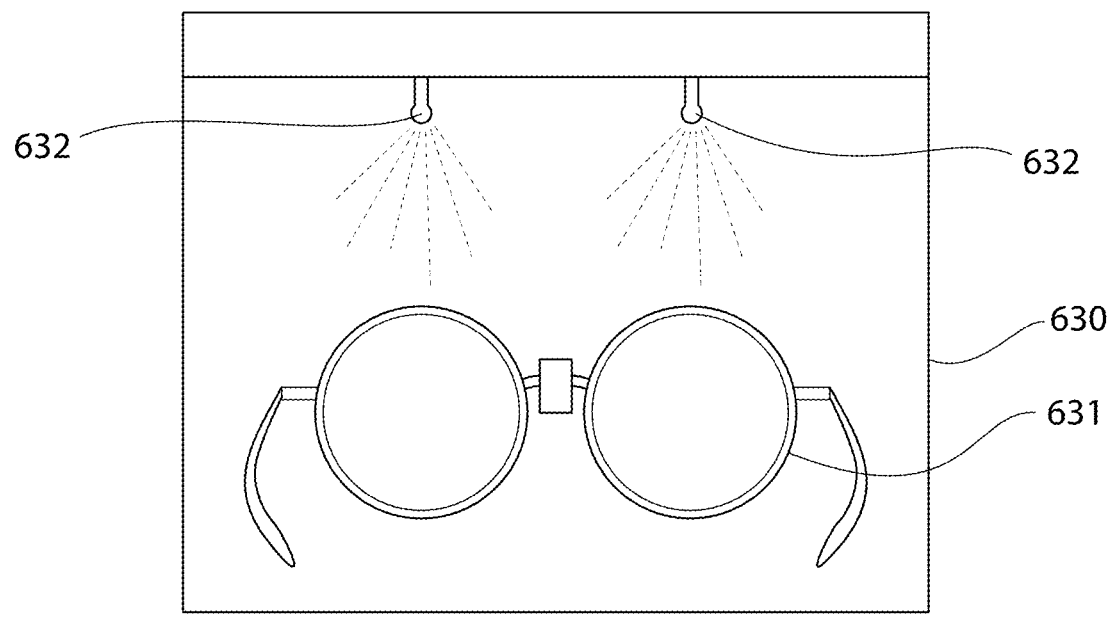
FIG. 21 is a schematic illustration of a sanitizing system in accordance with yet another embodiment of the present invention.

Referring to FIG. 21, an individual locking assembly 630 is illustrated. In FIG. 21, the locking assembly 630 is a box, container, cubicle, or the like much like the locking assembly 600 of FIG. 19. The locking assembly 630 may have a door that is alterable between a closed/locked state and an open/unlocked state. However, the locking assembly 630 may take on any structural form in other embodiments. The locking assembly 630 is merely exemplified generically in FIG. 21 for purposes of describing the sanitizing system associated therewith. In FIG. 21, there is an article 631 located within the locking assembly 630. The article 631 is eyewear in the exemplified embodiment, but could be any other article for sale in a retail environment such as those mentioned herein in other embodiments. The locking assembly 630 may be altered between locked and unlocked states using a portable electronic device or otherwise as described herein above.

In this embodiment, the sanitizing system comprises one or more misting and/or fogging units 632 (there are two of the misting units 632 in the exemplified embodiment, but there could be one or more than two in other embodiments) arranged in the locking assembly 630 and oriented to spray a mist or fog containing sanitizing or disinfecting chemicals onto the article 631. In the exemplified embodiment, the misting units 632 are positioned above the article 631 so that the mist, fog, or spray generated by the misting units 632 flows downwardly onto the article 631. However, the invention is not to be so limited in all embodiments and the misting units 632 may be positioned on the floor or sidewalls of the locking assembly 630 in other embodiments so long as the mist/fog/spray emitted by the misting units 632 is emitted onto the article 631 for purposes of sanitizing the article 631.

The misting units 632 may comprise a spray nozzle and the misting units 632 may be operably and/or fluidly coupled to a supply of a sanitizing solution or the like that can be sprayed through the misting units 632 to sanitize and/or otherwise disinfect the articles 631. The sanitizing solution may be any solution known and/or used for killing germs, bacteria, and/or viruses. Such sanitizing solutions may comprise bleach, ammonia, iodine, hypochlorites, Chlorine dioxide, iodophors, Peroxyacetic acid, or the like.

The sanitizing solution, spray, or mist emitted by the misting units 632 is configured to kill germs, bacteria and viruses on the article 631 that is positioned in the particular locking assembly 630. The supply of the sanitizing solution may be replenished as needed. The particular shape, size, and configuration of the misting units 632 may be dictated by the size and type of locking unit it is to be used with. Any type of display unit may be used depending on the needs of the particular retail environment in which the locking unit is to be used.

Figure 21A:
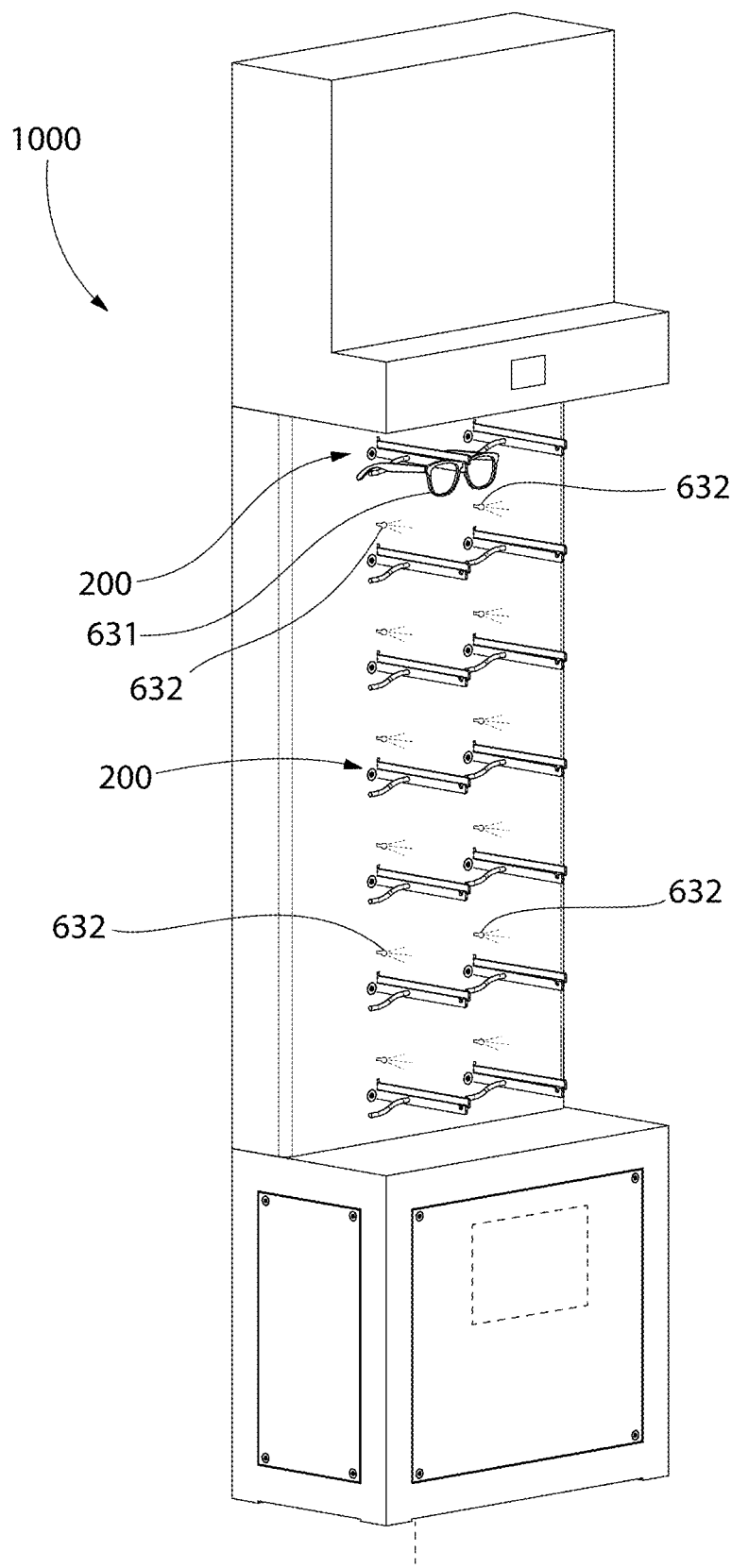
FIG. 21A is a perspective view of the locking system of FIG. 5 with the sanitizing system of FIG. 20A incorporated therein.

Referring to FIG. 21A, the misting units 632 are illustrated being used with the locking system 1000 described above. In one particular embodiment, the sanitizing system comprises one or more misting units 632 positioned above (or below, next to, around, or the like) each locking assembly 200 and hence each locked article 631. Thus, the misting units 632 may be operated in various different ways. In one embodiment, the misting units 632 may be emitting a spray or mist of the sanitizing solution so that they are constantly sanitizing the articles 631 that are held by the locking system 1000. In some embodiments, the misting units 632 may be activated only when it is confirmed that the locking assembly 200 associated with the misting units 632 is holding one of the articles 631. Thus, the locking system 1000 may determine whether the locking assembly 200 is holding an article 631 in a locked state. If the locking assembly 200 is holding the article 631, then the misting units 632 will be activated and powered on to sanitize the article 631. If it is determined that the locking assembly 200 is not holding an article, then the misting units 632 will be powered off and/or deactivated because there is no article to sanitize. In some embodiments, the locking system 1000 may control activation and deactivation of the misting units 632. In other embodiments, an external processor or server may control activation and deactivation of the misting units 632.

In some embodiments, the misting units 632 may only be powered on for a predetermined period of time starting immediately after an article 631 is returned to the locking assembly 200 associated with the misting units 632. Thus, for example, a consumer may unlock one of the locking assemblies 200 and remove the article 631 that was held by the locking assembly 200 to play with and/or otherwise manipulate it. After awhile, the consumer may decide he does not want to purchase the article 631 and may return the article to the locking assembly 200 (potentially in a contactless manner using a portable electronic device 400 as has been described above). Upon the consumer returning the article 631 to the locking assembly 200, the retail security system 500 may activate the misting units 632 that are associated with that particular locking assembly 200 to sanitize the article 631 that has just been replaced onto the locking assembly 200. The misting units 632 may need to operate for a certain amount of time in order to effectively kill all bacteria and/or virus that could potentially be on the article 632 (e.g., five minutes, ten minutes, or the like). Thus, upon the misting units 632 being activated, the locking assembly 200 associated with those misting units 632 may be prevented from being altered from the locked state to the unlocked state until after expiration of the predetermined time period. That is, in some embodiments the locking assembly 200 is prevented from being altered from the locked state to the unlocked state while the misting units 632 associated with that locking assembly 200 are powered on/activated.

In some embodiments, there may be a single set of misting units 632 (not limited to an exact number of spray nozzles, but they may all operate together and be on/off at the same time) for the entire locking system 1000. Thus, in such an embodiment, the misting units 632 may be activated to sanitize all of the articles 631 simultaneously either at set intervals (every hour or the like), at predetermined times of the day (at noon, 3 PM, 6 PM, etc.), or each time any article 631 is returned to the locking system 1000. In such an embodiment, all of the locking assemblies 200 may remain locked while the misting units 632 are activated.

Although in some of the exemplified embodiments there is a sanitizing system in each of the individual locking units, in yet another embodiment there may be one sanitizing system (i.e., one or one set of gel blocks, one or one set of sanitizing lights, or one or one set of misting units) that covers and/or applies to the entire environment of articles for which disinfecting, sterilizing, purifying, and/or sanitizing as desired and/or otherwise required.

In the exemplified embodiment, the sanitizing system is designed to disinfect, sterilize, purify and/or otherwise sanitize an article and to allow a consumer and/or employee to access the article free of contact with any other human being(s). Specifically, each of the locking assemblies 200 is configured to secure or hold one article and to be accessible remotely via a portable device, retina scanning, or other contactless means as has been described in detail herein. Of course, however, the present invention does not require that the article be accessed remotely and could require human interaction to unlock, access and handle the article. The articles can be displayed, racked, stored, secured and/or otherwise inventoried individually or collectively. For example, eyewear could be: (1) individually displayed in a box/cubicle that locks and unlocks; or (2) individually on sunglass display rack that locks and unlocks; or (3) collectively behind a cabinet or on a shelf with other eyewear. In any scenario, the sanitizing system will be able to sanitize the article and the locking mechanism individually and/or collectively.

As described above, systems and methods consistent with the invention provide a way to kill germs, viruses and bacteria and to prevent the spread of illness and diseases among consumers and/or employees, while still permitting consumers to have increased access to articles, products and goods. The functionality of the illustrated components may overlap, however, and may be present in fewer or greater number of elements and components. Further, all or part of the functionality of the illustrated elements may co-exist or be distributed among several geographically dispersed locations. Embodiments, features, aspects and principles of the present invention may be implemented in various environments and are not limited to the illustrated environments.

In some embodiments, the software application on the user's portable electronic device 400 may provide an indication to a user when a particular article is being sanitized. This may be accomplished in several ways. In one embodiment, upon a user scanning a machine-readable code with the portable electronic device 400 as discussed above, if the system is currently performing a sanitizing procedure on the article associated with the machine-readable code, the software application will indicate this to the user on the display of the portable electronic device. For example, the software application may display information indicating that the article is unavailable due to an ongoing sanitizing procedure. The software application may also display information regarding the amount of time remaining in the sanitizing procedure. Alternatively, the software application may display information indicating that the product has recently been sanitized including the date and time of the last sanitizing procedure and the date and time that the article was last accessed by a user.

In another embodiment, upon the portable electronic device 400 establishing wireless communication with the locking system 1000, the software application will display information on the portable electronic device 400 about each article being held by the locking system 1000. Such information may include the date and time each article was last sanitized, whether the article is currently being sanitized, and if so the amount of time left in the sanitizing procedure. In still another embodiment, there may be a display on the locking system 1000 itself, such as on the base portion, the header portion, or the support portion, which identifies whether the articles are being sanitized. For example, there may be a display next to each article and locking assembly 200 that indicates to the consumer whether the article held at that location is being sanitized. The display may be color-coded so that it is red when a sanitizing procedure is taking place and green when no sanitizing procedure is taking place. Alternatively, the display may use text or graphics to indicate whether it is performing a sanitizing procedure or not.

Figure 22:
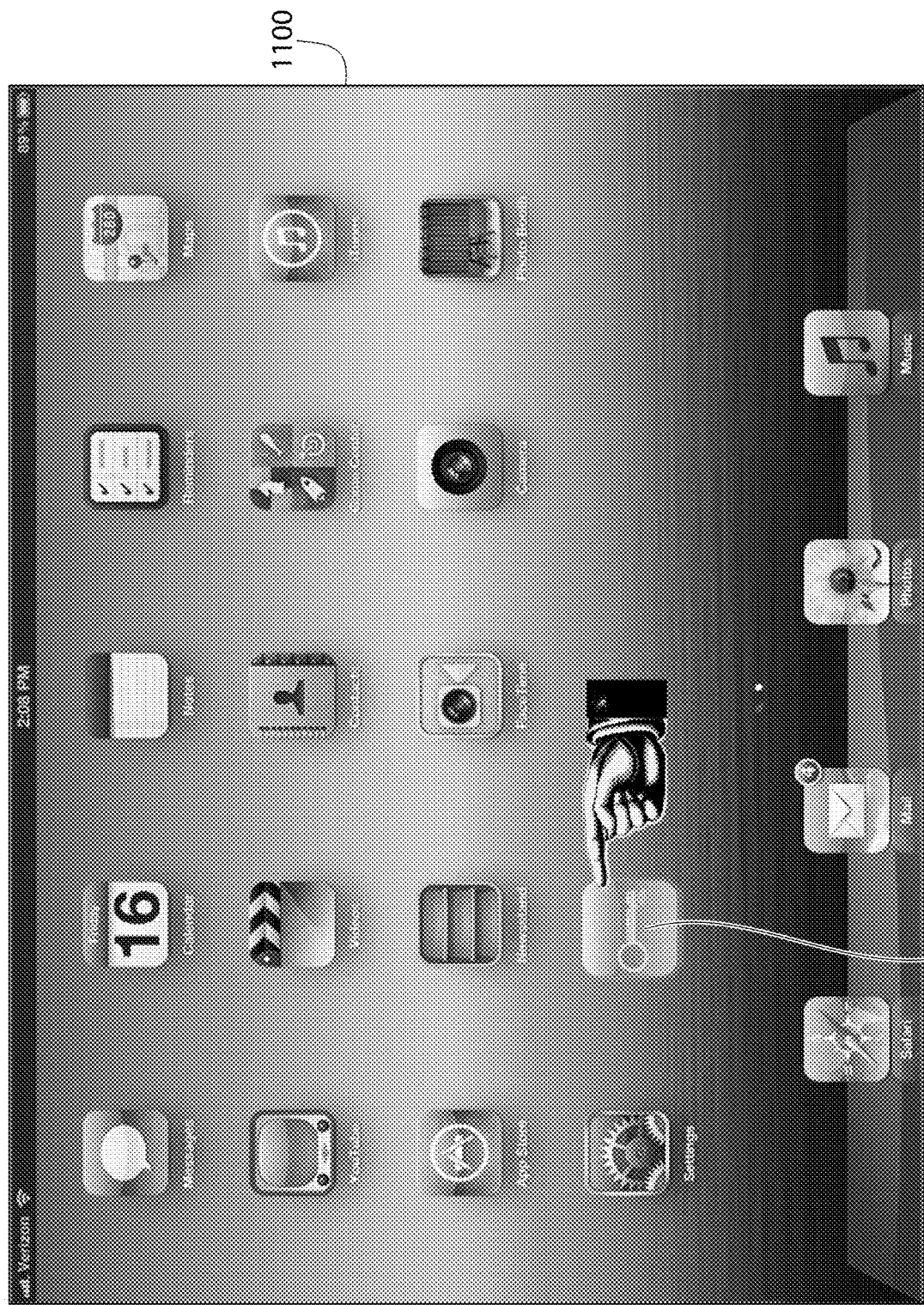
FIG. 22 is a view of a user interface of a computer apparatus illustrating an icon for a software application thereon.

FIGS. 22-31 illustrate an owner's dashboard associated with the locking system 1000. Specifically, FIG. 22 illustrates a desktop page of a computer apparatus 1100 which could be a computer, a laptop, a tablet, a smart phone, or the like. As seen, there is a software application 1101 called Skeleton Key which is being selected (touched with a finger, clicked with a mouse, or the like).

Figure 23:
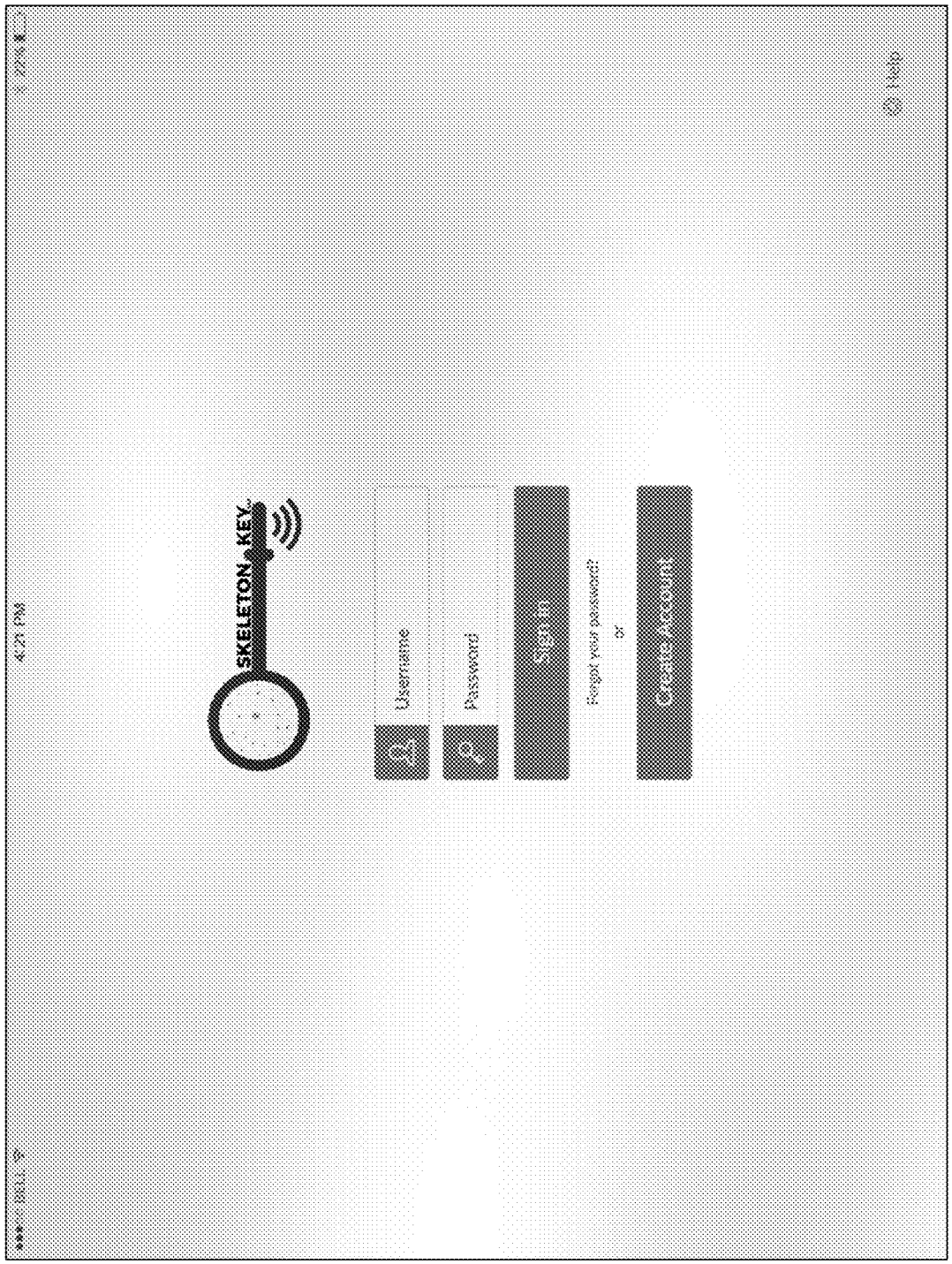
FIG. 23 is a view of the user interface of the computer apparatus of FIG. 22 after launching the software application and navigating to a setup page.

Referring to FIG. 23, once the software application 1101 is launched (which can be achieved by touching the icon on a touch screen or clicking the icon on a non-touch screen device), a window opens allowing a user to set up an account. Specifically, the user can enter an Organization Name and time zone, an email address, a name and title, a job function, a phone number, and a password to set up an account.

Figure 24:
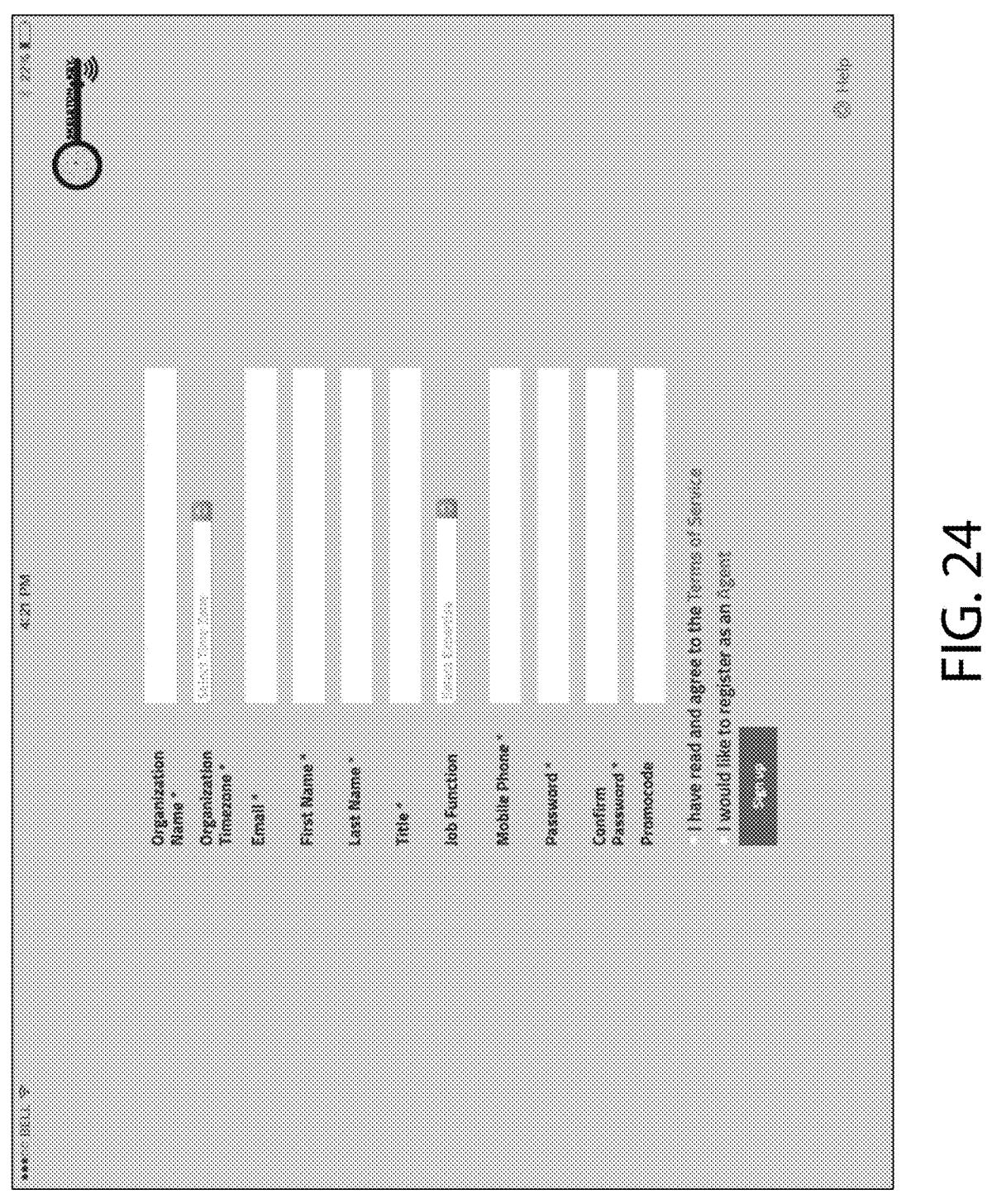

Next, referring to FIG. 24, the user can log in as an owner or administrator. Specifically, a logon page will open allowing the user to enter a username and password in order to access the software application 1101 and its contents.

Figure 25:
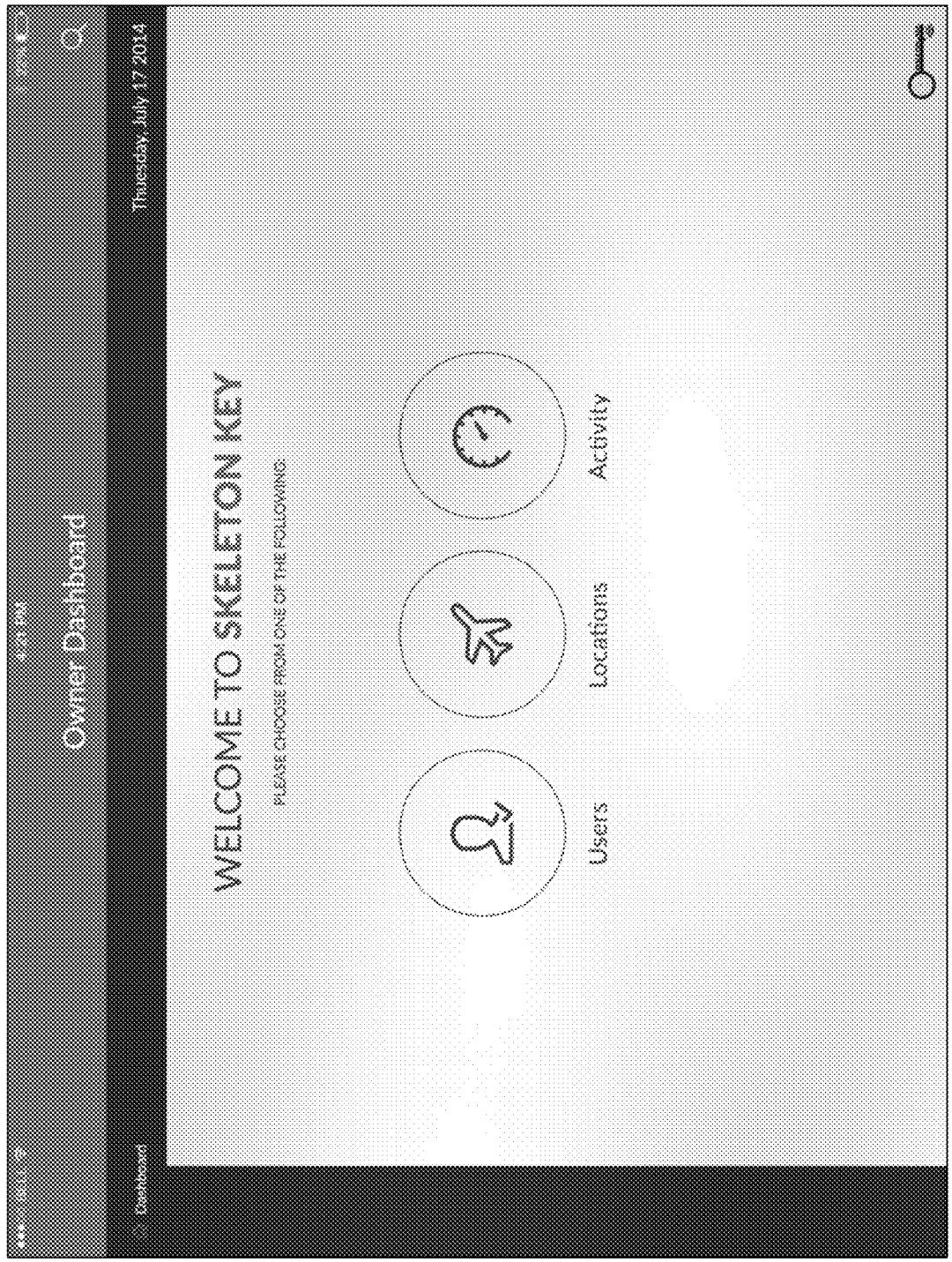
FIG. 25 is a view of the user interface of the computer apparatus of FIG. 22 illustrating a homepage of owner dashboard of the software application.

Referring to FIG. 25, once the user has logged into the software application 1101, the user can select what they want to view. Specifically, they can select "users," "locations," or "activity."

Figure 26:
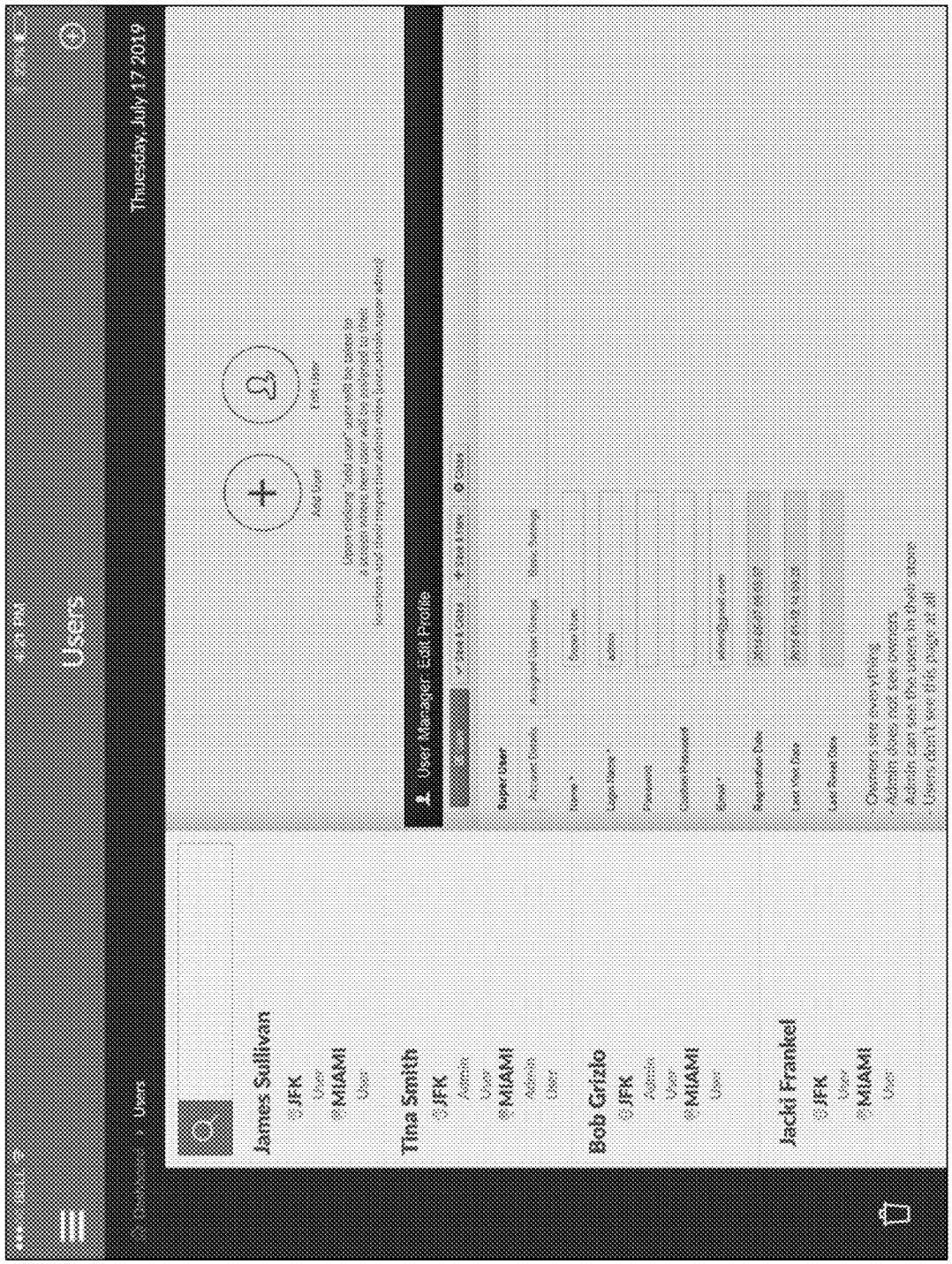
FIG. 26 is a view of the user interface of the computer apparatus of FIG. 22 illustrating a user manager page of the software application.

Referring to FIG. 26, the window that appears if the user selects "users" in FIG. 25 is shown. On this page, a person can be set up as an "admin," which would likely be a manager at a particular store location. This will allow that user/admin to keep track of the various users (i.e., consumers) in their particular store and see which products they have gained access to while shopping. This page is only available to owners or administrations, and not to the users or consumers themselves, despite the fact that the users will also have a software application downloaded onto their portable electronic devices as noted above in order to interact with the locking system.

Figure 27:
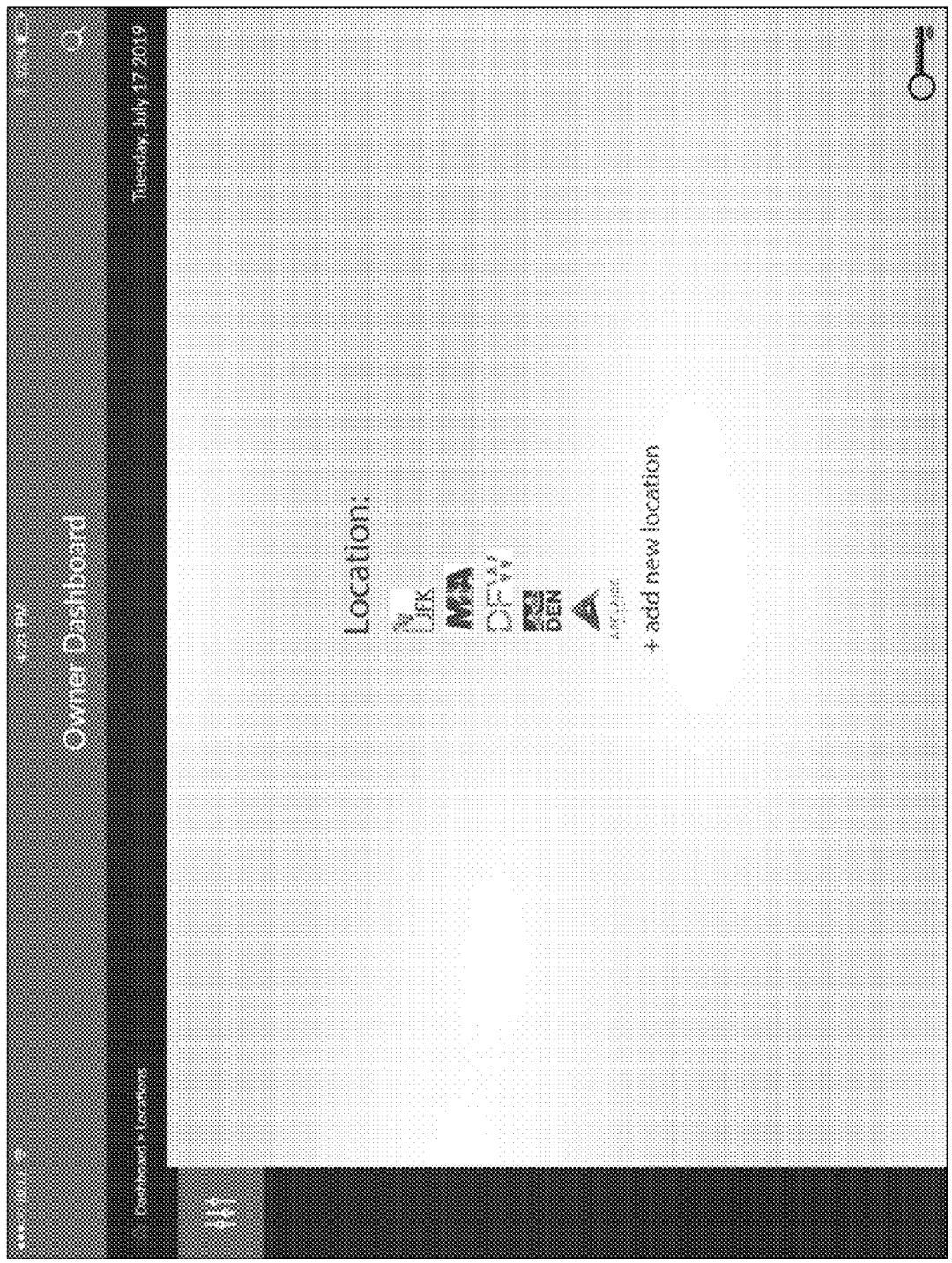
FIG. 27 is a view of the user interface of the computer apparatus of FIG. 22 illustrating a location selection page of the software application.

FIG. 27 illustrates the window that appears if the user selects "location" in FIG. 25. Specifically, the user may be an owner of stores in different locations. In such a situation, the user may determine that he/she wants to view the activity taking place at one of the locations. Thus, on the window in FIG. 27, the user would select a particular location that he/she wishes to view.

Figure 28:
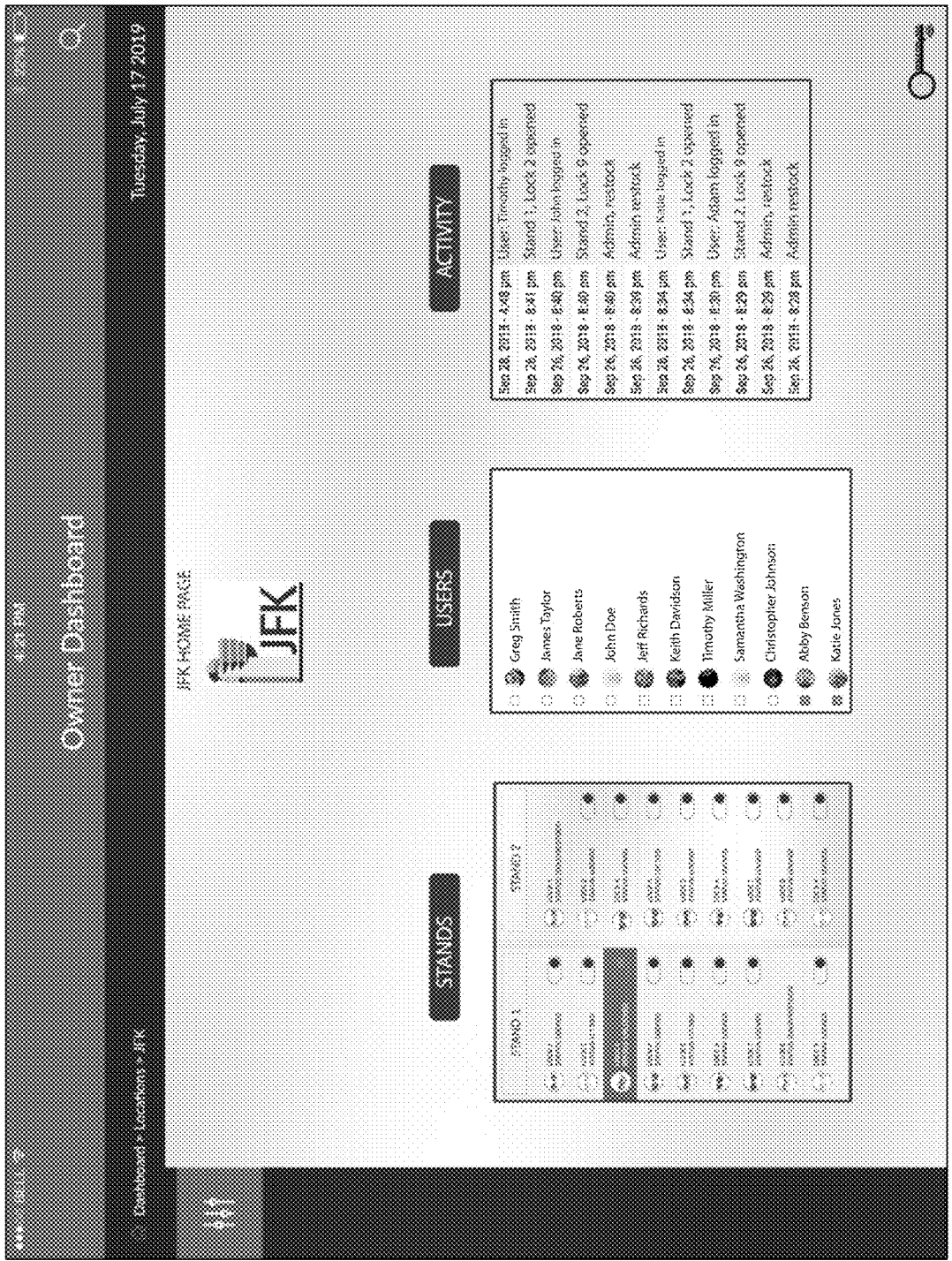
FIG. 28 is a view of the user interface of the computer apparatus of FIG. 22 illustrating an activity log of the software application.

One of the locations in FIG. 27 is "JFK," and FIG. 28 illustrates the window that appears if the user selects "JFK" in FIG. 27. The window of FIG. 28 shows that the store in JFK has two of the stands 100 (i.e., two of the locking systems 1000), labeled as Stand 1 and Stand 2. This window also shows the current status of each locking assembly 200 of each stand 100 (locked, unlocked, or sold/restock). This window also shows a list of consumers that are currently active within that store as a user log (this being determined by the consumers that have the app open on their portable electronic device). Finally, this window illustrates the activity that has taken place over a period of time as an activity log (either that day, that week, over the past few hours, or the like, with the particular period of time capable of being determined and preset by the owner/admin). This shows which of the locking assemblies 200 have been opened and closed during the depicted period of time and the exact time that the opening/closing of the locking assemblies 200 occurred.

Figure 29:
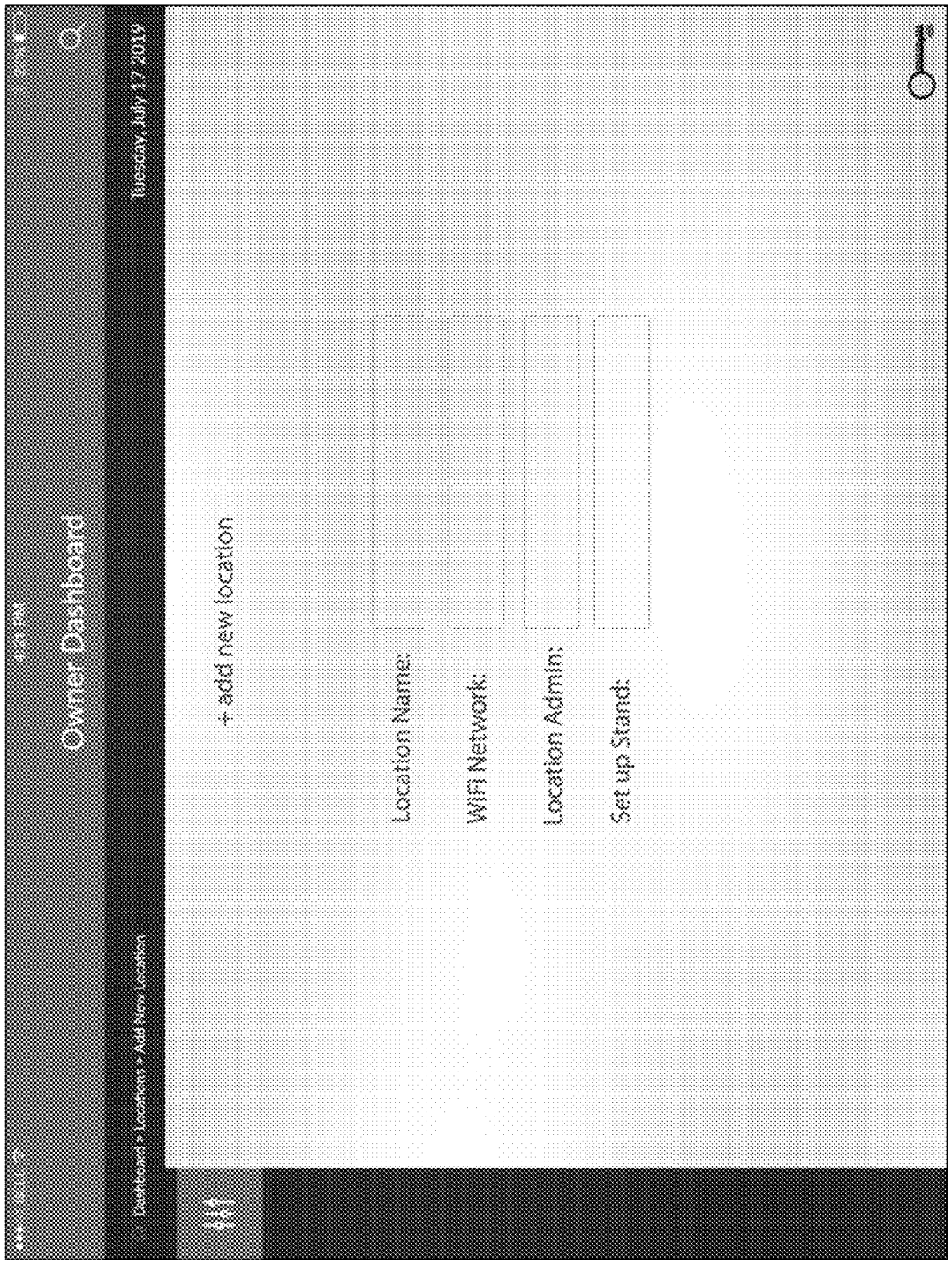
FIG. 29 is a view of the user interface of the computer apparatus of FIG. 22 illustrating a location addition page of the software application.

FIG. 29 illustrates a window that allows an owner to add another location to the software application. Specifically, if the owner has multiple stores or retail locations, the owner can add them all into the software application for remote monitoring.

Figure 30:
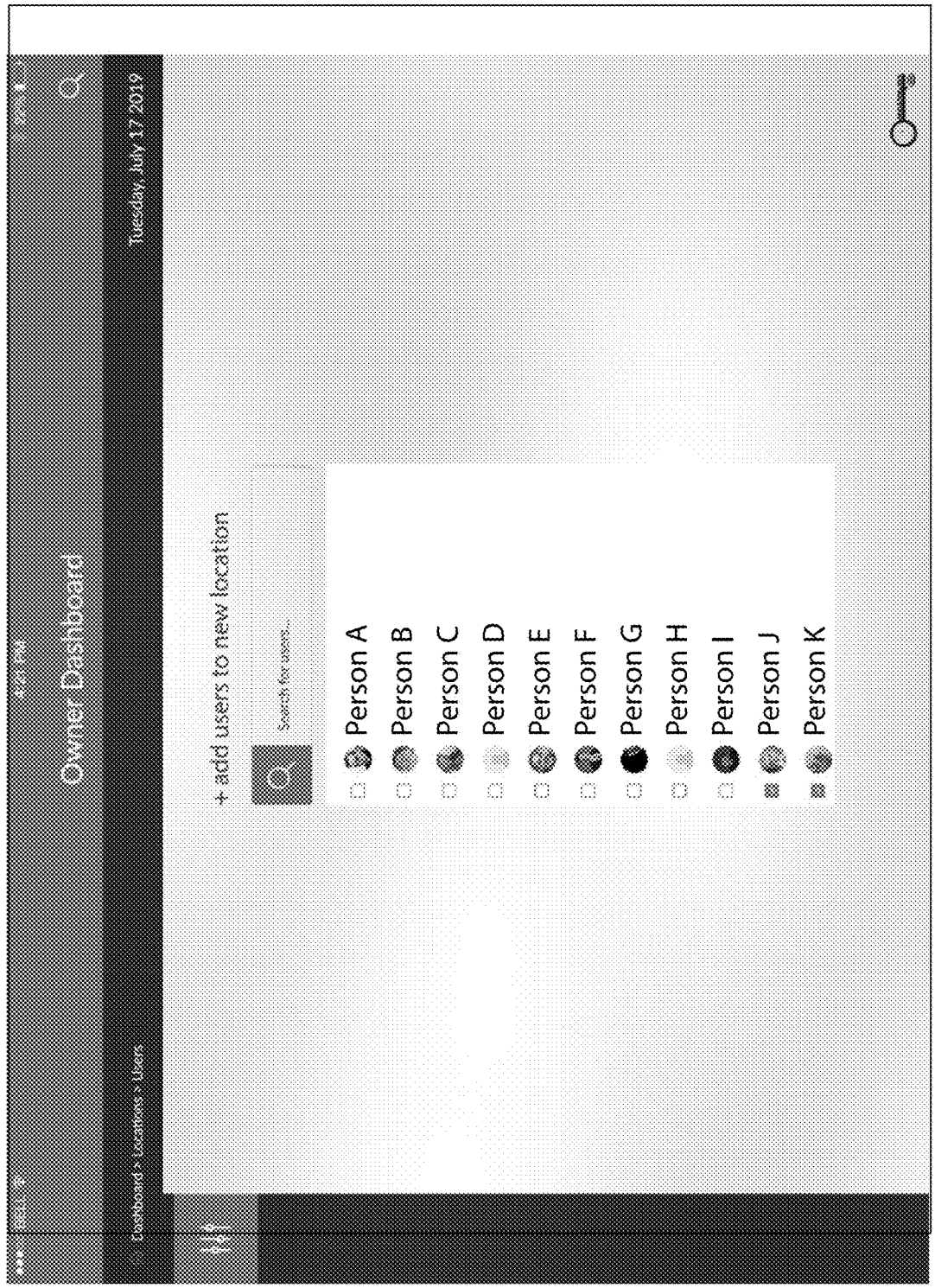
FIG. 30 is a view of the user interface of the computer apparatus of FIG. 22 illustrating a user addition page of the software application.

FIG. 30 illustrates a window that allows new users to be added to the new location (i.e., new admin, employees, etc.).

Figure 31:
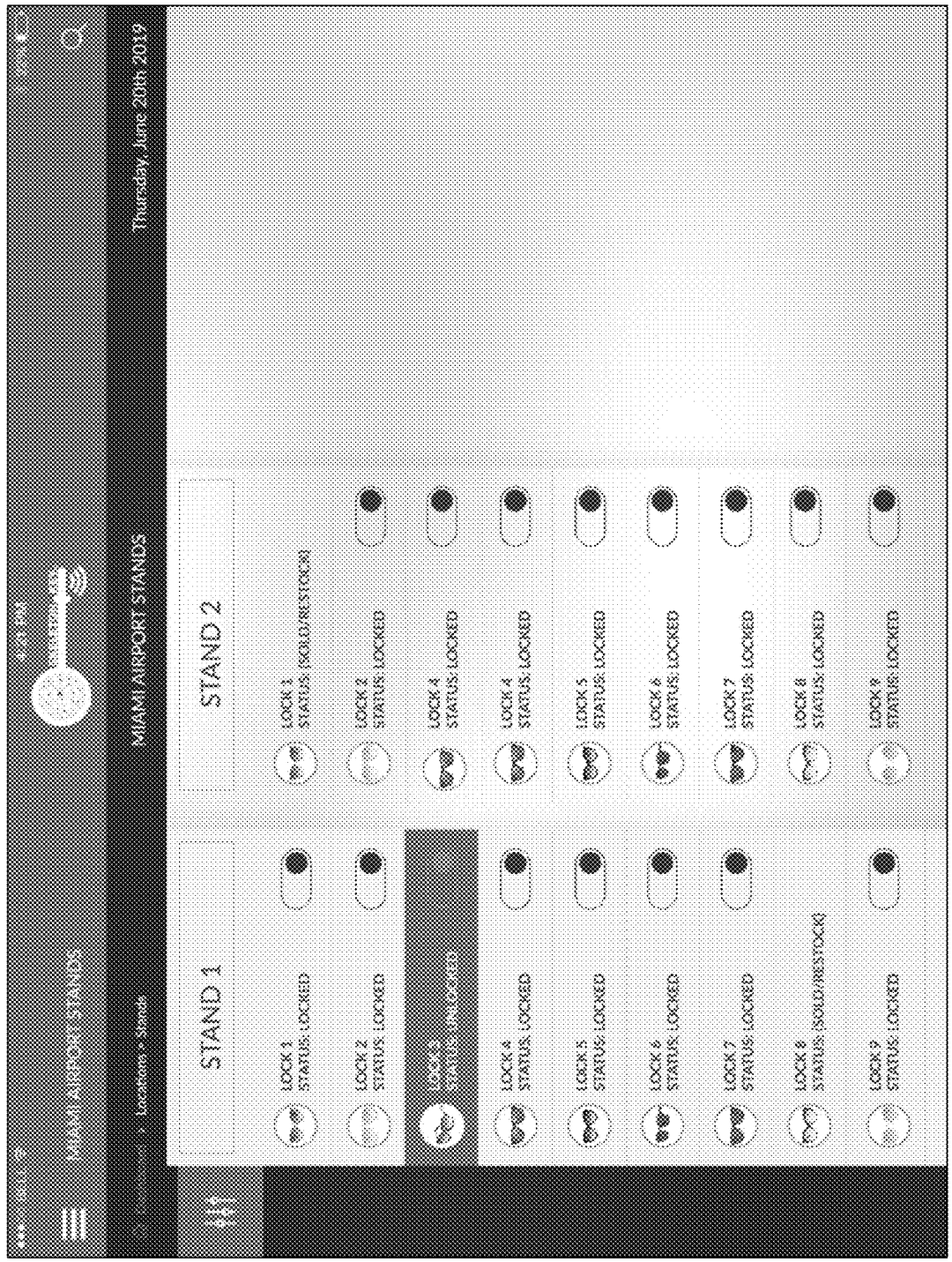
FIG. 31 is a view of the user interface of the computer apparatus of FIG. 22 illustrating a close-up of the activity log shown in FIG. 28.

Finally, FIG. 31 illustrates a window that shows just the status of each locking assembly 200 within each of the stands 100.

Thus, using the owner's software application, the owner can keep track of the activity taking place in his/her stores without having to be physically present in the store and without having to talk to an employee who is present in the store.

Although the invention may be described in terms of steps, in some embodiments certain steps are performed simultaneously by the system although described herein as being different steps. Furthermore, in some embodiments the steps may take place in a sequence different than that described herein. Thus, various combinations of some or all of the steps identified may be used in certain embodiments.

As described above, systems and methods consistent with the invention provide a way for retail stores to prevent theft, while still permitting consumers to have increased access to the store's merchandise, objects, or articles that are for sale. The functionality of the illustrated components may overlap, however, and may be present in fewer or greater number of elements and components. Further, all or part of the functionality of the illustrated elements may co-exist or be distributed among several geographically dispersed locations. For example, each "database" may be embodied as a software component, a hardware component, or a combination of a software component and a hardware component. Moreover, embodiments, features, aspects and principles of the present invention may be implemented in various environments and are not limited to the illustrated environments.

Further, the sequences of events described herein are exemplary and not intended to be limiting. Thus, other process stages may be used, and even with the processes described herein, the particular order of events may vary without departing from the scope of the present invention. Moreover, certain process stages may not be present and additional stages may be implemented. Also, the processes described herein are not inherently related to any particular system or apparatus and may be implemented by any suitable combination of components.

While the invention has been described with respect to specific examples including presently preferred modes of carrying out the invention, those skilled in the art will appreciate that there are numerous variations and permutations of the above described systems and techniques. It is to be understood that other embodiments may be utilized, and structural and functional modifications may be made without departing from the scope of the present invention. Thus, the spirit and scope of the invention should be construed broadly as set forth in the appended claims.

What is claimed is:

1. A retail security system comprising:
a locking system comprising:
a support structure extending from a bottom end to a top end along a longitudinal axis;
a plurality of locking assemblies located along the support structure, each of the locking assemblies configured to hold an article for sale, each of the locking assemblies independently alterable between a locked state whereby the article cannot be removed from the locking assembly and an unlocked state whereby the article can be removed from the locking assembly; and
a wireless communication module;
a portable electronic device carried by a user and comprising a wireless communication module; and
wherein upon wireless communication being established between the portable electronic device and the locking system and the user being authenticated, the portable electronic device is configured to transmit instructions to the locking system to cause the locking system to alter at least one of the plurality of locking assemblies from the locked state to the unlocked state so that the user can interact with the article being held by the at least one of the plurality of locking assemblies.

2. The retail security system according to claim 1 wherein the locking assemblies are arranged on the support structure in a plurality of columns.

3. The retail security system according to claim 1 wherein each of the plurality of locking assemblies is configured to be altered between the locked and unlocked states without any physical contact between the user and the locking system so that the user can interact with the article without making physical contact with the locking system.

4. The retail security system according to claim 1 wherein each of the locking assemblies comprises:
a first arm extending from a front surface of the support structure;
a second arm extending from the front surface of the support structure, the second arm movable between a first position when the locking assembly is in the locked state and a second position when the locking assembly is in the unlocked state, wherein when the second arm is in the first position the article is locked between the first and second arms and when the second arm is in the second position the user can readily remove the article from the locking assembly.

5. The retail security system according to claim 4 wherein each of the locking assemblies further comprises an actuation mechanism operably coupled to the second arm and configured to automatically move the second arm between the first and second positions, and wherein the first arm is fixedly coupled to the support structure so as to be stationary and non-movable relative to the support structure.

6. The retail security system according to claim 5 wherein the actuation mechanism is positioned along a rear surface of the support structure, the second arm extending through a slot in the support structure to couple the second arm to the actuation mechanism.

7. The retail security system according to claim 4 further comprising:
wherein the first arm comprises a top surface having a notch therein, a first side surface, and a second side surface, a first support member extending from the first side surface and a second support member extending from the second side surface;
wherein each of the articles is eyewear comprising a bridge, a first temple, and a second temple, each of the articles supported by the locking assembly with the bridge of the article nesting within the notch in the top surface of the first arm and the first and second temples resting atop of the first and second support members.

8. The retail security system according to claim 7 wherein the second arm comprises a bottom surface that is adjacent to the top surface of the first arm when the locking assembly is in the locked state, thereby trapping the bridge of the eyewear between a floor of the notch and the bottom surface of the second arm and preventing the eyewear from being removed from the locking assembly.

9. The retail security system according to claim 4 wherein moving the second arm between the first and second positions comprises pivoting the second arm about an axis that is perpendicular to the longitudinal axis of the support structure.

10. The retail security system according to claim 1 wherein the locking system further comprises at least one camera, and wherein the camera is configured to take a photograph of the user after initiation of the wireless communication between the portable electronic device and the locking system and prior to altering any of the locking assemblies from the locked state to the unlocked state.

11. The retail security system according to claim 1 wherein upon the wireless communication between the portable electronic device and the locking system being established and prior to the locking system altering any of the plurality of locking assemblies into the unlocked state, the locking system performs an authentication assessment on the user to determine whether to grant the user with access to the articles being held by the locking system.

12. A retail security system comprising:
a locking system comprising a plurality of locking assemblies each configured to hold an article for sale, each of the locking assemblies alterable between a locked state whereby the article cannot be removed from the locking assembly and an unlocked state whereby the article can be removed from the locking assembly; and
a computer apparatus comprising a user interface and a software application, wherein upon launching the software application on the computer apparatus and logging in as an administrator of the locking system, the computer apparatus displays, on the user interface, a list of the locking assemblies of the locking system alongside an indication as to whether each of the locking assemblies is in the locked state or the unlocked state.

13. The retail security system according to claim 12 wherein upon launching the software application on the computer apparatus and logging in as the administrator of the locking system, the computer apparatus also displays an activity log comprising information related to altering of the locking assemblies between the locked and unlocked states.

14. The retail security system according to claim 13 wherein the information on the activity log comprises a date and time that each of the locking assemblies is altered between the locked and unlocked states and a date and time that each of a plurality of users logged on.

15. The retail security system according to any claim 12 further comprising a portable electronic device carried by a user, the portable electronic device comprising a software application, and wherein when the software application is launched on the portable electronic device and the portable electronic device is in wireless communication with the locking system the user can interact with the locking system by making selections on a user interface of the portable electronic device.

16. The retail security system according to claim 15 wherein upon launching the software application on the computer apparatus and logging in as the administrator of the locking system, the computer apparatus also displays a user log containing a list of users with the software application launched on their portable electronic device.

17. A method of monitoring a retail security system, the method comprising:
launching a software application on a computer apparatus and providing authentication credentials for authentication as an administrator or owner;
upon providing authentication credentials, a user interface of the computer apparatus displaying a dashboard containing information associated with one or more retail security systems that are owned or operated by the administrator or owner;
wherein the information on the dashboard comprises:
a list of the one or more retail security systems and a status of one or more locking assemblies of the retail security systems, the status including an indication as to whether the one or more locking assemblies is locked or unlocked; and
an activity log including a list of users who have been in operable communication with the one or more retail security systems.

18. A retail security system comprising:
a locking system comprising a locking assembly configured to hold an article for sale, the locking assembly being alterable between a locked state whereby the article cannot be removed from the locking assembly and an unlocked state whereby the article can be removed from the locking assembly;
a sanitizing system; and
wherein the sanitizing system is configured to sanitize the article automatically upon the article being returned to the locking assembly and the locking assembly being altered into the locked state.

19. The retail security system according to claim 18 wherein the locking assembly is prevented from being altered from the locked state to the unlocked state while the sanitizing system is sanitizing the article.

20. The retail security system according to claim 18 further comprising:
a portable electronic device carried by a user; and
wherein upon wireless communication being established between the portable electronic device and the locking system, the portable electronic device is configured to transmit instructions to the locking system to cause the locking system to automatically alter the locking assembly from the locked state to the unlocked state.

* * * * *